United States Patent
Do et al.

(10) Patent No.: US 8,013,966 B2
(45) Date of Patent: Sep. 6, 2011

(54) DISPLAY PANEL AND LIQUID CRYSTAL DISPLAY APPARATUS INCLUDING THE SAME

(75) Inventors: Hee-Wook Do, Suwon-si (KR); Yeon-Ju Kim, Suwon-si (KR); Yoon-Sung Um, Yongin-si (KR); Hak-Sun Chang, Yongin-si (KR); Seung-Hoo Yoo, Seongnam-si (KR); Hyun-Wuk Kim, Yongin-si (KR); Jae-Jin Lyu, Gwangiu-si (KR); Chang-Hun Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/630,299

(22) Filed: Dec. 3, 2009

(65) Prior Publication Data

US 2010/0097556 A1 Apr. 22, 2010

Related U.S. Application Data

(63) Continuation of application No. 11/398,242, filed on Apr. 5, 2006, now Pat. No. 7,639,333.

(30) Foreign Application Priority Data

Apr. 6, 2005 (KR) .................. 10-2005-0028590
Aug. 18, 2005 (KR) .................. 10-2005-0075768

(51) Int. Cl.
*G02F 1/1343* (2006.01)
*G02F 1/1337* (2006.01)

(52) U.S. Cl. ............ 349/139; 349/129; 349/130
(58) Field of Classification Search .......... 349/129, 349/130, 139
See application file for complete search history.

(56) References Cited

U.S. PATENT DOCUMENTS

| | | | |
|---|---|---|---|
| 5,309,264 | A | 5/1994 | Lien et al. |
| 6,864,935 | B2 | 3/2005 | Kim et al. |
| 7,349,052 | B2 | 3/2008 | Wu et al. |
| 2003/0071952 | A1* | 4/2003 | Yoshida et al. ............ 349/141 |
| 2004/0169777 | A1 | 9/2004 | Tanaka et al. |
| 2004/0239856 | A1 | 12/2004 | Miyachi |
| 2006/0152660 | A1 | 7/2006 | Tanaka et al. |

FOREIGN PATENT DOCUMENTS

| | | |
|---|---|---|
| CN | 1537256 | 10/2004 |
| CN | 1550862 | 12/2004 |
| JP | 2001-083517 | 3/2001 |
| JP | 2002-169159 | 6/2002 |
| JP | 2005-24711 | 1/2005 |
| JP | 2005-31578 | 2/2005 |
| JP | 2005-49739 | 2/2005 |
| WO | 2004029709 | 4/2004 |

* cited by examiner

*Primary Examiner* — David Nelms
*Assistant Examiner* — David Chung
(74) *Attorney, Agent, or Firm* — F. Chau & Associates, LLC

(57) ABSTRACT

A display panel is provided. The display panel includes a substrate and a pixel electrode disposed on the substrate and having a pair of first primary edges facing each other and a pair of second primary edges connected to the first primary edges and facing each other, wherein the second primary edges include a plurality of protrusions of the pixel electrode having the shape of sawteeth.

20 Claims, 29 Drawing Sheets

DISPLAY PANEL AND LIQUID CRYSTAL DISPLAY APPARATUS INCLUDING THE SAME

CROSS-REFERENCE TO RELATED APPLICATIONS

This application is a continuation of U.S. patent application Ser. No. 11/398,242 filed Apr. 5, 2006 now U.S. Pat. No. 7,639,333, which claims priority to Korean Patent Applications No. 2005-0028590, filed on Apr. 6, 2005 and No. 2005-75768, filed on Aug. 18, 2005, the disclosures of which are each hereby incorporated by reference herein in their entireties.

BACKGROUND OF THE INVENTION (a) Field of the Invention

The present invention relates to a liquid crystal display apparatus.

(b) Description of the Related Art

A liquid crystal display (LCD) is one of the more widely used flat panel display apparatuses. An LCD includes e.g., two panels having electric field generating electrodes such as pixel electrodes and a common electrode, a liquid crystal layer interposed between the two panels, and polarizers disposed on outer surfaces of the panels. The liquid crystal display apparatus displays an image by applying a voltage to the electric field generating electrodes to generate an electric field in the liquid crystal layer which in turn controls the alignment of liquid crystal molecules in the liquid crystal layer to control polarization of incident light.

An example of a type of a liquid crystal display apparatus is the vertically aligned mode liquid crystal display apparatus in which liquid crystal molecules are arranged such that major axes of the liquid crystal molecules are perpendicular to the panels in the state that no electric field is generated. The vertically aligned mode liquid crystal display apparatus has a high contrast ratio and it can readily provide a wide reference viewing angle.

To implement the wide viewing angle in the vertically aligned mode liquid crystal display apparatus, a method of forming cutout portions in electric field generating electrodes and a method for forming protrusions on the electric field generating electrodes has been proposed. Since the cutout portions and the protrusions can control the tilted directions of liquid crystal molecules, the tilted directions of the liquid crystal molecules can be distributed into various directions by varying the cutout portions and the protrusions, to thereby obtain a wide reference viewing angle.

Moreover, for the purposes of light efficiency, it is desirable that the tilted direction of the liquid crystal molecules have an angle of 45° with respect to the polarization direction of the polarizers. In addition with the vertically aligned mode liquid crystal display apparatus, the polarizers are attached so that the polarization directions of the polarizers are parallel or perpendicular to the gate lines or the data lines. Therefore, the cutout portions or the protrusions are disposed to extend in a direction with an angle of 45° with respect to the gate lines or the data lines.

However, in the situation where the pixel electrodes of the vertically aligned mode liquid display apparatus have the shape of a rectangle and are parallel to the gate lines and the data lines, the alignment of the liquid crystal molecules is disturbed due to an electric field generated between the adjacent pixel electrodes, so that a phenomenon known as texture may occur. Consequently, as a result of the above mentioned texture, the transmittance of the liquid crystal display apparatus may be reduced.

In an attempt to reduce texture, a method of overlapping a portion of a cutout portion of the common electrode with a side of the pixel electrode has been proposed. However, even with above proposed method, the aperture ratio of the liquid crystal display apparatus may still be reduced.

Thus, there is a need for a display panel which is capable of increasing the aperture ratio and the transmittance of a liquid crystal display apparatus and for a liquid crystal display apparatus including the display panel.

SUMMARY OF THE INVENTION

According to an exemplary embodiment of the present invention, a display panel is provided. The display panel comprises a substrate and a pixel electrode. The pixel electrode is disposed on the substrate and has a pair of first primary edges facing each other and a pair of second primary edges connected to the first primary edges and which face each other. Moreover, the second primary edges include a plurality of protrusions of the pixel electrode having the shape of sawteeth.

According to another exemplary embodiment of the present invention, a display panel is provided. The display panel comprises a substrate, a plurality of gate lines disposed on the substrate, a plurality of data lines perpendicular to the gate lines, a plurality of thin film transistors connected to the gate lines and the data lines. The display panel further includes a plurality of pixel electrodes connected to the thin film transistors. Each of the pixel electrodes comprises: a pair of first primary edges parallel to the gate line and facing each other, and a pair of second primary edges connected to the first primary edges and which face each other and include protrusions having a shape of sawteeth.

In the above exemplary embodiments of the present invention, the pixel electrode may include a plurality of cutout portions which have a slanted angle with respect to the first primary edges.

In addition, the protrusion may include a first edge which has an angle of about 135° or more or about 45° or less with respect to the cutout portions.

In addition, the protrusion may further include a second edge which is parallel to the cutout portions.

In addition, the second edge may be located on an extension line of an edge of the cutout portion.

In addition, an envelope of the protrusions and the first primary edges may constitute a rectangle.

In addition, at least one of corners of the rectangle may be a chamfered slanted edge.

In addition, the chamfered slanted edge of the rectangle may have an angle of about 45° with respect to the first primary edges.

In addition, the protrusions may overlap the data lines.

In addition, the protrusions of the adjacent second primary edges of the adjacent pixel electrodes may be disposed to be engaged with each other.

In addition, the facing edges of the protrusions which are disposed to be engaged with each other may be parallel to each other.

According to another exemplary embodiment of the present invention, a liquid crystal display apparatus is provided. The liquid crystal display apparatus comprises: a plurality of pixel electrodes, a common electrode facing the pixel electrodes, and a liquid crystal layer interposed between the pixel electrodes and the common electrode. The liquid crystal display apparatus further comprises a first and a second partition member dividing each of the pixel electrodes into a plurality of sub areas, wherein each of the sub areas includes a pair of primary edges and a plurality of secondary edges connected thereto. In addition, the primary edges of the two sub areas included in the pixel electrodes are disposed to deviate from each other.

In the above exemplary embodiments of the present invention, the primary edges have a slanted angle with respect to the first and second partition members.

In addition, at least one of the secondary edges of each of the sub areas may have an angle of about 135° or more with respect to the primary edges.

In addition, the primary edges of each of the sub areas may include a first primary edge and a second primary edge which is shorter than the first primary edge, and the first primary edge may be constructed by combining an edge of the first or second partition members with a portion of a side of the pixel electrode.

In addition, the second primary edge of each of the sub areas may be constructed with an edge of the second partition member or with a corner of the pixel electrode.

In addition, the first partition member may be disposed in each of the pixel electrodes, and the second partition member may be disposed in the common electrode.

In addition, a portion of sides of the pixel electrode may constitute the secondary edge of each of the sub areas, and the second partition member may be disposed not to overlap a portion of the sides of the pixel electrode which constitute the secondary edge of each of the sub areas.

In addition, the first and second partition members may include cutout portions.

In addition, the common electrode may include connection cutout portions which face gaps between adjacent pixel electrodes. In addition, the connection cutout portions may connect adjacent second partition members.

In addition, the connection cutout portions may have an obtuse angle with respect to the second partition members. In addition, widths of the connection cutout portions may be larger than those of the gaps.

In addition, the first and second partition members may be parallel to each other.

In addition, the connection cutout portions may be parallel to the secondary edges of the sub areas.

In addition, the width of the connection cutout portions may be larger by about 8 μm than those of the gaps.

In addition, the liquid crystal display apparatus may further comprise data lines which overlap the secondary edges of the sub areas. In addition, the connection cutout portions may face the data lines.

In addition, the liquid crystal display apparatus may further comprise a light blocking member which faces the data lines.

In addition, a width of the light blocking member may be equal to that of each of the data lines.

In addition, a portion of the secondary edges of the sub areas may be disposed not to overlap the data lines, and the light blocking member may further include an expansion portion which covers the portion of the secondary edges of the sub areas which is disposed not to overlap the data lines.

In addition, each of the pixel electrodes may include at least two sub pixel electrodes which are physically separated from each other by a portion of the second partition members.

In addition, voltages of at least the two sub pixel electrodes may be different from each other.

In addition, at least the two sub pixel electrodes may be capacitively coupled.

In addition, the sub pixel electrodes may be connected to thin film transistors.

In addition, the sub pixel electrodes of one pixel electrode may be connected to different data lines, and the sub pixel electrodes of one pixel electrode may be connected to the same gate line.

In addition, the sub pixel electrodes of one pixel electrode may be connected to different gate lines, and the sub pixel electrodes of one pixel electrode may be connected to the same data line.

According to another exemplary embodiment of the present invention, a liquid crystal display apparatus is provided. The liquid crystal display apparatus comprises a first and a second substrate facing each other, a plurality of pixel electrodes disposed on the first substrate and a common electrode disposed on the second substrate. The liquid crystal display apparatus further includes a liquid crystal layer interposed between the first and second substrates. The common electrode includes first cutout portions facing gaps between the adjacent pixel electrodes.

In addition, the common electrode may include second cutout portions facing the pixel electrodes. In addition, the first cutout portions may connect the adjacent second cutout portions.

In addition, the first cutout portions may have an obtuse angle with respect to the second cutout portions. In addition, widths of the first cutout portions may be larger than those of the gaps.

In addition, the widths of the first cutout portions may be larger by about 8 μm than those of the gaps.

In addition, the pixel electrode may include third cutout portion which are disposed with the first cutout portions. In addition, the first and third cutout portions may be parallel to each other.

In addition, a portion of a boundary line of the pixel electrode may be parallel to a boundary line of the first cutout portion.

In addition, the first substrate may comprise: gate and data lines which are insulated from the first substrate and interest each other, thin film transistors which are connected to the gate and data lines, and pixel electrodes which are connected to the thin film transistors.

In addition, the gate lines may have an angle of about 45° with respect to the first cutout portions. In addition, the boundary line of the pixel electrode may overlap a portion of the data line.

In addition, the first cutout portions may face the data lines. In addition, one end of the second cutout portion may be formed to open.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EXEMPLARY EMBODIMENTS

Hereinafter, exemplary embodiments of the present invention will be described in detail with reference to the attached drawings such that the present invention can be easily put into practice by those skilled in the art. However, the present invention may be implemented in various aspects. The present invention is not limited to the exemplary embodiments described hereinafter.

Figure 1:
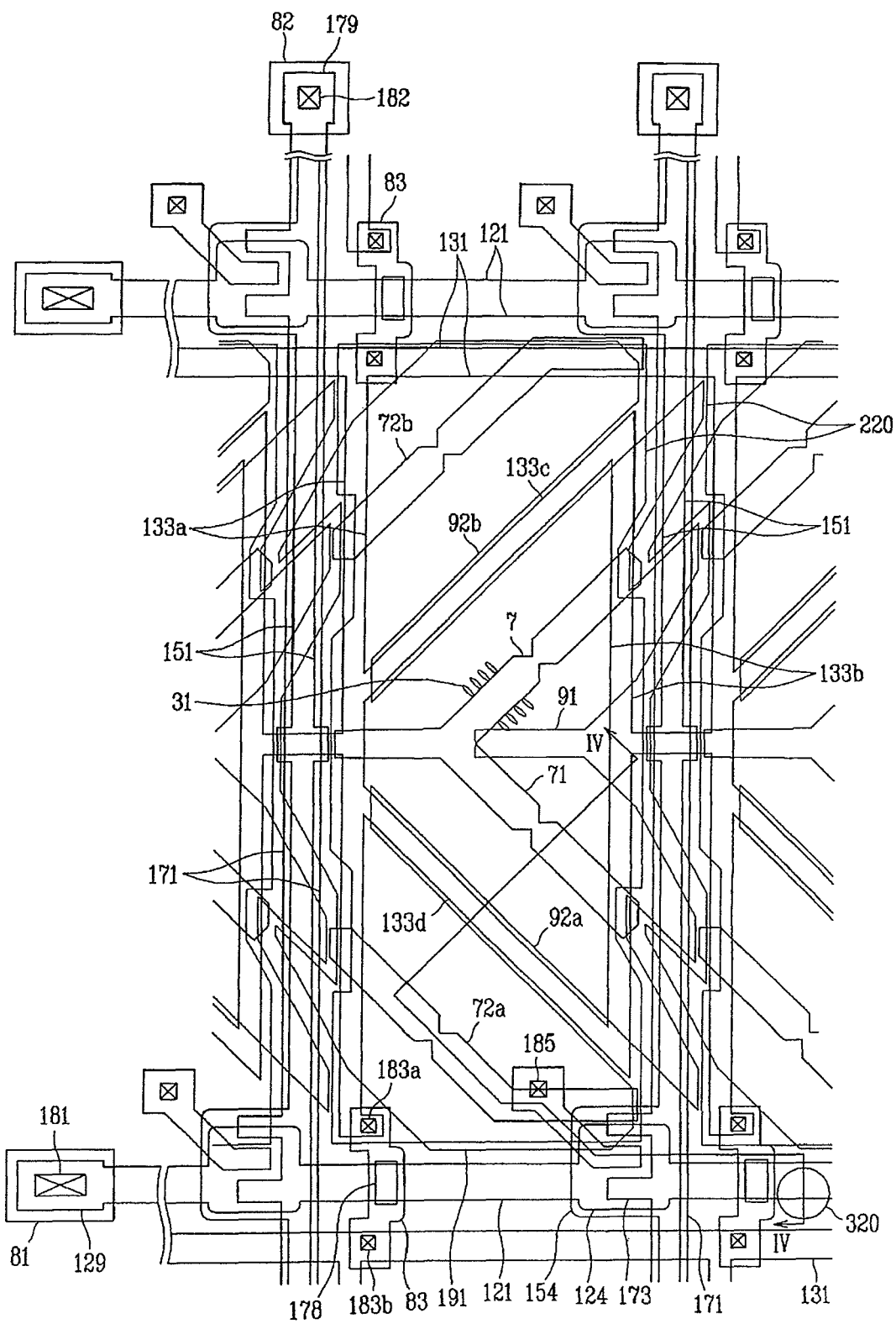
FIG. 1 is a view showing a layout of a liquid crystal display apparatus according to an exemplary embodiment of the present invention.
Figure 2:
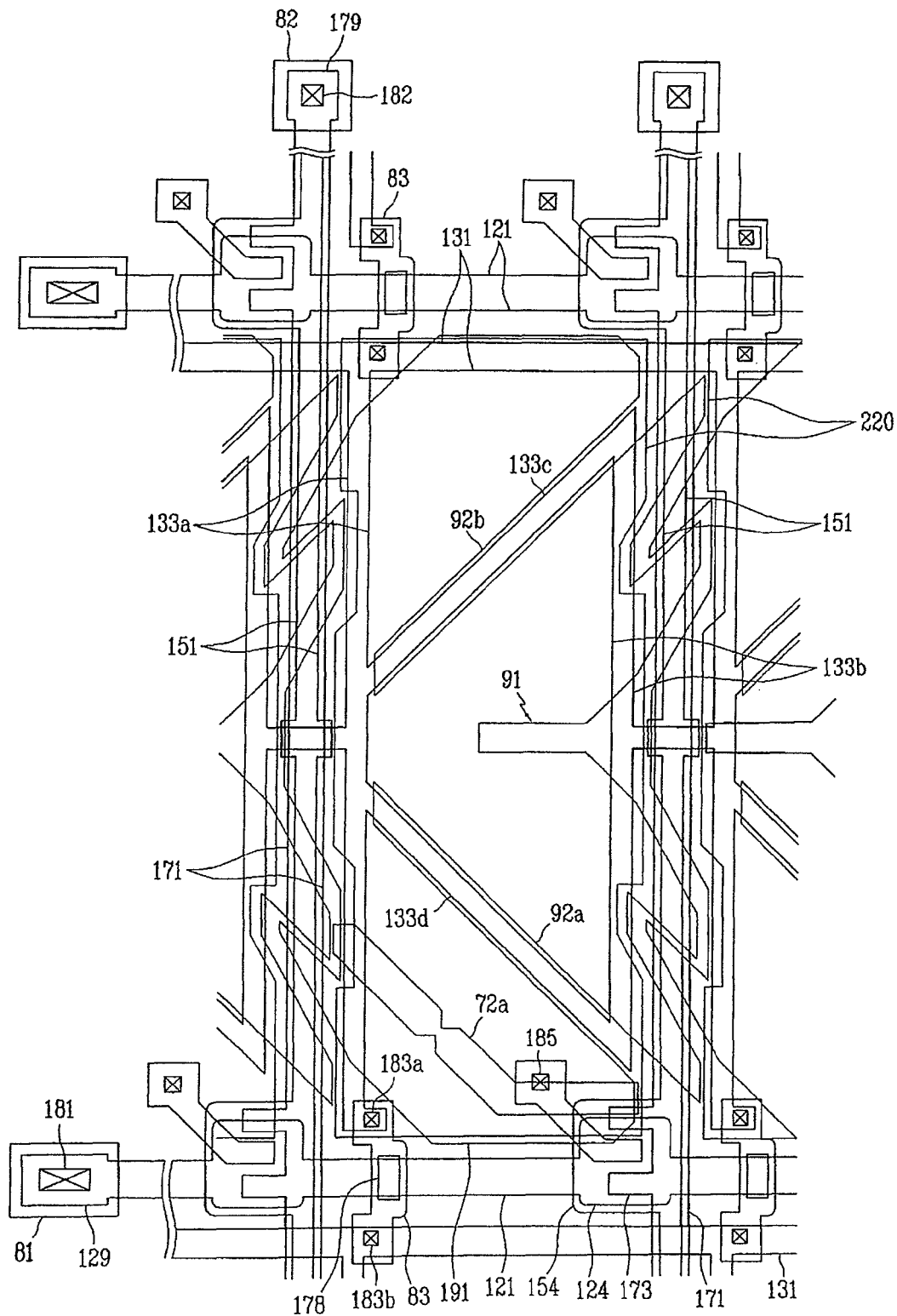
FIG. 2 is a view showing a layout of a thin film transistor panel for the liquid crystal display apparatus of FIG. 1.
Figure 3:
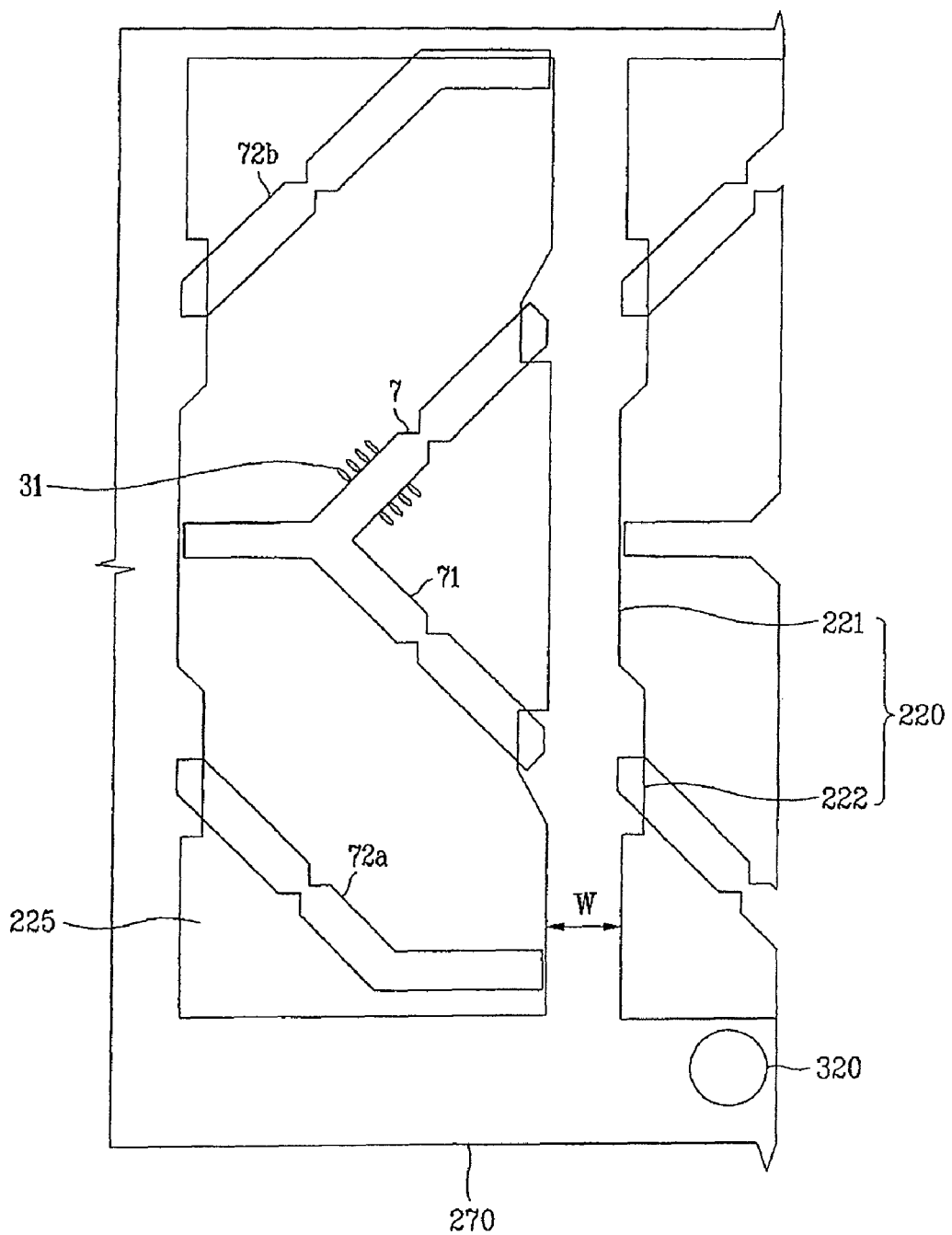
FIG. 3 is a view showing a layout of a common electrode panel for the liquid crystal display apparatus of FIG. 1.
Figure 4:
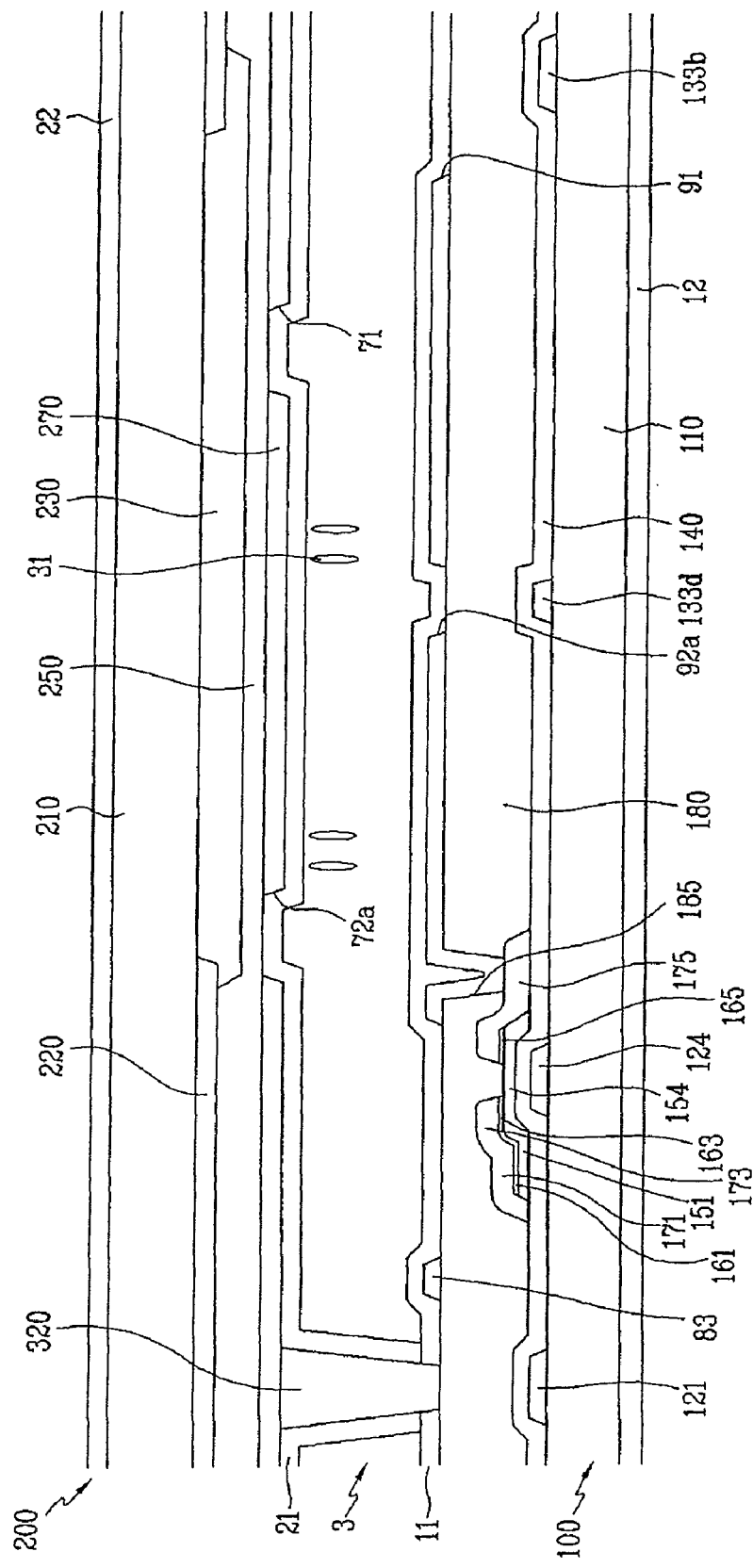
FIG. 4 is a cross sectional view showing the liquid crystal display apparatus taken along line IV-IV of FIG. 1.
Figure 5:
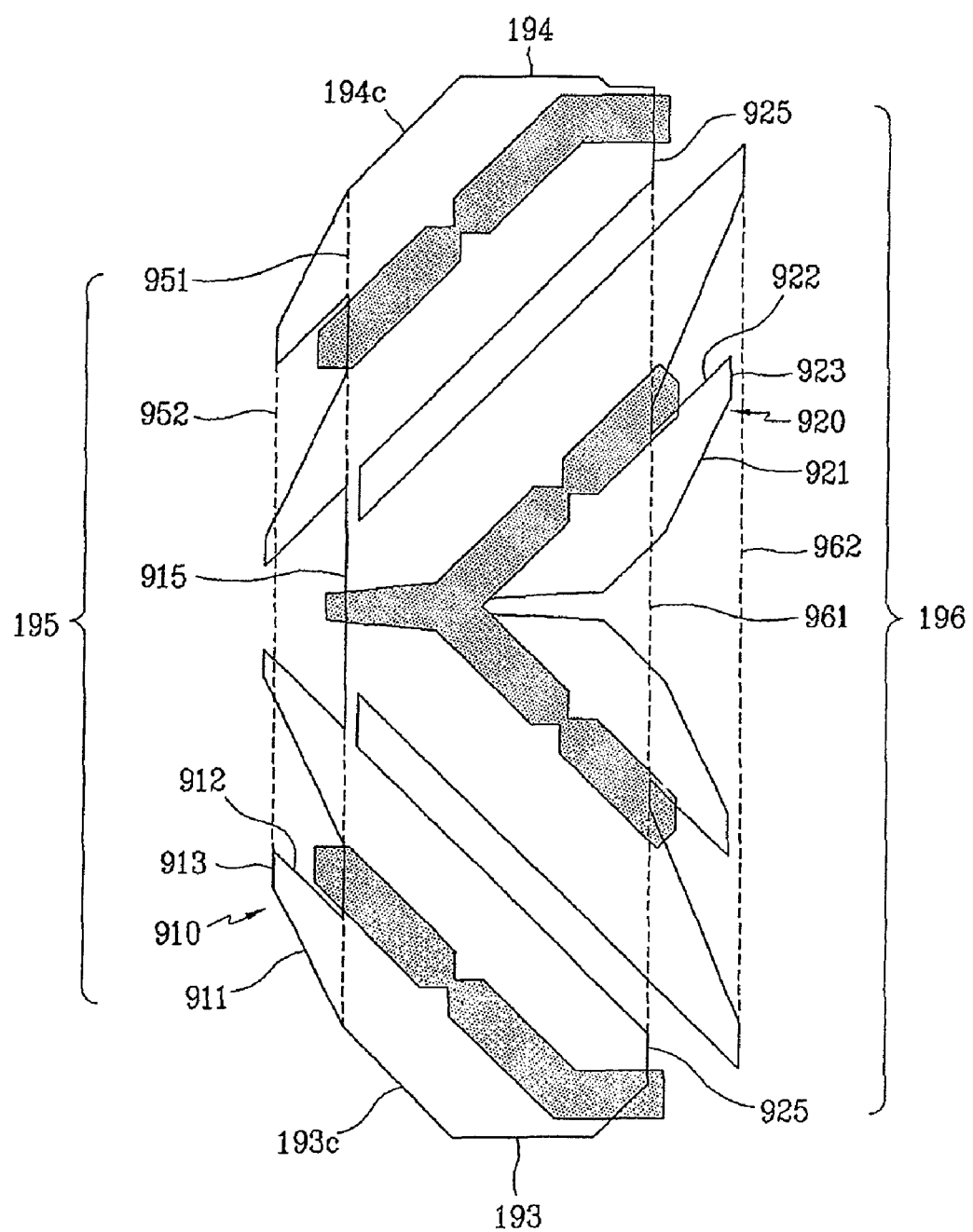
FIG. 5 is a view showing a layout of a common electrode and a pixel electrode of FIG. 1.
Figure 6:
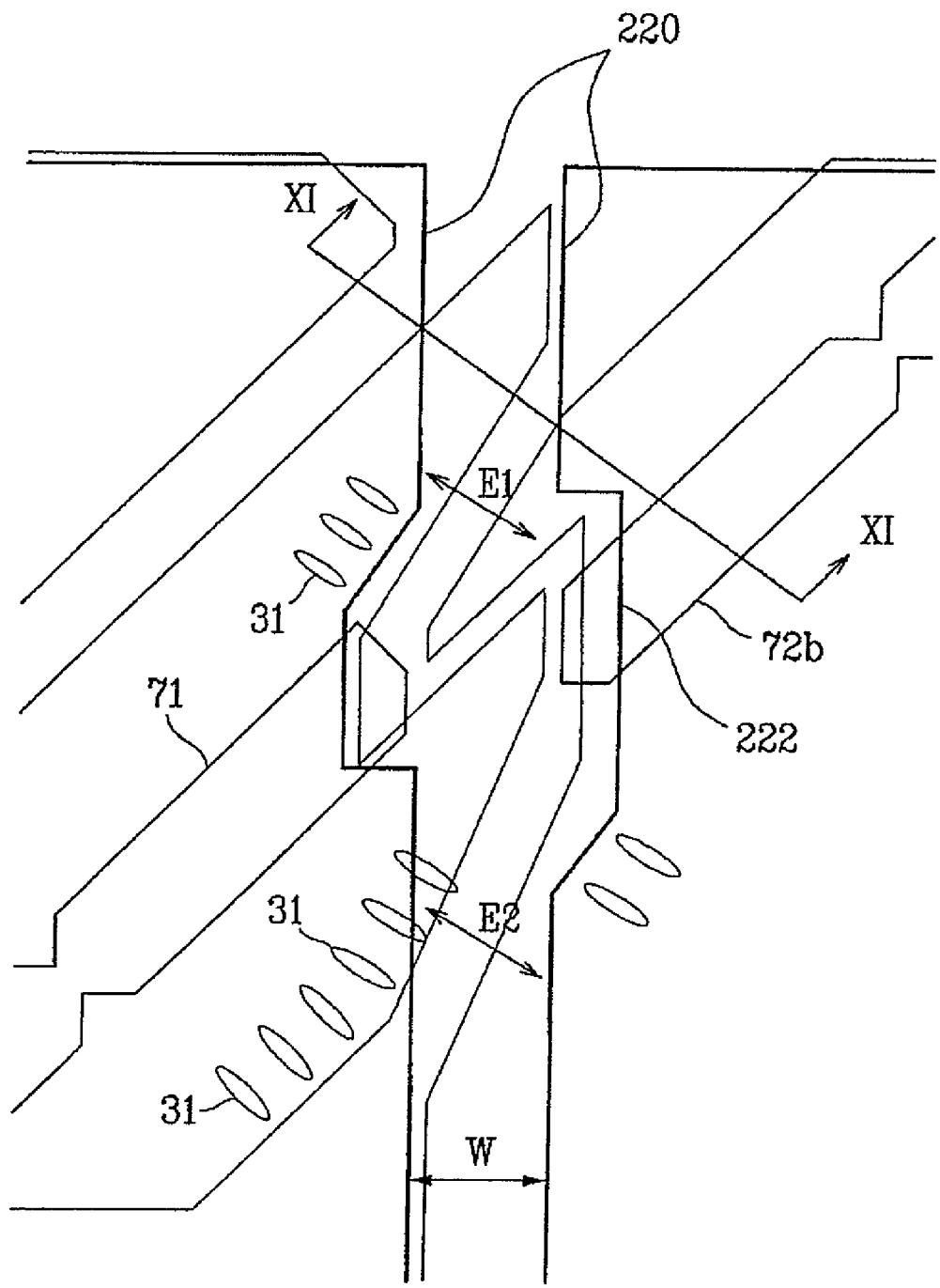
FIG. 6 is an enlarged view showing a portion between adjacent pixel electrodes of FIG. 1.

Now, a liquid crystal display apparatus according to an exemplary embodiment of the present invention will be described in detail with reference to FIGS. 1 to 6. FIG. 1 is a view showing a layout of a liquid crystal display apparatus according to an exemplary embodiment of the present invention. FIG. 2 is a view showing a layout of a thin film transistor panel for the liquid crystal display apparatus of FIG. 1. FIG. 3 is a view showing a layout of a common electrode panel for the liquid crystal display apparatus of FIG. 1. FIG. 4 is a cross sectional view showing the liquid crystal display apparatus taken along line IV-IV of FIG. 1. FIG. 5 is a view showing a layout of a common electrode and a pixel electrode of FIG. 1. FIG. 6 is an enlarged view showing a portion between adjacent pixel electrodes of FIG. 1.

The liquid crystal display apparatus includes a thin film transistor panel 100 and a common electrode panel 200 which face each other and a liquid crystal layer 300 interposed between the panels 100 and 200.

Firstly, the thin film transistor panel 100 will be described in detail with reference to FIGS. 1, 2, and 4.

A plurality of gate lines 121 and a plurality of storage electrode lines 131 are disposed on an insulating substrate 110 made of a transparent glass or a plastic material.

The gate lines 121 transmitting gate signals mainly extend in the transverse direction. The gate lines 121 include a plurality of gate electrodes 124 which protrude upwardly and downwardly and end portions 129 which have wide areas for connection to other layers or external driver circuits. A gate driver circuit which generates the gate signals may be mounted on a flexible printed circuit film attached on the substrate 110. Alternatively, the gate driver circuit may be directly mounted on the substrate 110. Otherwise, the gate driver circuit may be integrated in the substrate 110. In the case where the gate driver circuit is integrated in the substrate 110, the gate lines 121 are extended to be directly connected to the gate driver circuit.

The storage electrode lines 131 which are applied with predetermined voltages include stem lines which extend substantially in parallel to the gate lines 121, a plurality of storage electrode sets of first, second, third, and fourth storage electrodes 133a, 133b, 133c, and 133d, and a plurality of connection portions 133e. Each of the storage electrode lines 131 is disposed between adjacent two gate lines 121, and the stem line thereof is closer to the upper one of the two gate lines 121.

The first and second storage electrodes 133a and 133b extend in the longitudinal direction to face each other. The first storage electrode 133a includes a fixed end connected to the stem line and a free end opposite to the fixed end, and the free end includes a protrusion. The third and fourth storage electrodes 133c and 133d extend in slanted directions from substantially about the central portion of the first storage electrode 133a to the upper and lower ends of the second storage electrode 133b, respectively. The connection portions 133e are connected between adjacent storage electrode sets 133a-133d. However, various shapes and arrangement may be used for the storage electrode lines 131.

The gate lines 121 and the storage electrode lines 131 may be made of an aluminum-based metal such as for example, aluminum (Al) and an aluminum alloy, a silver-based metal such as silver (Ag) and a silver alloy, a copper-based metal such as copper (Cu) and a copper alloy, a molybdenum-based metal such as molybdenum (Mo) and a molybdenum alloy, chromium (Cr), tantalum (Ta) or titanium (Ti). However, the gate lines 121 and the storage electrode lines 131 may have a multi-layered structure including two conductive layers having different physical properties. One of the two conductive layers is made of a metal having a low resistivity, for example, an aluminum based metal, a silver based metal, and a copper based metal, to reduce signal delay or voltage drop of the gate lines 121 and the storage electrode lines 131. The other conductive layers are made of a material having a good contactness to other materials, particularly, ITO (indium tin oxide) and IZO (indium zinc oxide) such as, for example, a molybdenum based metal, chromium, titanium, and tantalum. An example of a combination in accordance with the exemplary embodiments is a combination of a lower chromium layer and an upper aluminum layer and a combination of a lower aluminum layer and an upper molybdenum layer. However, the gate lines 121 and the storage electrode lines 131 may be made of various metals and conductive materials. Side surfaces of the gate lines 121 and the storage electrode lines 131 are slanted with respect to a surface of the substrate 110, and the slanted angle is in a range of about 30° to about 80°.

A gate insulating layer 140 made of a silicon nitride $SiN_x$ or the like is formed on the gate lines 121 and the storage electrode lines 131.

A plurality of semiconductor stripes 151 made of a hydrogenated amorphous silicon (abbreviated to a-Si) or polysilicon are formed on the gate insulating film 140. The semiconductor stripes 151 mainly extend in the longitudinal direction and include a plurality of protrusions 154 which extend toward the gate electrodes 124. In addition, widths of the semiconductor stripes 151 are enlarged at regions near the gate lines 121 and the storage electrode lines 131 to cover wide areas thereof.

A plurality of line-shaped and island-shaped ohmic contacts 161 and 165 are formed on semiconductor stripes 151. The ohmic contacts 161 and 165 may be made of made of silicide or an n+ hydrogenated amorphous silicon which is heavily doped with n-type impurities such as phosphorus (P). The line-shaped ohmic contacts 161 include a plurality of the protrusions 163. Each pair of the protrusion 163 and the island-shaped ohmic contact 165 is disposed on the protrusion 154 of the semiconductor stripe 151.

Side surfaces of the semiconductor stripes 151 and the ohmic contacts 161 and 165 are also slanted with respect to the surface of the substrate 100, and the slanted angle is in a range of about 30° to about 80°.

A plurality of data lines 171, a plurality of drain electrodes 175, and a plurality of isolated metal pieces 178 are formed on the ohmic contacts 161 and 165 and the gate insulating film 140.

The data lines 171 transmitting data signals mainly extend in the longitudinal direction to intersect the gate lines 121 and the stem lines and the connection portions 133e of the storage electrode lines 131. The data lines 171 include a plurality of C-shaped source electrodes 173 which protrude toward the gate electrodes 124 and end portions 179 which have wide areas for connection to other layers or external driver circuits. A data driver circuit which generates the data signals may be mounted on a flexible printed circuit film attached on the substrate 110. Alternatively, the data driver circuit may be directly mounted on the substrate 110. Otherwise, the data driver circuit may be integrated in the substrate 110. In the case where the data driver circuit is integrated in the substrate 110, the data lines 171 are extended to be directly connected to the data driver circuit.

The drain electrode 175 is separated from the data line 171 and faces a source electrode 173 with the gate electrode 124 interposed therebetween. Each of the drain electrodes 175 has a wide end portion and a bar-shaped end portion. The bar-shaped end portion is surrounded by the source electrode 173.

One gate electrode 124, one source electrode, and one drain electrode 175 together with one protrusion 154 of one semiconductor stripe constitute one thin film transistor Q1. The channel of the thin film transistor is formed in the protrusion 154 between the source electrode 173 and the drain electrode 175.

The isolated metal piece 178 is disposed on the gate line 121 at a region near the first storage electrode 133a.

Also, the data lines 171 and the drain electrodes 175 may be made of, for example, molybdenum (Mo), a refractory metal such as chromium (Cr), tantalum (Ta), and titanium (Ti), or an alloy thereof. The data lines 171 and the drain electrodes 175 may have a multi-layered structure including a refectory metal layer and a low-resistivity conductive layer. An example of the multi-layered structure is a two-layered structure of a lower chromium or molybdenum (alloy) layer and an upper aluminum (alloy) layer and a three-layered structure of a lower molybdenum (alloy) layer/an intermediate aluminum (alloy) layer/an upper molybdenum (alloy) layer. However, instead of the aforementioned materials, the data lines 171, the drain electrodes 175, and the metal pieces 178 may also be made of various other metals or conductive materials.

The side surfaces of the data lines 171, the drain electrodes 175, and the metal pieces 178 are also slanted with respect to the surface of the substrate 110 at an angle ranging from about 30° to about 80°.

The ohmic contacts 161 and 165 are interposed only between the underlying semiconductor stripes 151 and the overlying data lines 171 and the drain electrodes 175 and reduce contact resistance therebetween. Although the widths of the semiconductor stripes 151 are smaller than those of the data lines 171 in most regions, the widths of the portions where the gate lines 121 and the storage electrode lines 121 intersect each other are enlarged as described above. Therefore, the profile of surfaces at the intersections is smoothed, so that the disconnection of the data lines 171 can be prevented. The semiconductor stripes 151 have exposed portions uncovered by the data lines 171 and the drain electrodes 175 such as portions disposed between the source electrodes 173 and the drain electrodes 175.

A protective layer (passivation layer) 180 is formed on the data line 171, the drain electrode 175, the metal pieces 178, and the exposed portions of the semiconductor stripes 151. The protective layer 180 is made of an inorganic insulating material or an organic insulating material, and a surface thereof may be planarized. Examples of the inorganic insulating material are silicon nitride and silicon oxide. The organic insulating material may be photosensitive, and a dielectric constant thereof is preferably about 4.0 or less. Alternatively, the protective layer 180 may have a double-layer structure of a lower inorganic layer and an upper organic layer to maintain desired insulating properties for the organic layer and protect the exposed portions of the semiconductor stripes 151.

A plurality of contact holes 182 and 185 which expose end portions of the data lines 171 and the drain electrodes 175, respectively, are formed on the protective layer 180. A plurality of contact holes 181 which expose end portions of the gate lines 121, a plurality of contact holes 183a which expose the protrusions of the free ends of the first storage electrodes 133a, and a plurality of contact holes 183b which expose portions of the storage electrode lines at regions near the fixed ends of the first storage electrodes 133a are formed on the protective layer 180 and the gate insulating layer 140.

A plurality of pixel electrodes 191, a plurality of overpasses 83, and a plurality of contact assistants 81 and 82 are formed on the protective layer 180. The components may be made of, for example, a transparent conducive material such as ITO and IZO or a reflective metal such as aluminum (Al), silver (Ag), chromium (Cr), and an alloy thereof The pixel electrode 191 is physically and electrically connected to the drain electrode 175 through the contact hole 185 and receives a data voltage applied by the drain electrode 175. The pixel electrode 191 applied with the data voltage together with a common electrode 270 which is disposed in the common electrode panel 200 and applied with a common voltage generates an electric field. The electric field determines alignment of liquid crystal molecules 31 in the liquid crystal layer 31 between the two electrodes 191 and 270.

According to the determined alignment of the liquid crystal molecules 31, polarization of the light passing through the liquid crystal layer 3 changes. The pixel electrode 191 and the common electrode 270 constitutes a capacitor (hereinafter, referred to as a liquid crystal capacitor) which sustains the applied voltage after the thin film transistor turns off The pixel electrodes 191 overlap the storage electrodes 133a to 133d and the storage electrode lines 131. The capacitors constructed by overlapping the pixel electrodes 191 and the drain electrodes electrically connected thereto with the storage electrode lines 131 are called storage capacitors. The storage capacitors increase the voltage storage capacity of the liquid crystal capacitors.

A central cutout portion 91, a lower cutout portion 92a, and an upper cutout portion 92b are formed on the pixel electrode 191. Therefore, the pixel electrode 191 is divided into a plurality of partitions by the cutout portions 91, 91a, and 91b. The cutout portions 91, 92a, and 92b have an inversion symmetry with respect to a virtual transverse central line bisecting the pixel electrode 191.

The lower and upper cutout portions 92a and 92b extend substantially in the slanted directions from the right side to the left side of the pixel electrode 191 and overlap the fourth and third storage electrodes 133d and 133c, respectively. The lower and upper cutout portions 92a and 92b are disposed in lower and upper half regions of the pixel electrode 191 with respect to a transverse central line thereof. The lower and upper cutout portions 92a and 92b extend in perpendicular to each other with slanted angles of about 45° with respect to the gate line 121.

The central cutout portion 91 extends along the transverse central line of the pixel electrode 191 and has an inlet at the right side of the pixel electrode. The inlet of the central cutout portion 91 has a pair of upper and lower slanted edges which are substantially parallel to the lower and upper cutout portions 92a and 92b, respectively.

Therefore, the lower half region of the pixel electrode 191 is divided into two partitions by the lower cutout portion 92a, and the upper half region of the pixel electrode 191 is divided into two partitions by the upper cutout portion 92b.

Referring to FIG. 5, the pixel electrode 191 has a pair of first primary edges 193 and 194 facing each other and a pair of second primary edges 195 and 196 connected to the first primary edges 193 and 194. The first primary edges 193 and 194 are substantially parallel to the gate line 121, and the second primary edges 195 and 196 have inner and outer envelopes 951, 961, 952, and 962. The inner and outer envelopes 951, 961, 952, and 962 of the second primary edges 195 and 196 are substantially perpendicular to the first primary edges 193 and 194. Left corners of the pixel electrode 191 is constructed with chamfered slanted edges 193c and 194c, and the chamfered slanted edges 193c and 194c have a slanted angle of about 45° with respect to the gate line 121.

The second primary edges 195 and 196 of the pixel electrode 191 have a plurality of sawteeth 910 and 920 which protrude from a plurality of longitudinal lines 915 and 916 on the inner envelopes 951 and 961 outwardly. The sawteeth 910 and 920 are symmetrical with respect to the transverse central line of the pixel electrode 191.

Each of the sawteeth 910 (920) has a first slanted edge 911 (921), a second slanted edge 912 (922), and a top edge 913 (923) which is disposed on the outer envelop 952 (962) to connect the first and second slanted edges. The first slanted edge 911 (912) has an obtuse angle of about 135° or more with respect to the longitudinal line 915 (925), and the second edge 912 (922) has an angle of about 45° with respect to the longitudinal line 915 (925). The extension lines of the first and second slanted edges 911 (912) and 912 (922) intersect each other with an acute angle of about 45° or less. In addition, the second edges 912 and 922 are substantially parallel to the lower and upper cutout portions 92a and 92b and located on the extension lines of the cutout portions 92a and 92b, respectively. The first edges 911 and 921 have an angle of about 45° or less or about 135° or more with respect to the lower and upper cutout portions 92a and 92b.

The upper portions of the sawteeth 910 and 920, that is, portions near the top edges 913 and 923 thereof overlap the data line 171. The sawteeth 920 of the right edge 196 of the pixel electrode 191 which are located at the left of the data line 171 are engaged with the sawteeth 910 of the pixel electrode 191 which are located at the left of the data line 171. In addition, the facing edges of the engaged sawteeth 910 and 920 are parallel to each other.

The number of the sawteeth 910 and 920 are in close relation to the number of the partitions of the pixel electrode 191 divided by the cutout portions 91, 92a, and 92b or the number of the cutout portions 91, 92a, and 92b. The number of the partitions of the pixel electrode 191 and the number of the sawteeth 910 and 920 may vary according to design factors such as a size of the pixel electrode 191, the ratio of lengths of the transverse and longitudinal sides of the pixel electrode 191, and the types or characteristics of the liquid crystal layer 3.

The overpass 83 is disposed across the gate line 121 and connected to the exposed portion of the storage electrode line 131 and the exposed end portion of the free end of the first storage electrode 133a through the contact holes 183b and 18b which are located at the opposite positions with respect to the gate line 121, respectively. The storage electrodes 133a and 133b and the storage electrode line 131 together with the overpasses 83 may be used to repair defects of the gate lines 121, the data lines 171, and the thin film transistors.

The contact assistants 81 and 82 are connected to the end portion 129 of the gate line 121 and the end portion 179 of the data line 171 through the contact holes 181 and 182, respectively. The contact assistants 81 and 82 compensate for the adhesiveness of the end portions 129 of the gate line 121 and the end portions 179 of the data lines 171 to external apparatuses and also protect these portions.

Now, the common electrode panel 200 will be described with respect to FIGS. 1, 3, and 4.

A light blocking member 220 is formed on the insulating substrate 210 made of a transparent glass or a plastic material. The light blocking member 220 is called a black matrix and prevents light leakage between the pixel electrodes 191. The light-blocking member 220 includes a plurality of opening portions 225 which face the pixel electrodes 191 and have a shape of a substantial rectangle. A width W of portions 221 of the light blocking member 220 corresponding to the date lines 171 is substantially the same as that of the data lines 171. However, the widths may be defined by taking into consideration alignment error of the panels 100 and 200. The light blocking member 220 includes enlarged portions 222 which block spaces between the engaged sawteeth 910 and 920 which protrude outwardly from the data lines 171. The light blocking member 220 may include portions corresponding to the thin film transistors.

A plurality of color filters 230 are formed on the substrate 210. Most portions of the color filters 230 are disposed in regions surrounded by the light-blocking member 220. Moreover, the color filters 230 extend along rows of the pixel electrodes 191 in the longitudinal direction. Each of the color filters 230 can display one of primary colors such as red, green, and blue.

A cover film 250 is formed on the color filters 230 and the light-blocking member 220. The cover film 250 may be made of an (organic) insulating material. The cover film 250 prevents the color filters 230 from being exposed and provides a planarized surface. The cover film 250 may be omitted.

A common electrode 270 is formed on the cover film 250. The common electrode 270 is made of a transparent conductive material such as ITO or IZO. A plurality of cutout portion sets of cutout portions 71, 72a, and 72b are formed on the common electrode 270.

One cutout portion set 71-72b faces one pixel electrode 191 and includes a central cutout portion 71, a lower cutout portion 72a, and an upper cutout portion 72b. The cutout portions 71, 72a, and 72b are disposed between the adjacent cutout portions 91, 92a, and 92b of the pixel electrode 191 or between the cutout portions 92a and 92b and the chamfered edge of the pixel electrode 191.

In addition, each of the cutout portions 71, 72a, and 72b extends substantially in parallel to the lower or upper cutout portion 92a or 92b of the pixel electrode 191 and include at least one slanted portion. Each of the slanted portions includes at least one recessed notch 7. The cutout portions 71, 72a, and 72b have an inversion type of symmetry with respect to the transverse central line of the pixel electrode 191.

Each of the lower and upper cutout portions 72a and 72b includes a slanted portion and a transverse portion. The slanted portion extends substantially from the upper or lower side to the left side of the pixel electrode 191 to overlap the longitudinal side of the pixel electrode 191. A long side facing the slanted portion intersects the first and second slanted edges 911, 912, 921, and 922 of the protrusions of the pixel electrode 191 or extension lines thereof or is located on the extension lines. The transverse portion extends from the end of the slanted portion along the transverse side of the pixel electrode 191 with an obtuse angle with respect to the slanted portion and overlaps the transverse side.

The central cutout portion 71 includes a central transverse portion and a pair of slanted portions. The central transverse portion extends substantially from the left side of the pixel electrode 191 along the transverse central line of the pixel electrode 191 in the right direction. A pair of the slanted portions extend substantially in parallel to the lower and upper cutout portions 72a and 72b from the end of the central transverse portion to the right side of the pixel electrode 191 with an obtuse angle with respect to the central transverse portion, respectively.

The number of the cutout portions 71, 72a, and 72b may vary according to the design factors, and the light-blocking member 220 overlaps the cutout portions 71, 72a, and 72b to prevent the light leakage in the vicinity of the cutout portions 71, 72a, and 72b. Spacers 320 made of an insulating material are disposed on the common electrode panel 200 to maintain a constant interval between the panels 100 and 200.

Alignment films 11 and 21 are coated on inner surfaces of the panels 100 and 200, respectively. The alignment films 11 and 21 may be a vertically-aligned film. Polarizers 12 and 22 are disposed on outer surfaces of the panels 100 and 200, respectively. The transmission axes of the polarizers 12 and 22 are perpendicular to each other and, have an angle, for example of about 45° with respect to the slanted cutout portions 92a and 92b and the slanted portions of the cutout portions 71, 72a, and 72b. In the case of a reflective liquid crystal display apparatus, one of the two polarizers 12 and 22 may be omitted.

The liquid crystal display apparatus according to the present exemplary embodiment may further include a phase retardation film for compensating for the retardation of the liquid crystal layer 3. In addition, the liquid crystal display apparatus may include a backlight unit for supplying light to the polarizers 12 and 22, the phase retardation film, the panels 100 and 200, and the liquid crystal layer 3.

The liquid crystal layer 3 has a negative anisotropic permittivity, and the liquid crystal molecules 31 of the liquid crystal layer 3 are aligned so that the major axes thereof are perpendicular to the surfaces of the two panels 100 and 200 when no electric field is applied to the liquid crystal molecules. Consequently, incident light cannot pass through the perpendicular polarizers 12 and 22 so as to be blocked.

When the common voltage and the data voltage are applied to the common electrode 270 and the pixel electrode 191, respectively, a primary electric field is generated in a direction substantially perpendicular to the surfaces of the panels 100 and 200. Hereinafter, the pixel electrode 191 and the common electrodes 270 may be collectively referred to as electric field generating electrodes. In response to the electric field, the liquid crystal molecules 31 have a tendency to change the major axis direction to be perpendicular to the direction of the electric field.

Referring to FIGS. 1 and 5, one cutout portion set 71-72b, 91-92b divides the pixel electrode 191 into a plurality of sub areas. Each of the sub areas has two primary edges which are slanted with respect to the first primary edges 193 and 194 of the pixel electrode 191 and secondary edges which are some portions of the edges 193 to 196 of the pixel electrode 191. One of the primary edges of each sub area is constructed by combining one edge of the cutout portions 91, 92a, and 92b of the pixel electrode 191 with the secondary edges 912 and 922 of the sawteeth 910 and 920 or constructed with the chamfered slanted edges 193c and 194c. The other of the primary edges is constructed with a single edge of the slanted portion of the cutout portions 71, 72a, and 72b of the common electrode 270 or constructed by combining the slanted portions of the cutout portions 71, 72a, and 72b with the slanted edges 912 and 922 of the sawteeth 910 and 920. Therefore, the lengths of the primary edges of the sub areas are different from each other, and the adjacent primary edges of the adjacent sub areas are disposed to deviate from each other. One of the secondary edges of the sub areas is the first slanted edge 911 (921) of each of the sawteeth 910 (920) of the pixel electrode 191 and has an angle of about 135° or more with respect to the primary edges. The primary edges have an angle of about 45° with respect to the polarization axes of the polarizers 12 and 22 to maximize light efficiency.

The primary edges are longer than the secondary edges, and at least one of the secondary edges has an angle of about 135° or more wither respect to the primary edges. Therefore, in the primary electric field on the sub areas, the horizontal component thereof perpendicular to the primary edges is much larger than the horizontal component thereof parallel to the primary edges. As a result, most of the liquid crystal molecules 31 on the sub areas are tilted in the directions perpendicular to the primary edges.

Since most of the liquid crystal molecules 31 on the sub areas are tilted in the directions perpendicular to the primary edges, the tilted directions may roughly include four directions. Moreover, since the liquid crystal molecules 31 can be adjusted to have various tilted angles, it is possible to increase the reference viewing angle of the liquid crystal display apparatus.

As shown in FIG. 6, secondary electric fields (lateral fields) E1 and E2 are additionally generated from the difference between voltages of the pixel electrodes 191. Directions of the secondary electric fields E1 and E2 are mainly perpendicular to one of the secondary edges of the sub areas, that is, the first slanted edge 911 (921) of the sawteeth 910 (920). Therefore, the directions of the secondary electric fields E1 and E2 have an angle of about 5° or less with respect to the direction of the horizontal component of the primary electric field. As a result, the secondary electric fields E1 and E2 between the pixel electrodes 191 have a tendency to fix the tilted directions of the liquid crystal molecules 31.

By providing the sawteeth 910 and 920 having the slanted edges 911 and 922 having an angle of about 135° or more with respect to the cutout portions 91, 92a, 92b, 71, 72a, and 72b to the transverse sides of the pixel electrode 191, the direction of the horizontal component of the primary electric field and the secondary electric field in the vicinities of the longitudinal sides 195 and 196 of the pixel electrode 191 are allowed to be substantially equal to the direction of the horizontal component of the primary electric field in the vicinities of the sub areas. Also, by shortening the distance between the pixel electrodes 191, the strength of the secondary electric field is allowed to increase. As a result, the tilted direction of the liquid crystal molecules 31 located in the vicinities of the sawteeth 910 and 920 of the pixel electrode 191 are allowed to be substantially equal to the tilted direction of the liquid crystal molecules 31 located at the centers of the sub areas, so that the vicinities of the sawteeth 910 and 920 can be used as an effective display region.

The addition of the sawteeth 910 and 920, in the exemplary embodiments of the present invention provides increased transmittance for the liquid crystal display apparatus. In addition, since with the exemplary embodiments of the present invention it is not necessary to provide the portions overlapping the longitudinal sides of the pixel electrode 191 to the cutout portions 71, 72a, and 72b of the common electrode 270, the aperture ratio of the liquid crystal display apparatus can thereby also be increased.

Further, with the exemplary embodiment of the present invention, the third and fourth storage electrodes 133c and 133d extending in the slanted directions serve as control electrodes for controlling the liquid crystal molecules located the aforementioned portions, so that texture which may occur at the central portions of the slanted cutout portions 92a and 92b can be reduced.

The widths of the cutout portions 71, 72a, 72b, 91, 92a, and 92b may be in a range of, for example, from about 9 μm to about 12 μm.

The notches of the cutout portions 71, 72a, and 72b of the common electrode 270 control the tilted direction of the liquid crystal molecules 31 located above the cutout portions 71, 72a, and 72b. Such notches 7 may be formed in the cutout portions 91, 92a, and 92b of the pixel electrode 191.

The shapes and arrangements of the cutout portions 71, 72a, 72b, 91, 92a, and 92b and the notches thereof may be modified in various manners.

At least one of the cutout portions 71, 72a, 72b, 91, 92a, and 92b may be replaced with a protrusion or a depression. The protrusions may be made of an organic or inorganic material and disposed above or under the electric field generating electrodes 191 and 270. Now, a liquid crystal display apparatus according to another exemplary embodiment of the present invention will be described in detail with reference to FIGS. 7 to 10.

Figure 7:
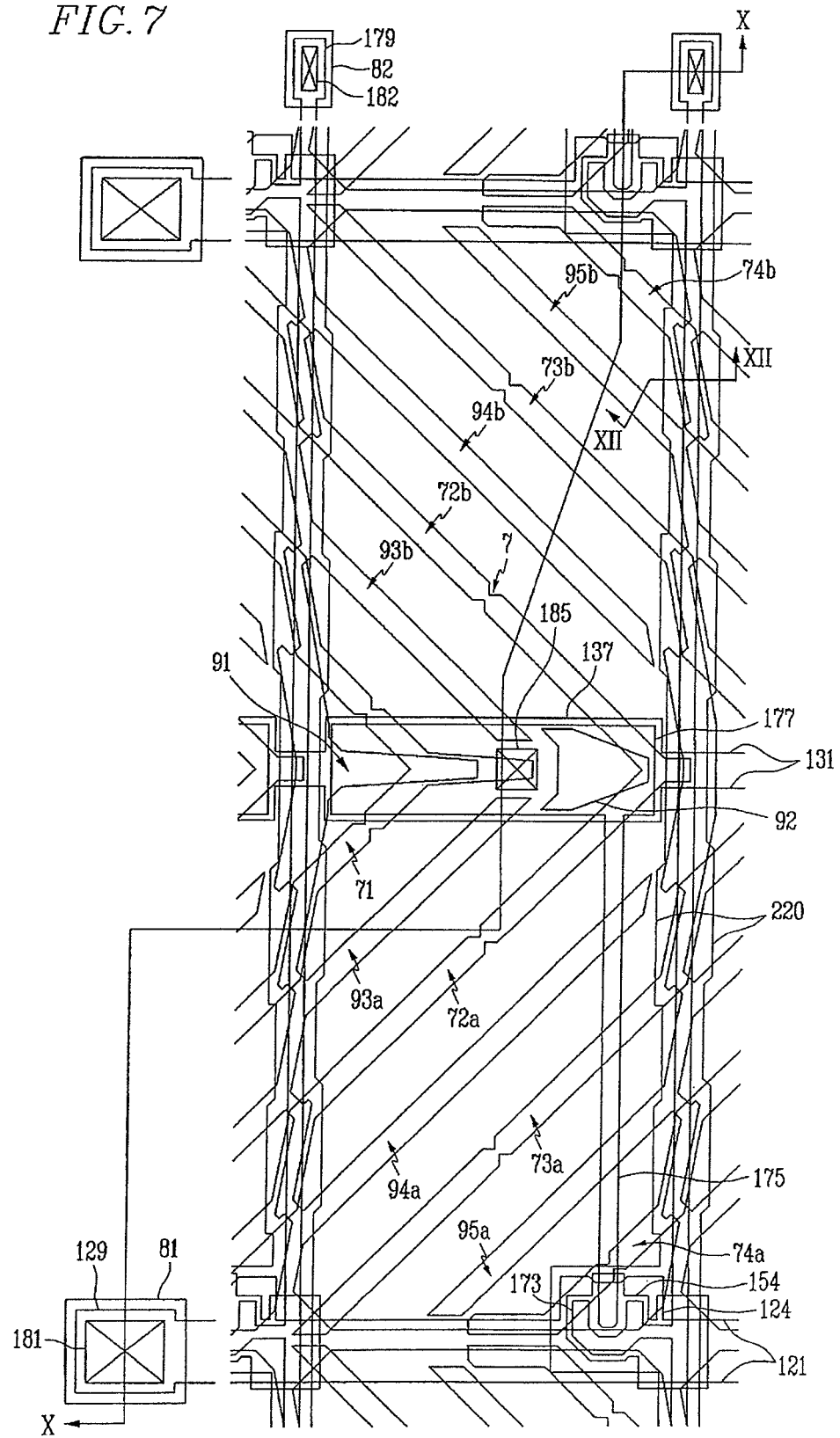
FIG. 7 is a view showing a layout of a liquid crystal display apparatus according to an exemplary embodiment of the present invention.
Figure 8:
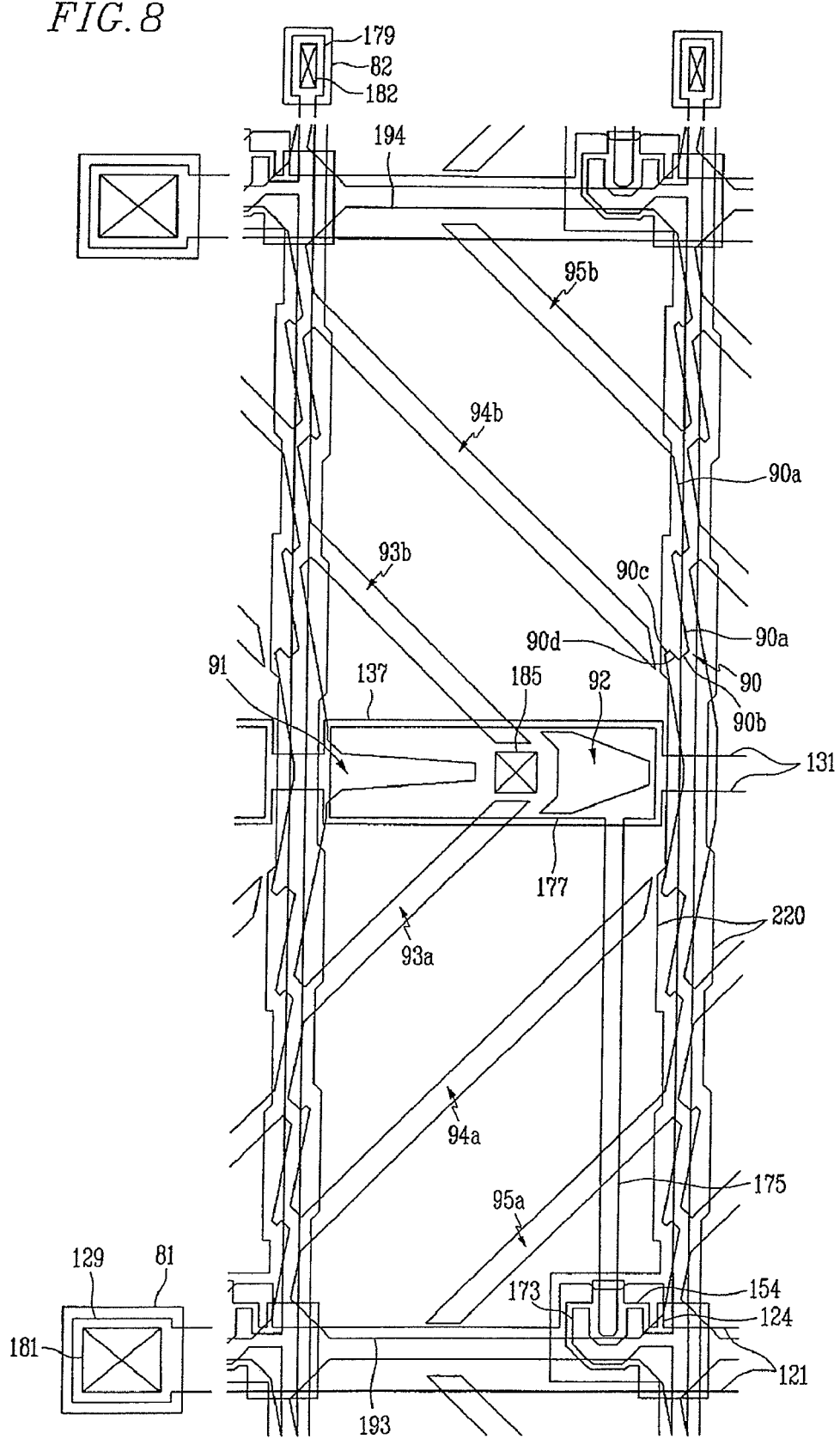
FIG. 8 is a view showing a layout of a thin film transistor panel for the liquid crystal display apparatus of FIG. 7.
Figure 9:
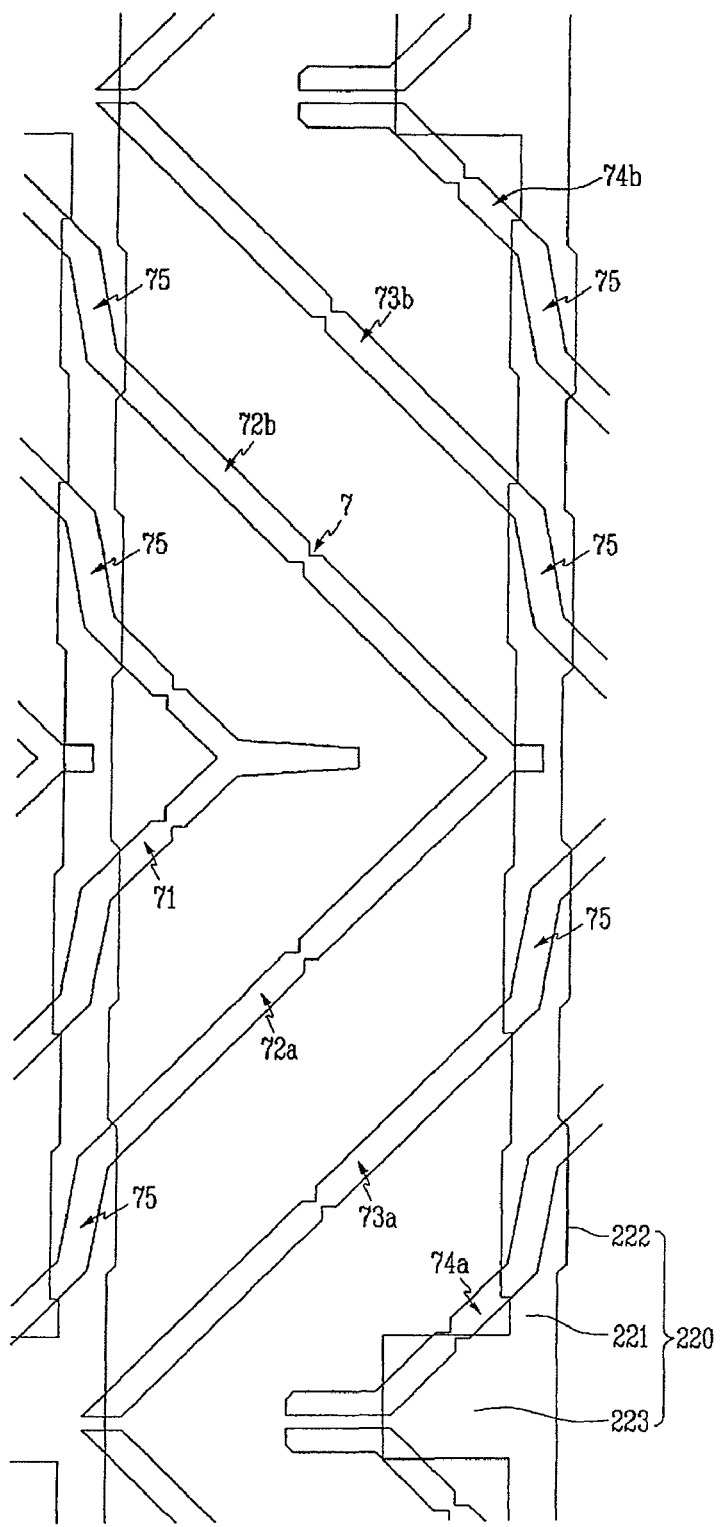
FIG. 9 is a view showing a layout of a common electrode panel for the liquid crystal display apparatus of FIG. 7.
Figure 10:
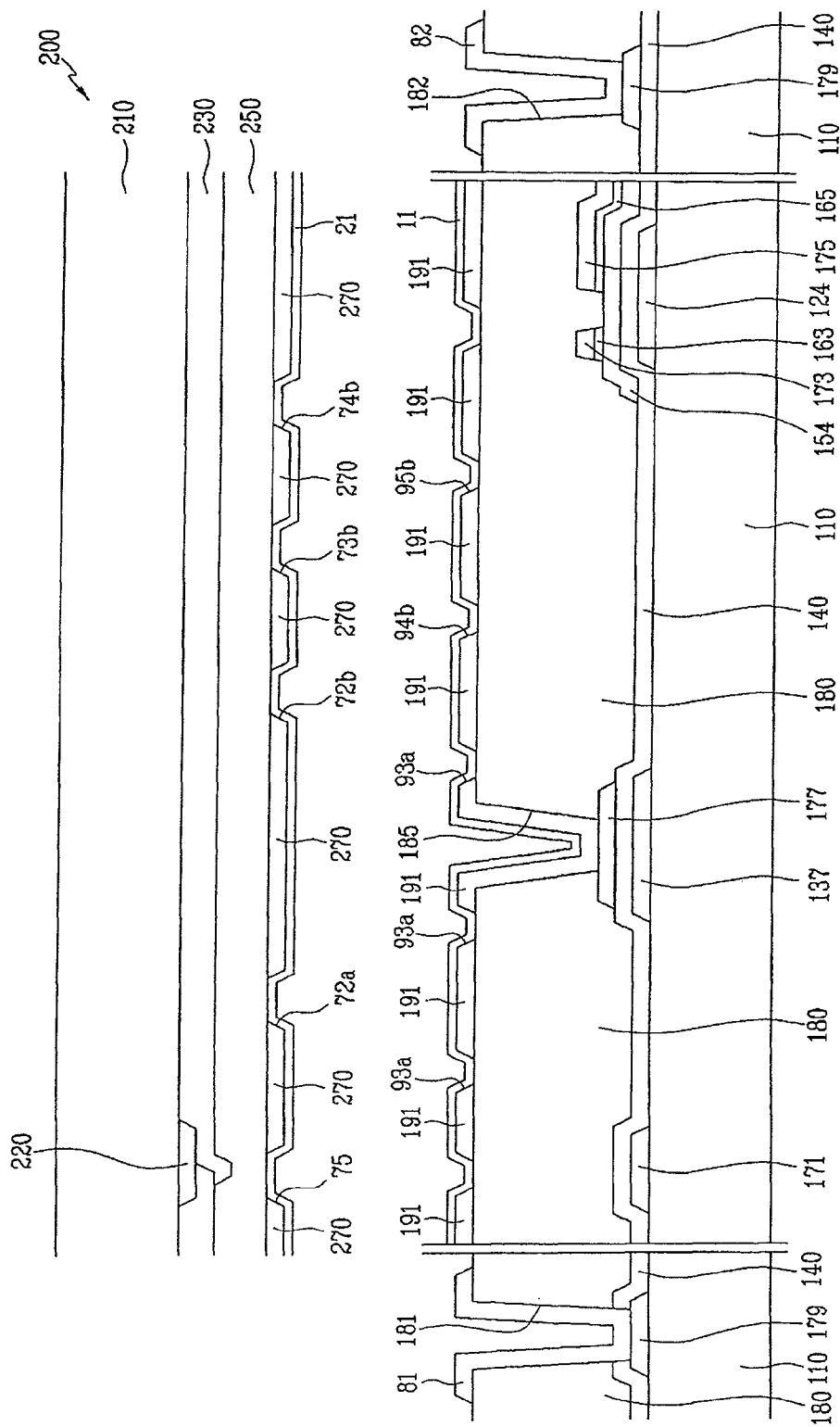
FIG. 10 is a cross sectional view showing the liquid crystal display apparatus taken along line X-X of FIG. 7.

FIG. 7 is a view showing a layout of a liquid crystal display apparatus according to another exemplary embodiment of the present invention. FIG. 8 is a view showing a layout of a thin film transistor panel for the liquid crystal display apparatus of FIG. 7. FIG. 9 is a view showing a layout of a common electrode panel for the liquid crystal display apparatus of FIG. 7. FIG. 10 is a cross sectional view showing the liquid crystal display apparatus taken along line X-X of FIG. 7.

Referring to FIGS. 7 to 10, the liquid crystal display apparatus includes a thin film transistor panel 100 and a common electrode panel 200 which face each other and a liquid crystal layer 300 interposed between the panels 100 and 200.

Firstly, the thin film transistor panel 100 will be described in detail with reference to FIGS. 7, 8, and 10.

A plurality of gate lines 121 and a plurality of storage electrode lines 131 are disposed on an insulating substrate 110 made of a transparent glass or a plastic material.

The gate lines 121 transmitting gate signals mainly extend in the transverse direction. The gate lines 121 include a plurality of gate electrodes 124 which protrude upwardly and end portions 129 which have wide areas for connection to other layers or external driver circuits. The storage electrode lines 131 which are applied with predetermined voltages extend substantially parallel to the gate lines 121. Each of the storage electrode lines 131 is disposed between adjacent two gate lines 121 and separated by substantially the same distance from the two gate lines 121. The storage electrode lines 131 include storage electrodes 137 which are enlarged upwardly and downwardly. However, various shapes and arrangement may be used for the storage electrode lines 131.

Side surfaces of the gate lines 121 and the storage electrode lines 131 are slanted with respect to a surface of the substrate 110, at an angle in the range of about 30° to about 80°.

A gate insulating layer 140 made of a silicon nitride $SiN_x$ or the like is formed on the gate lines 121 and the storage electrode lines 131.

A plurality of island-shaped semiconductor members 154 made of a hydrogenated amorphous silicon or polysilicon are formed on the gate insulating film 140. The semiconductor members 154 are disposed on the gate electrodes 124 and include expansion portions covering boundaries of the gate lines 121. A plurality of island-shaped ohmic contacts 163 and 165 are formed on semiconductor members 154. The ohmic contacts 163 and 165 may be made of made of silicide or an n+ hydrogenated amorphous silicon which is heavily doped with n-type impurities such as phosphorus (P). A pair of the ohmic contacts 163 and 165 are disposed on the semiconductor member 154.

Side surfaces of the semiconductor members 154 and the ohmic contacts 163 and 165 are also slanted with respect to the surface of the substrate 100, and the slanted angle is in a range of about 30° to about 80°.

A plurality of data lines 171 and a plurality of drain electrodes 175 are formed on the ohmic contacts 163 and 165 and the gate insulating film 140.

The data lines 171 transmitting data signals mainly extend in the longitudinal direction to intersect the gate lines 121 and the storage electrode lines 131. The data lines 171 include a plurality of source electrodes 173 which protrude toward the gate electrodes 124 and end portions 179 which have wide areas for connection to other layers or external driver circuits. The drain electrode 175 is separated from the data line 171 and faces a source electrode 173 with respect to the gate electrode 124 interposed therebetween. Each of the drain electrodes 175 has a wide end portion and a bar-shaped end portion. The bar-shaped end portion is partially surrounded by the U-shaped source electrode 173.

For example, side surfaces of the data lines 171 and the drain electrodes 175 may also be slanted with respect to the surface of the substrate 110 at an angle ranging from about 30° to about 80°.

The ohmic contacts 163 and 165 are interposed only between the underlying semiconductor members 154 and the overlying data lines 171 and the drain electrodes 175 and reduce contact resistance therebetween.

A protective layer (passivation layer) 180 is formed on the data line 171, the drain electrode 175, and the exposed portions of the semiconductor members 154. The protective layer 180 is made of an inorganic insulating material or an organic insulating material, and a surface thereof may be planarized.

A plurality of contact holes 182 and 185 which expose end portions of the data lines 171 and the drain electrodes 175, respectively, are formed on the protective layer 180. A plurality of contact holes 181 which expose end portions 129 of the gate lines 121 are formed on the protective layer 180 and the gate insulating layer 140.

A plurality of pixel electrodes 191 and a plurality of contact assistants 81 and 82 are formed on the protective layer 180. The components may be made of a transparent conducive material such as, for example, ITO and IZO or a reflective metal such as, for example, aluminum (Al), silver (Ag), chromium (Cr), and an alloy thereof.

The pixel electrode 191 is physically and electrically connected to the drain electrode 175 through the contact hole 185 and receives a data voltage applied by the drain electrode 175. The pixel electrodes 191 overlap the storage electrodes 137 and the storage electrode lines 131.

The pixel electrode 191 has a pair of first primary edges 193 and 194 facing each other and second primary edges which are connected to the first primary edges 193 and 194 and include a plurality of sawteeth 90 and lower edges 90c connecting the sawteeth 90. Each of the sawteeth 90 includes first and second slanted edges 90a and 90d which are slanted with respect to the first primary edges 193 and 194 and an upper edge 90b. The first primary edges 193 and 194 are parallel to the gate lines 121. The first primary edges 193 and 194 and the second primary edges constitute an approximate rectangle. The pixel electrode 191 has the four chamfered corners which has an angle of about 45° with respect to the gate lines 121.

The first slanted edge 90a partially overlaps the data line 171. The first slanted edges 90a of the adjacent two pixel electrodes 191 are disposed to face each other in parallel to each other.

First and second central cutout portions 91 and 92, lower slanted cutout portions 93a, 94a, and 95a, and upper slanted cutout portions 93b, 94b, and 95b are formed on the pixel electrode 191. Therefore, the pixel electrode 191 is divided into a plurality of sub areas by the cutout portions 91 to 95b. The cutout portions 91 to 95b have an inversion symmetry with respect to the storage electrode line 131. The lower slanted cutout portions 93a, 94a, and 95a and the upper slanted cutout portions 93b, 94b, and 95b extend substantially in the slanted directions from the right side to the left, upper, or lower side of the pixel electrode 191. The lower slanted cutout portions 93a, 94a, and 95a and the upper slanted cutout portions 93b, 94b, and 95b are disposed in lower and upper half regions of the pixel electrode 191 with respect to the storage electrode line 131.

The lower slanted cutout portions 93a, 94a, and 95a and the upper slanted cutout portions 93b, 94b, and 95b extend in perpendicular to each other with slanted angles of about 45° with respect to the gate line 121. Each of the lower slanted cutout portions 93a, 94a, and 95a and the upper slanted cutout portions 93b, 94b, and 95b has an inlet at the right or left side of the pixel electrode 191. The inlets may be connected to the concave portions 90c.

The first slanted edges 90a of the sawteeth 90 of the second primary edges have an obtuse angle with respect to the slanted cutout portions 93a to 95a and 93b to 95b, and the second slanted edges 90d thereof are substantially parallel to the slanted cutout portions 93a to 95a and 93b to 95b.

The first central cutout portion 91 extends along the storage electrode line 131 and has an inlet toward the left side of the pixel electrode 191. The second central cutout portion 92 has a shape of polygon of which upper and lower corners protrude toward the left sides of the pixel electrode 191.

As a result, the lower half region of the pixel electrode 191 is divided into four partitions by the lower slanted cutout portions 93a, 94a, and 95a, and the upper half region thereof is also divided into four partitions by the upper slanted cutout portions 93b, 94b, and 95b.

The number of the partitions and the number of the cutout portions may vary according to design factors such as a size of the pixel electrode 191, a ratio of lengths of the transverse and longitudinal sides of the pixel electrode 191, and types or characteristics of the liquid crystal layer 3.

The contact assistants 81 and 82 are connected to the end portion 129 of the gate line 121 and the end portion 179 of the data line 171 through the contact holes 181 and 182, respectively.

Now, the common electrode panel 200 will be described with respect to FIGS. 7, 9, and 10.

A light blocking member 220 is formed on the insulating substrate 210 made of a transparent glass or a plastic material. The light blocking member 220 include line-shaped portions 221 corresponding to the data lines 171, enlarged portions 222 formed by enlarging some portions of the light blocking member 220, and plane-shaped portions 223 corresponding to the thin film transistors. The light blocking member 220 prevents light leakage between the pixel electrodes 191 and defining opening regions facing the pixel electrodes. However, the light blocking member 220 may further include a plurality of opening portions facing the pixel electrodes 191 and having substantially the same shape as the pixel electrodes 191.

A plurality of color filters 230 are formed on the substrate 210. Most portions of the color filters 230 are disposed in regions surrounded by the light-blocking member 220. In addition, the color filters 230 extend along rows of the pixel electrodes 191 in the longitudinal direction. Each of the color filters 230 can display one of primary colors such as red, green, and blue.

A cover film 250 is formed on the color filters 230 and the light-blocking member 220. The cover film 250 may be made of an (organic) insulating material. The cover film 250 prevents the color filters 230 from being exposed and provides a planarized surface. The cover film 250 may be omitted.

A common electrode 270 is formed on the cover film 250. The common electrode 270 is made of a transparent conductive material such as ITO and IZO.

A plurality of cutout portions 71, 72a, 72b, 73a, 73b, 74a, 74b, and 75 are formed on the common electrode 270.

One cutout portion set 71-75 faces one pixel electrode 191 and includes a central cutout portion 71, first to third lower slanted cutout portions 72a, 73a, and 74a, first to third upper slanted cutout portions 72b, 73b, and 74b, and a connection portions 75. The cutout portions 71, 72a, 72b, 73a, 73b, 74a, and 74b are disposed between the adjacent cutout portions 91, 92, 93a, 93b, 94a, 94b, 95a, and 95b of the pixel electrode 191 or between the cutout portions 91, 92, 93a, 93b, 94a, 94b, 95a, and 95 and the chamfered edge of the pixel electrode 191. In addition, each of the cutout portions 71, 72a, 72b, 73a, 73b, 74a, and 74b extends substantially in parallel to the lower cutout portions 93a, 94a, and 95a or upper cutout portions 93b, 94b, and 95b of the pixel electrode 191 and include at least one slanted portion.

The first lower and upper slanted cutout portions 72a and 72b extend substantially from the right side to the left side of the pixel electrode 191. The second lower and upper slanted cutout portions 73a and 73b extend substantially from the right side to the upper and lower left corners of the pixel electrode 191, respectively. The third lower and upper slanted cutout portions 74a and 74b extend substantially from the right side to the lower and upper sides of the pixel electrode 191, respectively. The third lower and upper slanted cutout portions 74a and 74b include terminated transverse portions which extend from the ends of the third lower and upper slanted cutout portions 74a and 74b to overlap the lower and upper sides of the pixel electrode 191. The terminated transverse portions have an obtuse angle with respect to the slanted cutout portions 74a and 74b.

The central cutout portion 71 includes a central transverse portion and a pair of slanted portions. The central transverse portion extends substantially from the right side of the pixel electrode 191 along the storage electrode line 131 in the left direction. A pair of the slanted portions extend substantially in parallel to the lower and upper cutout portions 72a, 72b, 73a, 73b, 74a, and 74b from the end of the central transverse portion to the left side of the pixel electrode 191.

One end of the one slanted portion of the central cutout portion 71 and one end of the second lower cutout portion 73a of the adjacent pixel electrode are connected with one of the connection portions 75. Additionally, one end of the other slanted portion of the central cutout portion 71 and one end of the second upper cutout portion 73b of the adjacent pixel electrode are connected with one of the connection portions 75. Also, one end of the first lower slanted cutout portion 72a and one end of the third lower slanted cutout portion 74a of the adjacent pixel electrode are connected with one of the connection portions 75. Moreover, one end of the first upper slanted cutout portion 72b and one end of the third upper slanted cutout portion 74b of the adjacent pixel electrode are connected with one of the connection portions 75. The connection portions 75 are parallel to the first slanted edges 90a of the pixel electrode 191 and located at portions corresponding to the data line 171. A width of the connection portions 75 is larger by about 8 μm than an interval between the adjacent pixels 191. The enlarged portions 222 of the light blocking member 220 may have a width larger than the other portions corresponding to the connection portions 75.

Thus, by providing the sawteeth to the side of the pixel electrode 191 adjacent to the data line 171, as described above in the exemplary embodiment shown in FIGS. 1 to 4, the secondary electric field generated between the adjacent pixel electrodes 191 can control the alignment of the liquid crystal molecules 31 in the sub areas. In addition, by providing the connection portions 75 at the positions corresponding to the regions where the first slanted edges 90a of the adjacent two pixel electrodes 191 face each other, the alignment of the liquid crystal molecules 31 in the sub areas can be controlled as well.

Such effects will be described with reference to FIGS. 11 and 12.

Figure 11:
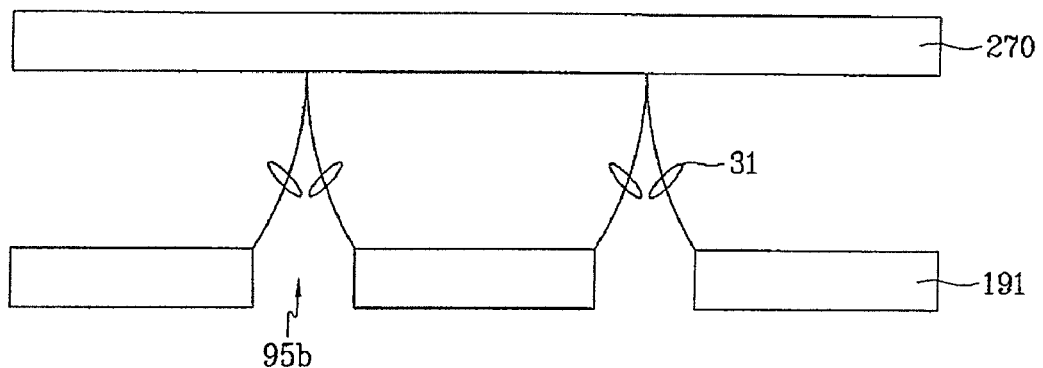
FIG. 11 is a cross sectional view taken along line XI-XI of FIG. 6.

FIG. 11 is a cross sectional view taken along line XI-XI of FIG. 6. FIG. 12 is a cross sectional view taken along line XII-XII of FIG. 7.

Referring to FIG. 11, the electric field generated between the pixel electrodes 191 and the common electrode 270 includes the secondary electric field having a field direction for interfering with the uniform alignment of the liquid crystal molecule in the sub areas at the boundaries of the adjacent pixel electrodes 191. Therefore, in the sub areas, the liquid crystal molecules collide with each other, so that the alignment of the liquid crystal molecules may be disturbed.

Figure 12:
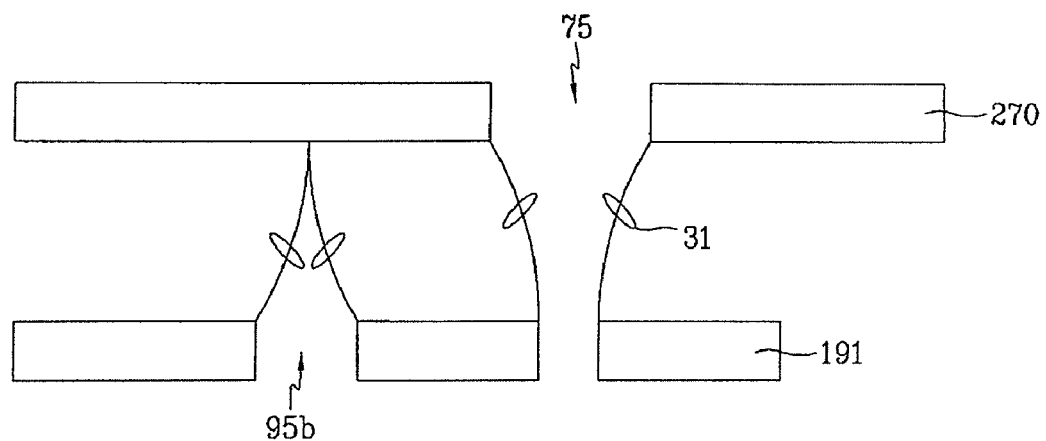
FIG. 12 is a cross sectional view taken along line XII-XII of FIG. 7.

However, according to the exemplary embodiment of the present invention, since the connection portions 75 are provided at the positions corresponding to the regions where the first slanted edges 90a of the adjacent two pixel electrodes 191 face each other, the direction of the electric field generated between the common electrode 280 and the pixel electrodes 191 changes due to the connection portions of the common electrode 270 as shown in FIG. 12. As a result, the secondary electric field is generated in such a direction that the uniform alignment of the liquid crystal molecules 31 in the sub areas can be controlled. Accordingly, unlike FIG. 11, the liquid crystal molecules cannot collide with each other, so that texture can be reduced.

Furthermore, according to the exemplary embodiment of the present invention, a plurality of convex notches 7 which are periodically disposed with a predetermined interval may be provided in the cutout portions 71 to 74b.

The number and directions of the cutout portion 71 to 75 may vary according to design factors.

Alignment films 11 and 21 are coated on inner surfaces of the panels 100 and 200, respectively. The alignment films 11 and 21 may be a vertically-aligned film. Polarizers are disposed on outer surfaces of the panels 100 and 200, respectively. The transmission axes of the polarizers are perpendicular to each other, and one of the transmission axes is preferably parallel to the gate lines 121. In the case of a reflective liquid crystal display apparatus, one of the two polarizers may be omitted.

The liquid crystal display apparatus may include a backlight unit for supplying light to the polarizers, the panels 100 and 200, and the liquid crystal layer 3.

The liquid crystal layer 3 has a negative anisotropic permittivity, and the liquid crystal molecules 31 of the liquid crystal layer 3 are aligned so that major axes thereof are perpendicular to the surfaces of the two panels 100 and 200 when no electric field is applied to the liquid crystal molecules. Therefore, incident light cannot pass through the perpendicular polarizers so as to be blocked.

The above-described exemplary embodiments may be applied to the later-described exemplary embodiments.

Now, a liquid crystal display apparatus according to another exemplary embodiment of the present invention will be described in detail with reference to FIGS. 13 and 14.

Figure 13:
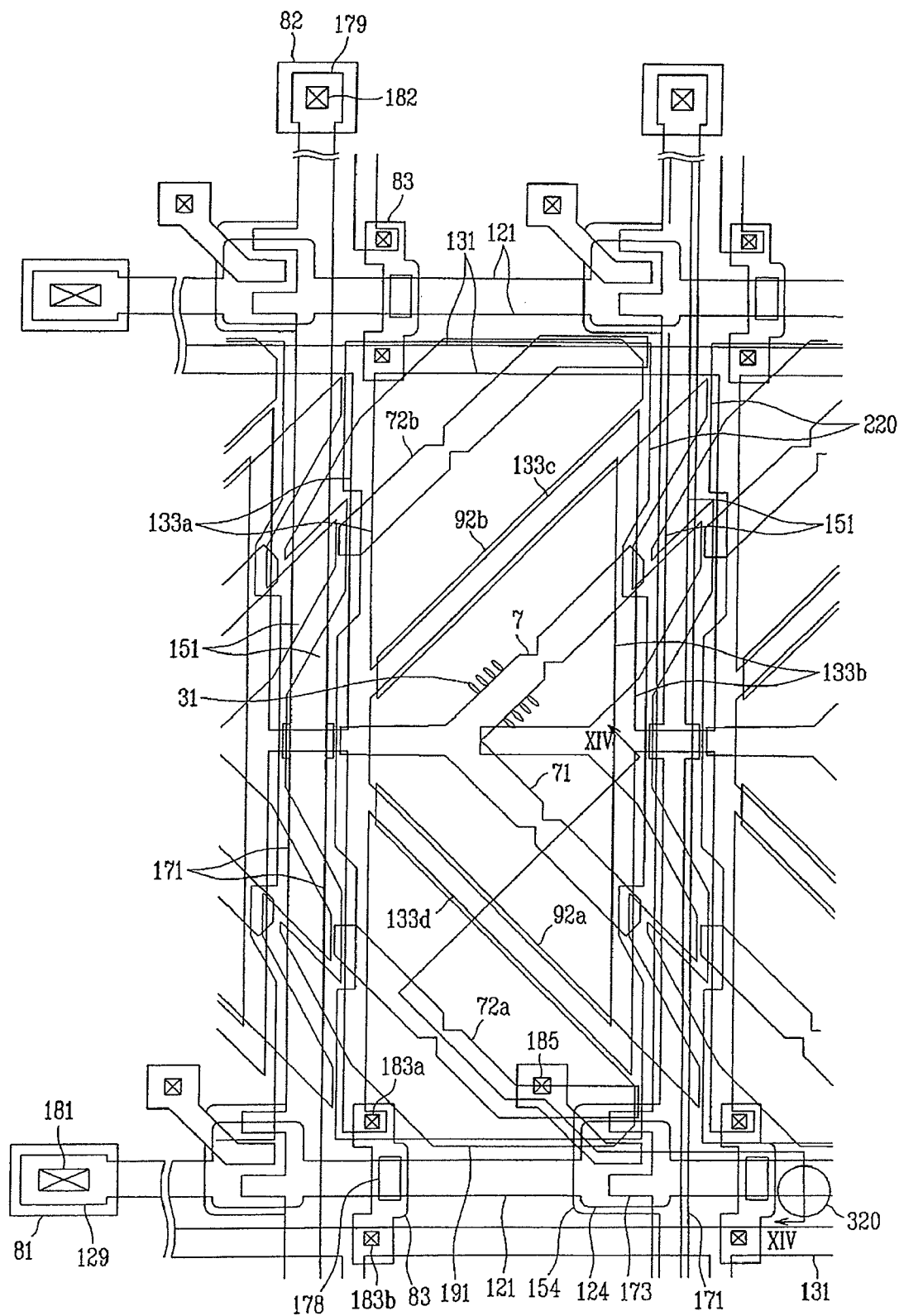
FIG. 13 is a view showing a layout of a liquid crystal display apparatus according to an exemplary embodiment of the present invention.

FIG. 13 is a view showing a layout of a liquid crystal display apparatus according to another exemplary embodiment of the present invention. FIG. 14 is a cross sectional view showing the liquid crystal display apparatus taken along line XIV-XIV of FIG. 13.

Figure 14:
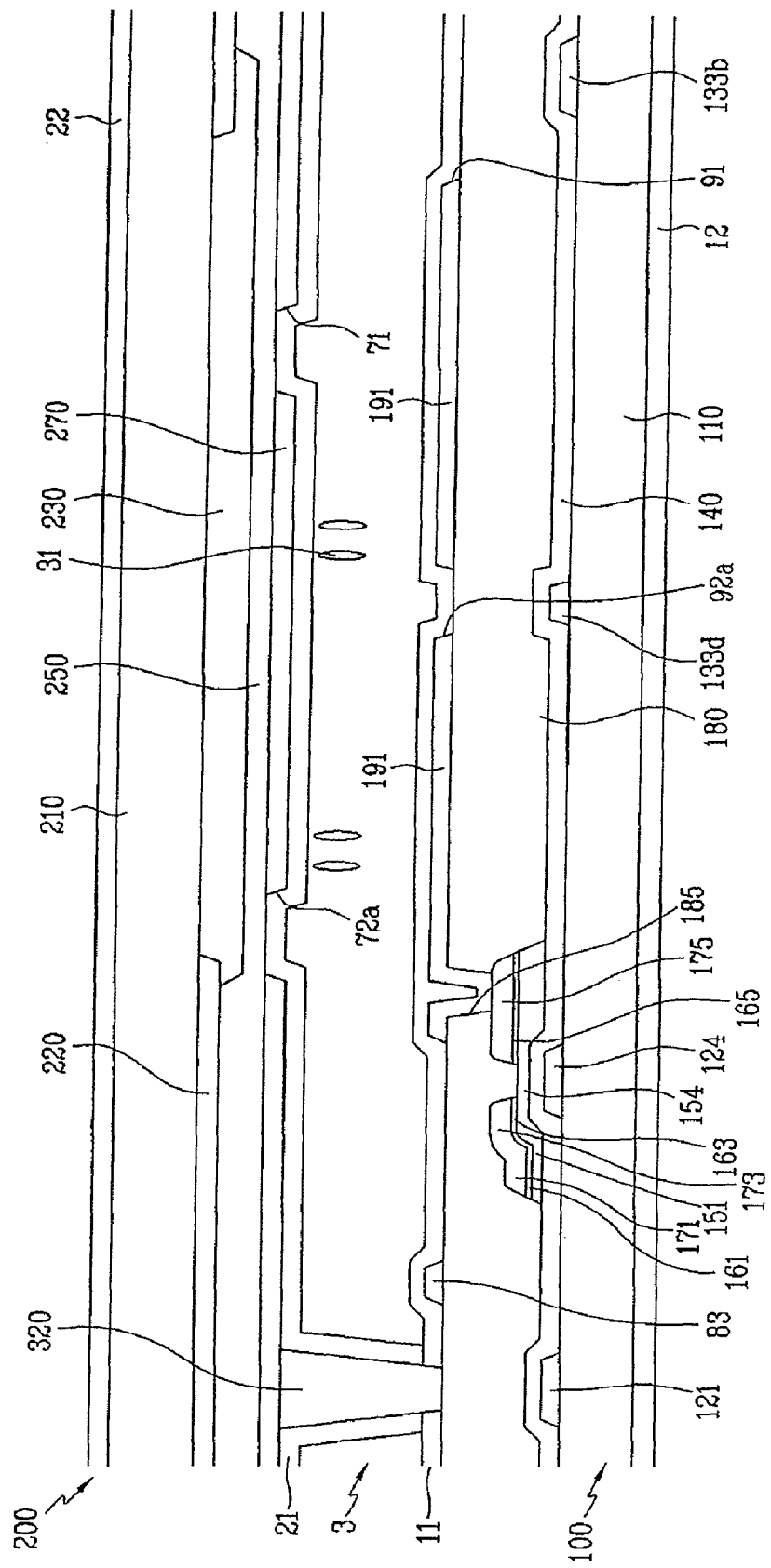
FIG. 14 is a cross sectional view showing the liquid crystal display apparatus taken along line XIV-XIV of FIG. 13.

As shown in FIGS. 13 and 14, the liquid crystal display apparatus includes a thin film transistor panel 100 and a common electrode panel 200 which face each other, a liquid crystal layer 300 interposed between the panels 100 and 200, and a pair of polarizers 12 and 22 disposed on outer surfaces of the panels 100 and 200.

The layered structures of the panels 100 and 200 according to the present exemplary embodiment are substantially the same as the layered structures of FIGS. 1 to 4.

In the thin film transistor panel 100, a plurality of gate lines 121 and a plurality of storage electrode lines 131 are disposed on a substrate 110. The gate lines 121 include a plurality of gate electrodes 124 and end portions 129. The storage electrode lines 131 include a plurality of storage electrodes 133a to 133d and a plurality of connection portions 133e. A gate insulating layer 140, a plurality of semiconductor stripes 151 including protrusions 154, a plurality of line-shaped ohmic contacts 161 including protrusions 163, and a plurality of island-shaped ohmic contacts 165 are sequentially formed on the gate lines 121 and the storage electrode lines 131.

A plurality of data lines 171 including source electrodes 173 and end portions 179, a plurality of drain electrodes 175, and a plurality of isolated metal pieces 178 are formed on the ohmic contacts 161 and 165, and a protective layer 180 is formed thereon. A plurality of contact holes 181, 182, 183a, 183b, and 185 are formed on the protective layer 180 and the gate insulating layer 140. A plurality of pixel electrodes 191 including cutout portions 91 to 92b, a plurality of overpasses 83, and a plurality of contact assistants 81 and 82 are formed on the protective layer 180, and an alignment layer 11 is formed thereon.

In the common electrode panel 200, a light blocking member 220, a plurality of color filters 230, a cover film 250, a common electrode including cutout portions 71 to 72b, and an alignment layer 21 are formed on an insulating substrate 210.

Unlike the liquid crystal display apparatus shown in FIGS. 1 to 4, the semiconductor stripes 151 have planar shapes which are substantially equal to shapes of the data lines 171, the drain electrodes 175, and the underlying ohmic contacts 161 and 165. The semiconductor stripes 151 have exposed portions which do not cover regions between the source electrodes 173 and the drain electrodes 175, the data line 171, and the drain electrodes 175.

In addition, ohmic contacts having planar shapes which are substantially equal to those of the isolated metal pieces 178 and island-shaped semiconductor members are formed under the isolated metal pieces 178.

In the fabrication of the thin film transistor panel 100, the data lines 171, the drain electrodes 175, the metal pieces 178, the semiconductor stripes 151, and the ohmic contacts 161 and 165 are formed by performing a photo etch process at one time.

A semiconductor layer, an ohmic contact layer, and a data metal layer are sequentially deposited on the gate insulating layer 140, and a photosensitive film having different thickness according to positions thereof are formed. After that, by using the photosensitive film as an etch mask, the semiconductor layer, the ohmic contact layer, and the data metal layer are etched, so that the thin film transistor panel is fabricated. Here, the photosensitive film having different thickness according to positions includes first and second portions, wherein the thickness of the second portion is smaller than that of the first portion. The first portion is located in a wire region where the data lines 171, the drain electrodes 171, and the metal pieces 1718 are provided. The second portion is located in a channel region of the thin film transistor.

As an example of a method of providing the photosensitive films of which thicknesses vary according to positions thereof, there is a method of providing a translucent area in addition to a light transmitting area and a light blocking area to a photo mask. In the translucent area, a slit pattern, a lattice pattern, or a thin film of which transmittance or thickness is of an intermediate value is provided. In the case where the slit pattern is used, it is preferable that a width of each of the slits or an interval between the slits is smaller than a resolution of an exposing apparatus used for the photo process. As another example, there is a method of using a reflow-able photosensitive film. Namely, by using a general exposure mask having only the light transmitting area and the light blocking area, the reflow-able photosensitive film is formed, and after that, a reflow process is performed to allow the photosensitive material to flow into a region where the photosensitive film is not provided, so that a thin photosensitive film can be formed in the region.

By using the photosensitive film as an etch mask, a data metal layer, an ohmic contact layer, and a semiconductor layer are sequentially etched to form a shape of data wire lines roughly. Next, an ashing process is performed on the photosensitive film to remove a second portion, and by using a remaining first portion as an etch mask, the exposed data metal layer and the exposed ohmic contact layer are etched, so that a channel portion of the thin film transistor is formed.

By doing so, the duration of the photo process can be reduced, so that it is possible to simplify the production method.

The liquid crystal display apparatus shown in FIGS. 13 and 14 may employ the features of the liquid crystal display apparatuses shown in FIGS. 1 to 12.

Now, a liquid crystal display apparatus according to another exemplary embodiment of the present invention will be described in detail with reference to FIG. 15.

Figure 15:
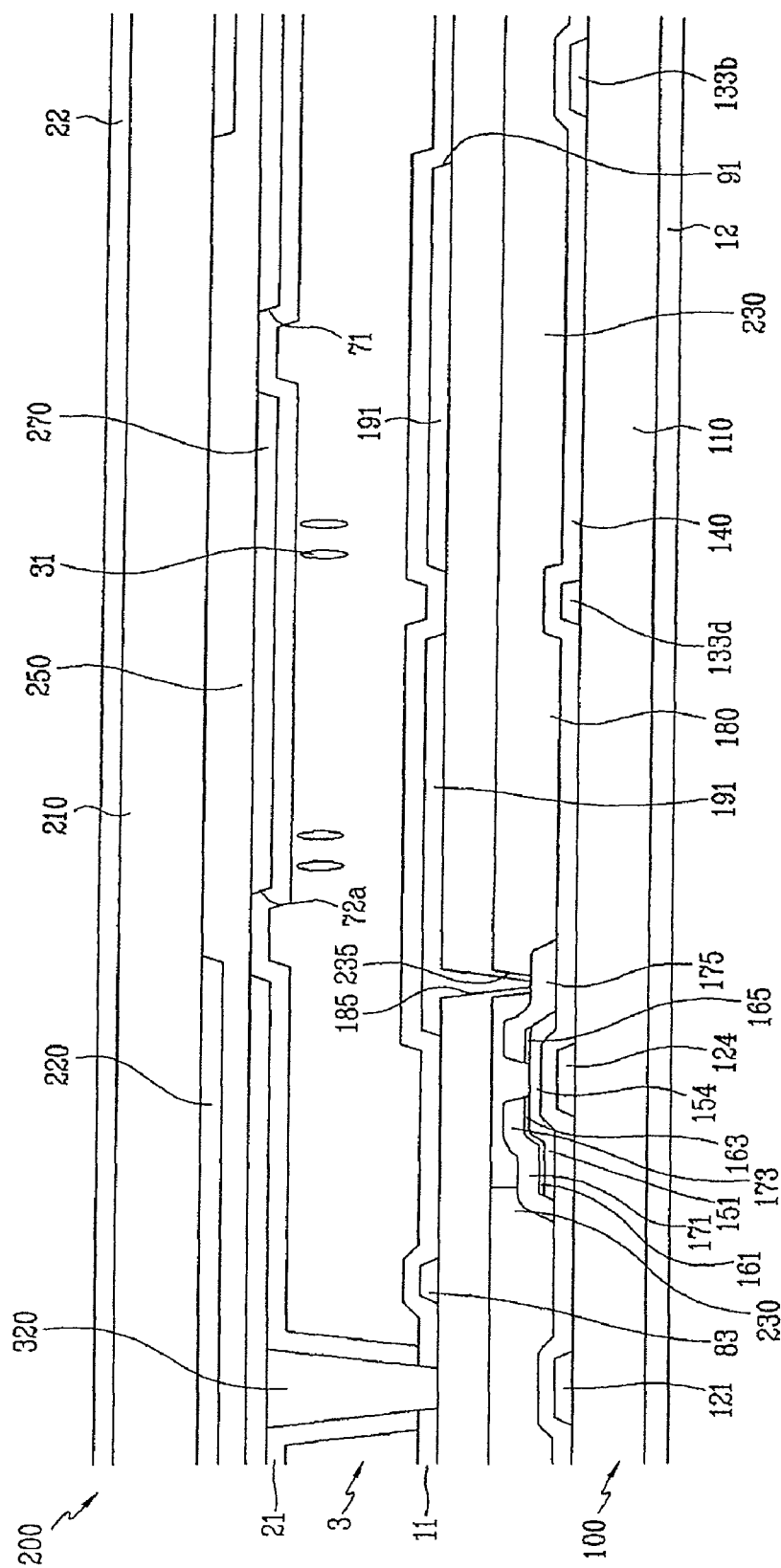
FIG. 15 is a cross sectional view showing a liquid crystal display apparatus according to an exemplary embodiment of the present invention, which is taken along line IV-IV of FIG. 1.

FIG. 15 is a cross sectional view showing the liquid crystal display apparatus according to another exemplary embodiment of the present invention taken along line IV-IV of FIG. 1.

As shown in FIG. 15, the liquid crystal display apparatus includes a thin film transistor panel 100 and a common electrode panel 200 which face each other, a liquid crystal layer 300 interposed between the panels 100 and 200, and a pair of polarizers 12 and 22 disposed on outer surfaces of the panels 100 and 200.

The layered structures of the panels 100 and 200 according to the present exemplary embodiment are substantially the same as the layered structures of FIGS. 1 to 4.

In the thin film transistor panel 100, a plurality of gate lines 121 and a plurality of storage electrode lines 131 are disposed on a substrate 110. The gate lines 121 include a plurality of gate electrodes 124 and end portions 129. The storage electrode lines 131 include a plurality of storage electrodes 133a to 133d and a plurality of connection portions 133e. A gate insulating layer 140, a plurality of semiconductor stripes 151 including protrusions 154, a plurality of line-shaped ohmic contacts 161 including protrusions 163, and a plurality of island-shaped ohmic contacts 165 are sequentially formed on the gate lines 121 and the storage electrode lines 131. A plurality of data lines 171 including source electrodes 173 and end portions 179, a plurality of drain electrodes 175, and a plurality of isolated metal pieces 178 are formed on the ohmic contacts 161 and 165 and a gate insulating layer 140, and a protective layer 180 is formed thereon. A plurality of contact holes 181, 182, 183a, 183b, and 185 are formed on the protective layer 180 and the gate insulating layer 140. A plurality of pixel electrodes 191 including cutout portions 91 to 92b, a plurality of overpasses 83, and a plurality of contact assistants 81 and 82 are formed on the protective layer 180, and an alignment layer 11 is formed thereon.

In the common electrode panel 200, a light blocking member 220, a cover film 250, a common electrode including cutout portions 71 to 72b, and an alignment layer 21 are formed on an insulating substrate 210.

Unlike the liquid crystal display apparatus shown in FIGS. 1 to 4, color filters are not provided to the common electrode panel 200. Rather, a plurality of color filters 230 are formed under the protective layer 180 of the thin film transistor panel 100.

The color filters 230 extend along rows of the pixel electrodes 191 in a shape of stripe in the longitudinal direction. The boundary between the two color filters 230 matches with the data line 171. However, the color filters 230 may be separated from each other or overlap each other to prevent light leakage between the pixel electrodes 191, similar to a light blocking member. Thus, in the case wherein the color filters 230 overlap each other, the light blocking member 220 on the common electrode panel 200 may be omitted.

Through holes 235 though which the contact holes 185 pass are formed on the color filters 230, and diameters of the through holes 235 are larger than those of the contact holes 185. The color filters 230 are not provided to peripheral regions where the end portions 129 of the gate lines 121 and the end portions 179 of the data lines 171 are disposed.

The liquid crystal display apparatus shown in FIG. 15 may employ the features of the liquid crystal display apparatuses shown in FIGS. 1 to 14.

For example, the features of the liquid crystal display apparatus according to the present exemplary embodiment may be employed by a liquid crystal display apparatus having a structure where different voltages are applied to two sub pixel electrodes divided from one pixel electrode.

Now, a liquid crystal display apparatus according to another exemplary embodiment of the present invention will be described in detail with reference to FIGS. 16 to 20.

Figure 16:
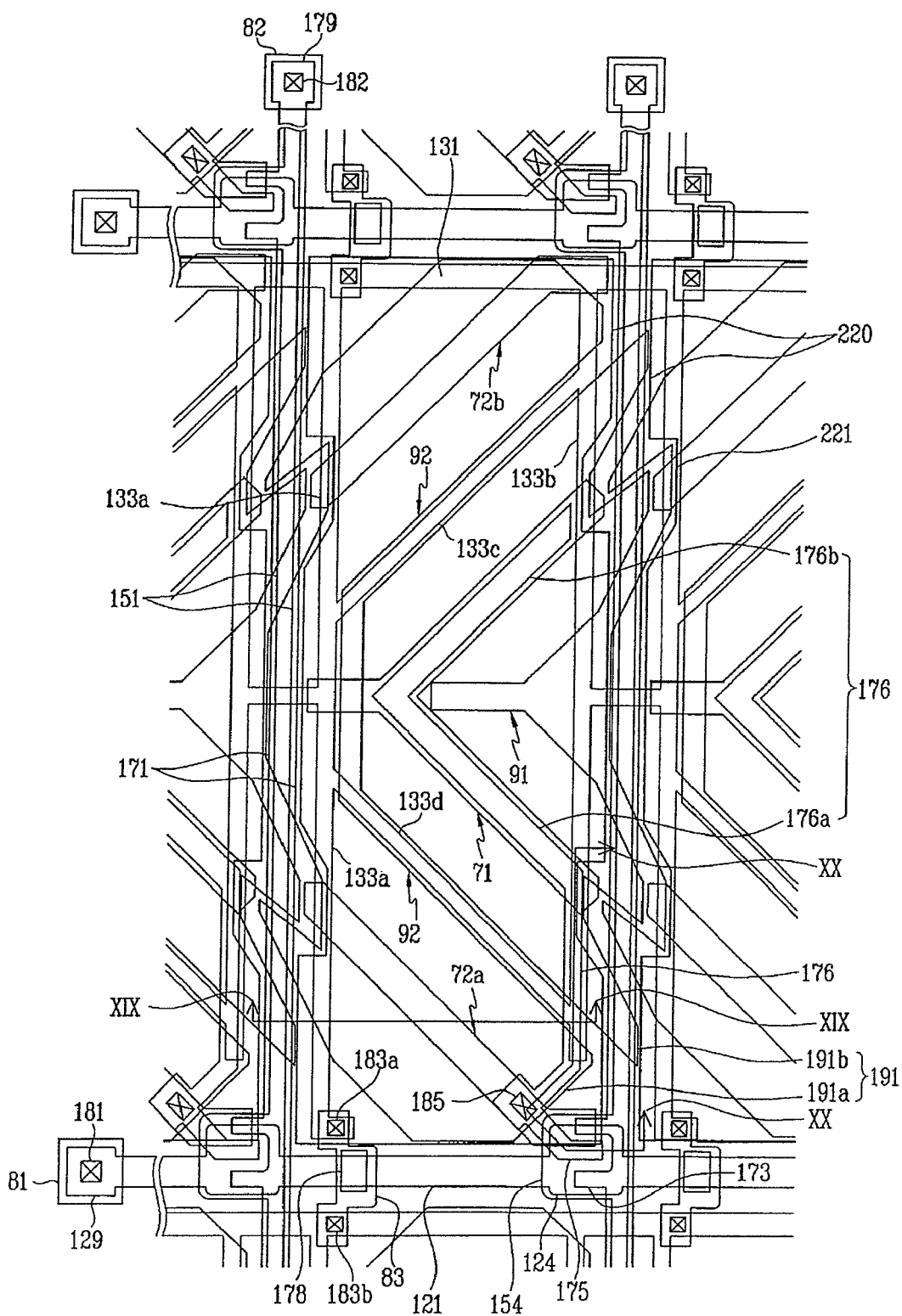
FIG. 16 is a view showing a layout of a liquid crystal display apparatus according to an exemplary embodiment of the present invention.
Figure 17:
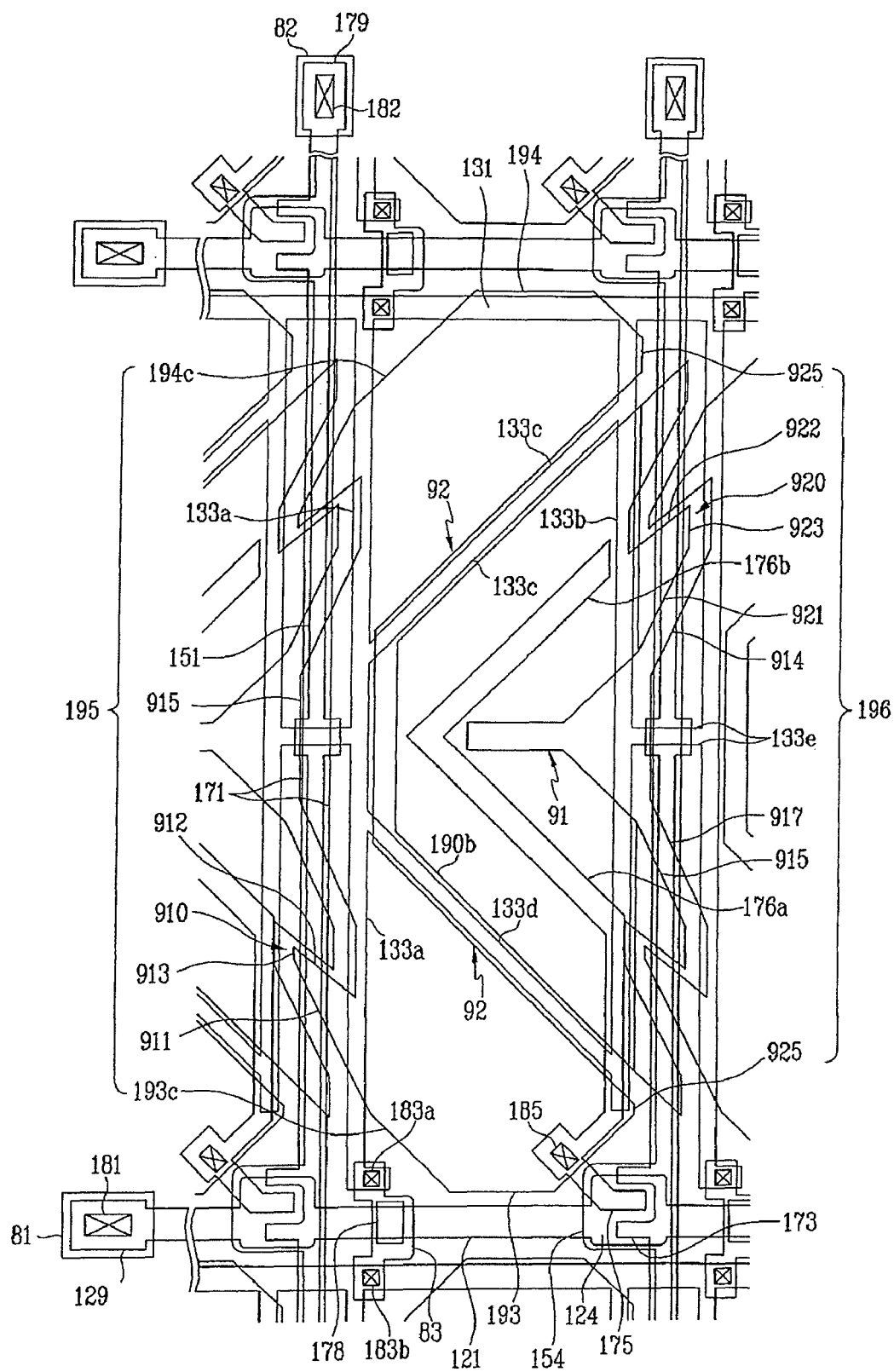
FIG. 17 is a view showing a layout of a thin film transistor panel for the liquid crystal display apparatus of FIG. 16.
Figure 18:
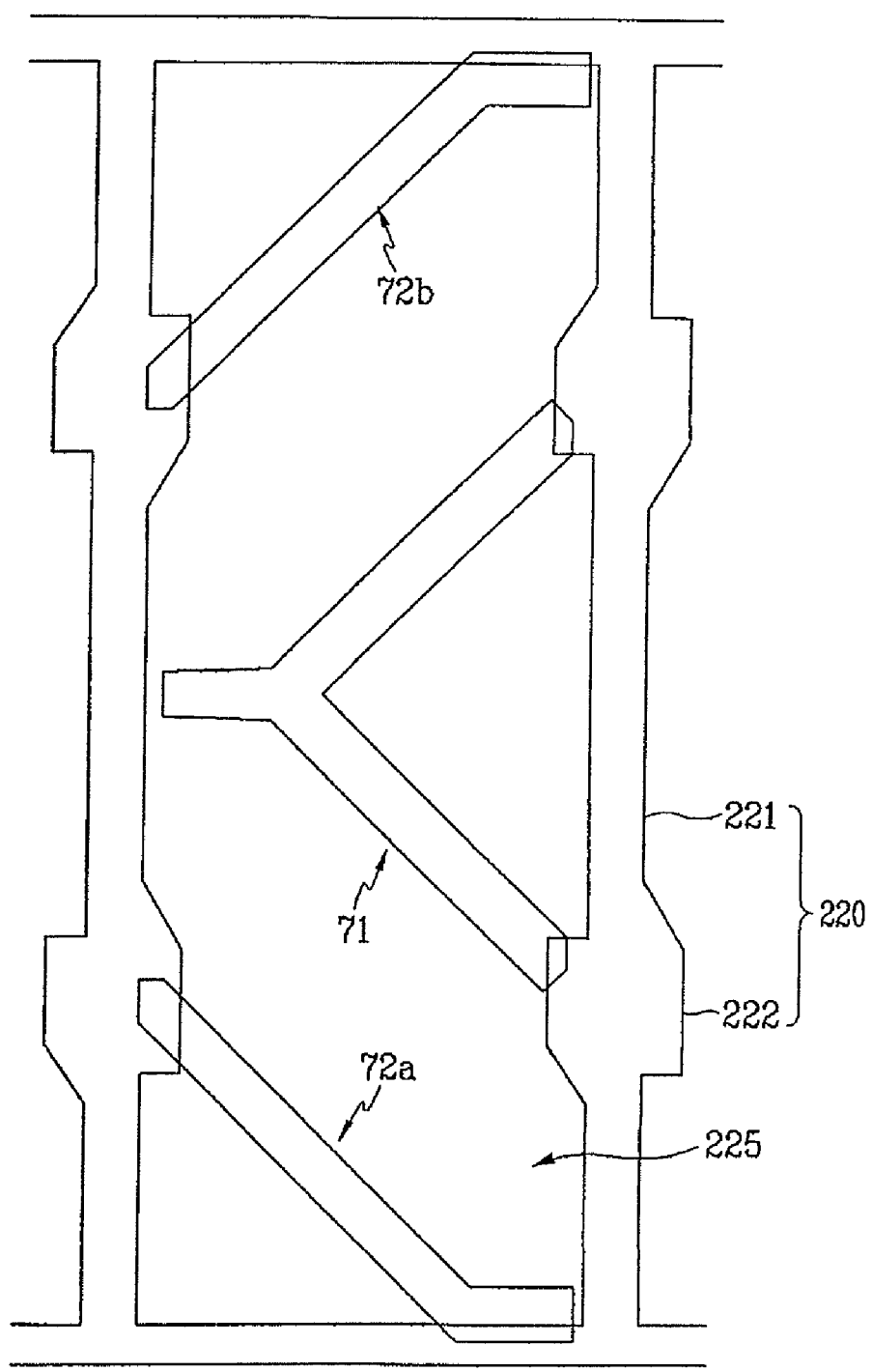
FIG. 18 is a view showing a layout of a common electrode panel for the liquid crystal display apparatus of FIG. 16.
Figure 19:
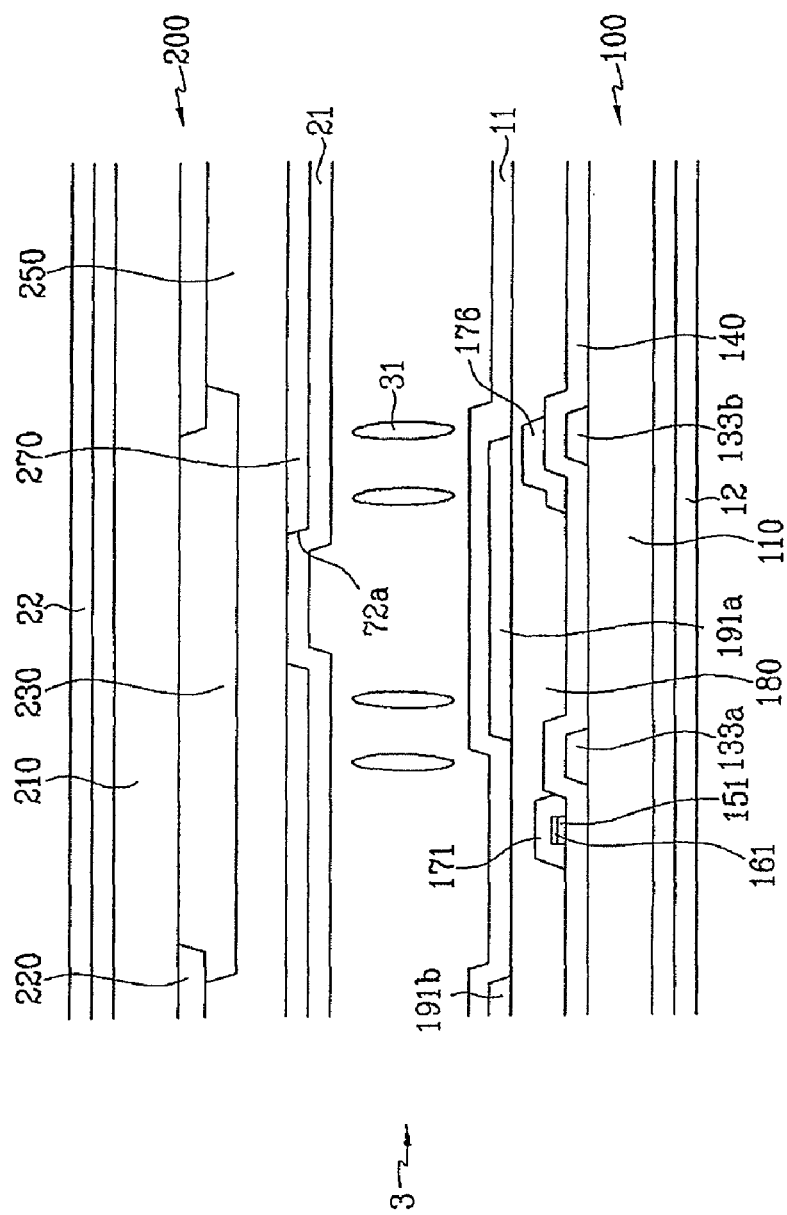
FIG. 19 is a cross sectional view showing the liquid crystal display apparatus taken along line XIX-XIX of FIG. 16.
Figure 20:
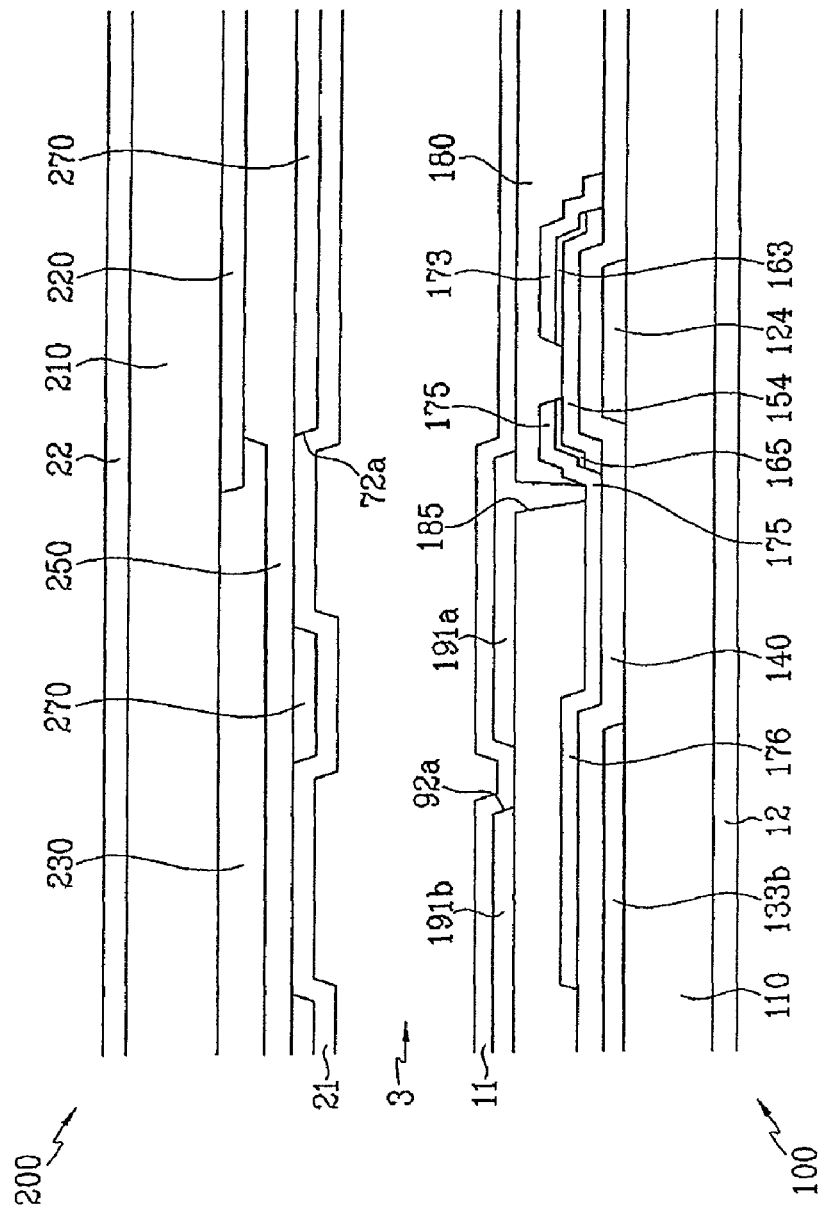
FIG. 20 is a cross sectional view showing the liquid crystal display apparatus taken along line XX-XX of FIG. 16.

FIG. 16 is a view showing a layout of a liquid crystal display apparatus according to another exemplary embodiment of the present invention. FIG. 17 is a view showing a layout of a thin film transistor panel for the liquid crystal display apparatus of FIG. 16. FIG. 18 is a view showing a layout of a common electrode panel for the liquid crystal display apparatus of FIG. 16. FIG. 19 is a cross sectional view showing the liquid crystal display apparatus taken along line XIX-XIX of FIG. 16. FIG. 20 is a cross sectional view showing the liquid crystal display apparatus taken along line XX-XX of FIG. 16.

The liquid crystal display apparatus includes a thin film transistor panel 100 and a common electrode panel 200 which face each other and a liquid crystal layer 300 interposed between the panels 100 and 200.

Firstly, the thin film transistor panel 100 will be described in detail with reference to FIGS. 16, 17, and 19.

A plurality of gate lines 121 and a plurality of storage electrode lines 131 are disposed on an insulating substrate 110 made of a transparent glass or a plastic material.

The gate lines 121 transmitting gate signals mainly extend in the transverse direction. The gate lines 121 include a plurality of gate electrodes 124 which protrude upwardly and downwardly and end portions 129 which have wide areas for connection to other layers or external driver circuits. The storage electrode lines 131 which are applied with predetermined voltages include stem lines which extend substantially in parallel to the gate lines 121, a plurality of storage electrode sets of first, second, third, and fourth storage electrodes 133a, 133b, 133c, and 133d, and a plurality of connection portions 133e. Each of the storage electrode lines 131 is disposed between two adjacent gate lines 121, and the stem line thereof is closer to the upper one of the two gate lines 121.

The first and second storage electrodes 133a and 133b extend in the longitudinal direction to face each other. The first storage electrode 133a includes a fixed end connected to the stem line and a free end opposite to the fixed end, and the free end includes a protrusion. The third and fourth storage electrodes 133c and 133d extend in the slanted directions from the substantially central portion of the first storage electrode 133a to the upper and lower ends of the second storage electrode 133b, respectively. The connection portions 133e are connected between adjacent storage electrode sets 133a-133d. However, various shapes and arrangement may be used for the storage electrode lines 131.

Side surfaces of the gate lines 121 and the storage electrode lines 131 are slanted with respect to a surface of the substrate 110, at an angle in a range of about 30° to about 80°.

A gate insulating layer 140 made of a silicon nitride $SiN_x$ or the like is formed on the gate lines 121 and the storage electrode lines 131.

A plurality of semiconductor stripes 151 made of a hydrogenated amorphous silicon or polysilicon are formed on the gate insulating film 140. The semiconductor stripes 151 mainly extend in the longitudinal direction and include a plurality of protrusions 154 which extend toward the gate electrodes 124. In addition, widths of the semiconductor stripes 151 are enlarged at regions near the gate lines 121 and the storage electrode lines 131 to cover wide areas thereof.

A plurality of line-shaped and island-shaped ohmic contacts 161 and 165 are formed on semiconductor stripes 151. The ohmic contacts 161 and 165 may be made of made of silicide or an n+ hydrogenated amorphous silicon which is heavily doped with n-type impurities such as phosphorus (P). The line-shaped ohmic contacts 161 include a plurality of the protrusions 163. Each pair of the protrusion 163 and the island-shaped ohmic contact 165 is disposed on the protrusion 154 of the semiconductor stripe 151.

Side surfaces of the semiconductor stripes 151 and the ohmic contacts 161 and 165 are also slanted with respect to the surface of the substrate 100, at an angle in a range of about 30° to about 80°.

A plurality of data lines 171, a plurality of drain electrodes 175, and a plurality of isolated metal pieces 178 are formed on the ohmic contacts 161 and 165 and the gate insulating film 140.

The data lines 171 transmitting data signals mainly extend in the longitudinal direction to intersect the gate lines 121 and the stem lines and the connection portions 133e of the storage electrode lines 131. The data lines 171 include a plurality of C-shaped source electrodes 173 which protrude toward the gate electrodes 124 and end portions 179 which have wide areas for connection to other layers or external driver circuits.

The drain electrodes 175 are separated from the data lines 171. The drain electrodes 175 include bar-shaped portions which face the source electrodes 173 with respect to the gate electrodes 124 and capacitive coupling electrodes 176 which extend from the bar-shaped portions. The bar-shaped portions of the drain electrodes 175 are partially surrounded by the source electrodes 173. The capacitive coupling electrodes 176 are connected to each other. Each of the capacitive coupling electrodes 176 has two slanted portions 176a and 176b which are parallel to the third and fourth storage electrodes 133c and 133d, respectively.

The metal pieces 178 are disposed on the gate lines 121 near the first storage electrodes 133*a*.

Side surfaces of the data lines 171, the drain electrodes 175, and the metal pieces 178 may also be slanted with respect to the surface of the substrate 110 at an angle ranging from about 30° to about 80°.

The ohmic contacts 161 and 165 are interposed only between the underlying semiconductor stripes 151 and the overlying data lines 171 and the drain electrodes 175 and have a function of reducing contact resistance therebetween. Although the widths of the semiconductor stripes 151 are smaller than those of the data lines 171 in most regions, the widths of the portions where the gate lines 121 and the storage electrode lines 121 intersect each other are enlarged as described above. Therefore, the profile of surfaces at the intersections is smoothed, so that the disconnection of the data lines 171 can be prevented. The semiconductor stripes 151 have exposed portions uncovered by the data lines 171 and the drain electrodes 175 in addition to portions disposed between the source electrodes 173 and the drain electrodes 175.

A protective layer 180 is formed on the data line 171, the drain electrode 175, the metal pieces 178, and the exposed portions of the semiconductor stripes 151. The protective layer 180 is made of an inorganic insulating material or an organic insulating material, and a surface thereof may be planarized. A plurality of contact holes 182 and 185 which expose end portions 179 of the data lines 171 and the drain electrodes 175, respectively, are formed on the protective layer 180. A plurality of contact holes 181 which expose end portions 129 of the gate lines 121, a plurality of contact holes 183*a* which expose the protrusions of the free ends of the first storage electrodes 133*a*, and a plurality of contact holes 183*b* which expose portions of the storage electrode lines 131 at regions near the fixed ends of the first storage electrodes 133*a* are formed on the protective layer 180 and the gate insulating layer 140. The contact holes 181, 182, 183*a*, 183*b*, and 185 may be formed in various shapes such as polygon and circle. Side walls of the contact holes 181, 182, 183*a*, 183*b*, and 185 may be slanted at an angle of about 30° to about 85° or have a step shape.

A plurality of pixel electrodes 191 including first and second sub pixel electrodes 191*a* and 191*b*, a plurality of overpasses 83, and a plurality of contact assistants 81 and 82 are formed on the protective layer 180. The components may be made of, for example, a transparent conducive material such as ITO and IZO or a reflective metal such as, for example, aluminum (Al), silver (Ag), chromium (Cr), and an alloy thereof.

The first sub pixel electrode 191*a* is physically and electrically connected to the drain electrode 175 through the contact hole 185 and receives a data voltage applied by the drain electrode 175.

The first and second sub pixel electrodes 191*a* and 191*b* are separated from each other with respect to a gap 92 interposed therebetween. The gap 92 includes a slanted portion which extends from the left side to the right side thereof and a longitudinal portion which connects the slanted portions. The slanted portions have an angle of about 45° with respect to the gate lines 121.

The first sub pixel electrode 191*a* of the sub pixel electrodes 191*a* and 191*b* divided by the gap 92 is disposed above and under the second sub pixel electrode 191*b* to surround the second sub pixel electrode 191*b*, so that second sub pixel electrode 191*b* is interposed between two portions of the first sub pixel electrode 191*a*. The first and second sub pixel electrodes 191*a* and 191*b* face each other and have edges which are slanted with an angle of about 45° with respect to the gate line 121. As a result, the first and second sub pixel electrodes 191*a* and 191*b* have an inversion symmetry with respect to a virtual transverse central line bisecting the pixel electrode 191.

The second sub pixel electrode 191*b* has a central cutout portion 91. The central cutout portion 91 extends along the transverse central line and has an inlet at the right side. The inlet of the central cutout portion 91 has a pair of slanted edges which are parallel to the gap 92.

Here, the first sub pixel electrodes 191*a* are connected to the drain electrodes 175 through the contact holes 185 to be directly applied with the data voltages. The second sub pixel electrodes 91*b* overlap the capacitive coupling electrodes 176 which are connected to the first sub pixel electrodes 191*a*. As a result, the second sub pixel electrodes 191*b* are electromagnetically (e.g., capacitively) coupled to the first sub pixel electrodes 191*a*.

The pixel electrode 191 is divided into four partitions by the gap 92 and the central cutout portion 91.

Referring to FIGS. 5 and 16, the pixel electrode 191 has a pair of first primary edges 193 and 194 facing each other and a pair of second primary edges 195 and 196 connected to the first primary edges 193 and 194. The first primary edges 193 and 194 are substantially parallel to the gate line 121, and the second primary edges 195 and 196 have inner and outer envelopes. The inner and outer envelopes of the second primary edges 195 and 196 are substantially perpendicular to the first primary edges 193 and 194. Left corners of the pixel electrode 191 is constructed with chamfered slanted edges 193*c* and 194*c*, and the chamfered slanted edges 193*c* and 194*c* have a slanted angle of about 45° with respect to the gate line 121.

The second primary edges 195 and 196 of the pixel electrode 191 have a plurality of sawteeth 910 and 920 which protrude from a plurality of longitudinal lines 915 and 916 on the inner envelopes 951 and 961 outwardly. The sawteeth 910 and 920 are symmetric with respect to the transverse central line of the pixel electrode 191.

Each of the sawteeth 910 (920) has a first slanted edge 911 (921), a second slanted edge 912 (922), and a top edge 913 (923) which is disposed on the outer envelop 952 (962) to connect the first and second slanted edges. The extension lines of the first and second slanted edges 911 (912) and 912 (922) intersect each other with an acute angle of about 45° or less. The first slanted edge 911 (912) has an obtuse angle of about 135° or more with respect to the longitudinal line 915 (925), and the second edge 912 (922) has an angle of about 45° with respect to the longitudinal line 915 (925). The extension lines of the first and second slanted edges 911 (912) and 912 (922) intersect each other with an acute angle of about 45° or less. In addition, the second slanted edge 912 (922) is substantially parallel to the gap 92 and located on an extension line of the gap 92. The first slanted edge 911 (921) has an angle of about 45° or less or 135° or more with respect to the gap 92.

The upper portions of the sawteeth 910 and 920, that is, portions near the top edges 913 and 923 thereof overlap the data line 171. The sawteeth 920 of the right edge 196 of the pixel electrode 191 which are located at the left of the data line 171 are engaged with the sawteeth 910 of the pixel electrode 191 which are located at the left of the data line 171. In addition, the facing edges of the engaged sawteeth 910 and 920 are parallel to each other.

The number of the sawteeth 910 and 920 are in close relation to the number of the partitions of the pixel electrode 191 divided by the cutout portions and the gaps 91 and 92 or the number of the cutout portions. The number of the partitions of the pixel electrode 191 and the number of the sawteeth 910 and 920 may vary according to design factors such as, for example, the size of the pixel electrode 191, the ratio of lengths of the transverse and longitudinal sides of the pixel electrode 191, and types or characteristics of the liquid crystal layer 3.

The pixel electrodes 191 overlap the adjacent gate lines 121 or the adjacent data lines 171, so that it is possible to increase the aperture ratio of the liquid crystal display apparatus.

The overpass 83 is disposed across the gate line 121 and connected to the exposed portion of the storage electrode line 131 and the exposed end portion of the free end of the first storage electrode 133a through the contact holes 183b and 18b which are located at the opposite positions with respect to the gate line 121, respectively. The storage electrodes 133a and 133b and the storage electrode line 131 together with the overpasses 83 may be used to repair defects of the gate lines 121, the data lines 171, and the thin film transistors.

The contact assistants 81 and 82 are connected to the end portion 129 of the gate line 121 and the end portion 179 of the data line 171 through the contact holes 181 and 182, respectively Now, the common electrode panel 200 will be described with respect to FIGS. 16, 18, and 20.

A light blocking member 220 is formed on the insulating substrate 210 made of a transparent glass or a plastic material. The light-blocking member 220 includes a plurality of opening portions 225 which face the pixel electrodes 191 and have a shape of a substantial rectangle. A width of portions 221 of the light blocking member 220 corresponding to the date lines 171 is substantially the same as that of the data lines 171.

However, the widths may be defined by taking into consideration alignment error of the panels 100 and 200. The light blocking member 220 includes enlarged portions 222 which block spaces between the engaged sawteeth 910 and 920 which protrude outwardly from the data lines 171. The light blocking member 220 may include portions corresponding to the thin film transistors.

A plurality of color filters 230 are formed on the substrate 210. Most portions of the color filters 230 are disposed in regions surrounded by the light-blocking member 220, and the color filters 230 extend along rows of the pixel electrodes 191 in the longitudinal direction. Each of the color filters 230 can display one of primary colors such as red, green, and blue.

A cover film 250 is formed on the color filters 230 and the light-blocking member 220. The cover film 250 may be made of an (organic) insulating material. The cover film 250 prevents the color filters 230 from being exposed and provides a planarized surface. The cover film 250 may be omitted.

A common electrode 270 is formed on the cover film 250. The common electrode 270 is made of a transparent conductive material such as, for example, ITO and IZO. A plurality of cutout portion sets of cutout portions 71, 72a, and 72b are formed on the common electrode 270.

The common electrode panel 270 includes a plurality of cutout portion sets 71-72b.

One cutout portion set 71-72b faces one pixel electrode 191 and includes a central cutout portion 71, a lower cutout portion 72a, and an upper cutout portion 72b. The cutout portions 71, 72a, and 72b are disposed between the adjacent cutout portions 91, 92a, and 92b of the pixel electrode 191 or between the cutout portions 92a and 92b and the chamfered edge of the pixel electrode 191.

In addition, each of the cutout portions 71, 72a, and 72b extends substantially in parallel to the lower or upper cutout portion 92a or 92b of the pixel electrode 191 and include at least one slanted portion. The cutout portions 71, 72a, and 72b have an inversion symmetry with respect to the transverse central line of the pixel electrode 191.

Each of the lower and upper cutout portions 72a and 72b includes a slanted portion and a transverse portion. The slanted portion extends substantially from the upper or lower side to the left side of the pixel electrode 191 to overlap the longitudinal side of the pixel electrode 191. A long side facing the slanted portion intersects the first and second slanted edges 911, 912, 921, and 922 of the sawteeth of the pixel electrode 191 or extension lines thereof or is located on the extension lines. The transverse portion extends from the end of the slanted portion along the transverse side of the pixel electrode 191 with an obtuse angle with respect to the slanted portion and overlaps the transverse side.

The central cutout portion 71 includes a central transverse portion and a pair of slanted portions. The central transverse portion extends substantially from the left side of the pixel electrode 191 along the transverse central line of the pixel electrode 191 in the right direction. A pair of the slanted portions extend substantially in parallel to the lower and upper cutout portions 72a and 72b from the end of the central transverse portion to the right side of the pixel electrode 191 with an obtuse angle with respect to the central transverse portion, respectively.

The number of the cutout portions 71, 72a, and 72b may vary according to the design factors, and the light-blocking member 220 overlaps the cutout portions 71, 72a, and 72b to prevent the light leakage in a vicinity of the cutout portions 71, 72a, and 72b.

Spacers made of an insulating material are disposed on the common electrode panel 200 to maintain a constant interval between the panels 100 and 200.

The light blocking member 220 overlaps the cutout portions 71, 72a, and 72b to prevent the light leakage in a vicinity of the cutout portions 71, 72a, and 72b. In addition, in this embodiment, the slanted portions 176a and 176b of the capacitive coupling electrodes 176 overlaps the cutout portions 71, 72a, and 72b to prevent the light leakage in a vicinity of the cutout portions 71, 72a, and 72b.

Here, the slanted angles of the sawteeth 910 and 920 of the pixel electrode 191 may be formed to be larger by about 1° or about 15° than the angles of the slanted portions of the central cutout portions 71 of the common electrode 270.

Alignment films 11 and 21 are coated on inner surfaces of the panels 100 and 200, respectively. The alignment films 11 and 21 may be a vertically-aligned film. Polarizers 12 and 22 are disposed on outer surfaces of the panels 100 and 200, respectively.

When the common voltage and the data voltage are applied to the common electrode 270 and the pixel electrode 191, respectively, a primary electric field is generated in a direction substantially perpendicular to the surfaces of the panels 100 and 200. In response to the electric field, the liquid crystal molecules 31 have a tendency to change the major axis direction to be perpendicular to the direction of the electric field. On the other hand, the cutout portions 71, 72a, 72b, 91, 92a, and 92b of the common electrode 270 and the pixel electrode 191 and the slanted edges of the sub pixel electrode 191a distort the electric field to generate a horizontal component of the electric field for determining the tilted direction of the liquid crystal molecules. The horizontal component of the electric field is perpendicular to the edges of the cutout portions 71, 72a, 72b, 91, 92a, and 92b and the slanted edges of the pixel electrode 191. In the horizontal component of the primary electric field at the facing two edges of the cutout portions 71, 72a, 72b, 91, 92a, and 92b are opposite to each other.

Due to such electric fields, the cutout portions 71, 72a, 72b, 91, 92a, and 92b can control the tilted direction of the liquid crystal molecules of the liquid crystal layer 3. As a result, the liquid crystal molecules in domains defined by the adjacent cutout portions 71, 72a, 72b, 91, 92a, and 92b or in domains defined by the right and left slanted edges of the sub pixel electrodes 191a and 191b are tilted in the direction perpendicular to the longitudinal directions of the cutout portions 71, 72a, 72b, 91, 92a, and 92b. The long edges of each of the domains are substantially parallel to each other and have an angle of about 45° with respect to the gate line 121. Most of the liquid crystal molecules in the domain are slanted in four directions, so that a wide viewing angle can be obtained.

Therefore, by providing the sawteeth to the sides of the sub pixel electrodes 191a and 191b adjacent to the data line 171, as described above in the embodiment shown in FIGS. 1 to 4, the secondary electric field generated between the adjacent pixel electrodes 191 can control the alignment of the liquid crystal molecules 31 in the sub areas.

The widths of the cutout portions 71, 72a, 72b, 91, 92a, and 92b may be in the range of, for example, from about 9 μm to about 12 μm.

At least one of the cutout portions 71, 72a, 72b, 91, 92a, and 92b may be replaced with a protrusion or a depression. The protrusions may be made of an organic or inorganic material and disposed above or under the electric field generating electrodes 191a, 191b, and 270. In addition, the widths of the protrusions may be in the range of, for example, from about 5 μm to about 10 μm.

On the other hand, when the tilted direction of the liquid crystal molecules 31 has an angle of about 45° with respect to the transmission axes of the polarizers 12 and 22, the highest brightness can be obtained. In this embodiment, in all the domains, the tilted direction of the liquid crystal molecules 31 has an angle of about 45° with respect to the gate lines 121, and the gate lines 121 are parallel to or perpendicular to the peripheral lines of the panels 100 and 200. Accordingly, in this embodiment, the polarizers 12 and 22 are disposed on the panels 100 and 200 such that the transmission axes thereof are parallel to or perpendicular to the peripheral lines of the panels 100 and 200, to thereby obtain the highest brightness and reduce production cost of the polarizers 21 and 22.

In the liquid crystal display apparatus according to the embodiment, as described above, the second sub pixel electrodes 191b are electromagnetically (capacitively) coupled to the first sub pixel electrodes 191a. While the first sub pixel electrodes 191a are directly connected to the thin film transistor Q through the drain electrode 175 thereof to be applied with an image signal voltage which is transmitted through the thin film transistor from the data line 171, the voltage of the second sub pixel electrode 191b becomes a capacitively coupled voltage to the first sub pixel electrode 191a.

Therefore, in this embodiment, the absolute value of the voltage of the second sub pixel electrode 191b is always lower than that of the first sub pixel electrode 191a.

The capacitively coupled structure may have the following structures.

Now, a liquid crystal display apparatus according to another exemplary embodiment of the present invention will be described in detail with reference to FIGS. 21 to 24.

Figure 21:
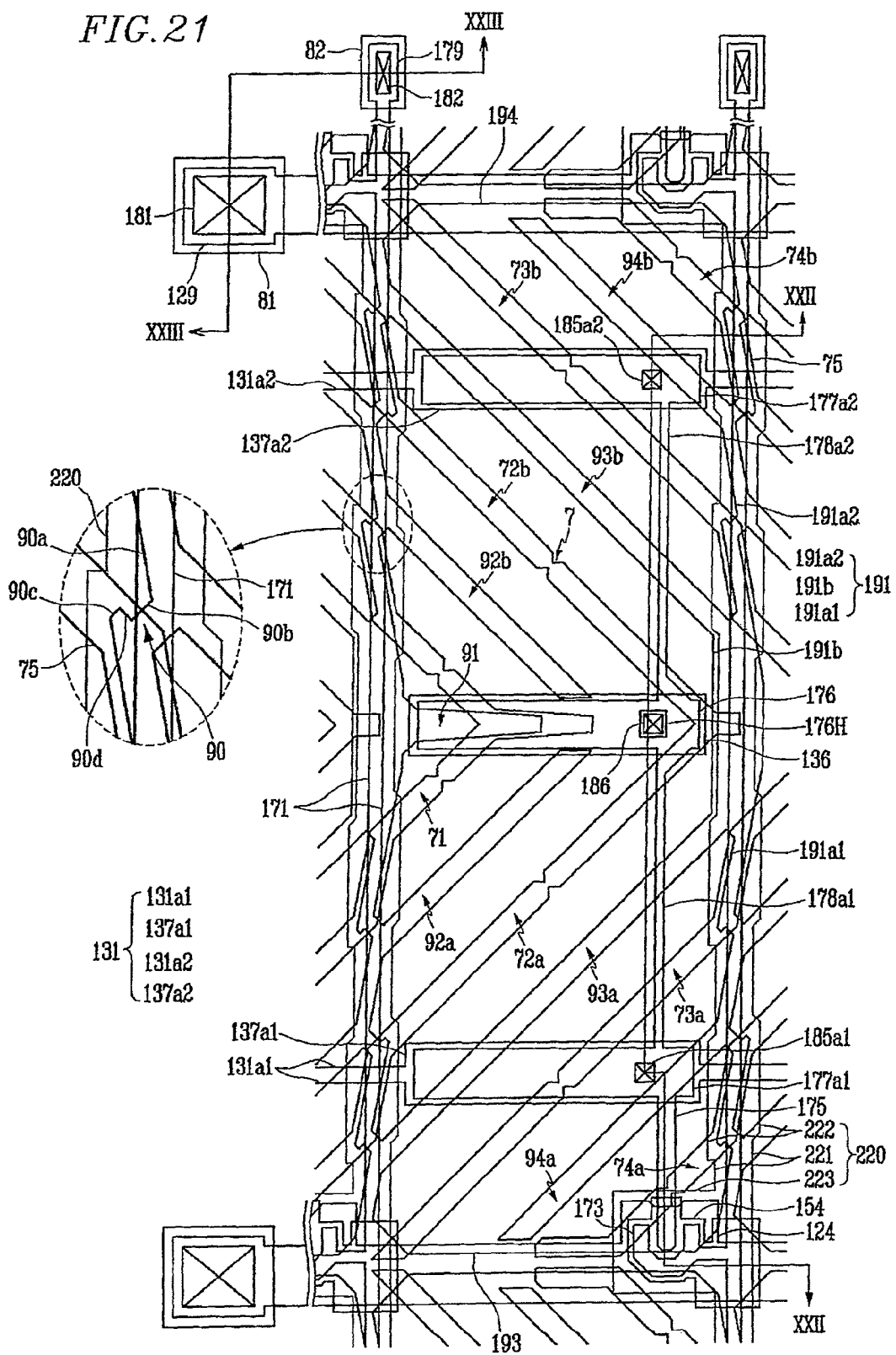
FIG. 21 is a view showing a layout of a liquid crystal display apparatus according to an exemplary embodiment of the present invention.
Figure 22:
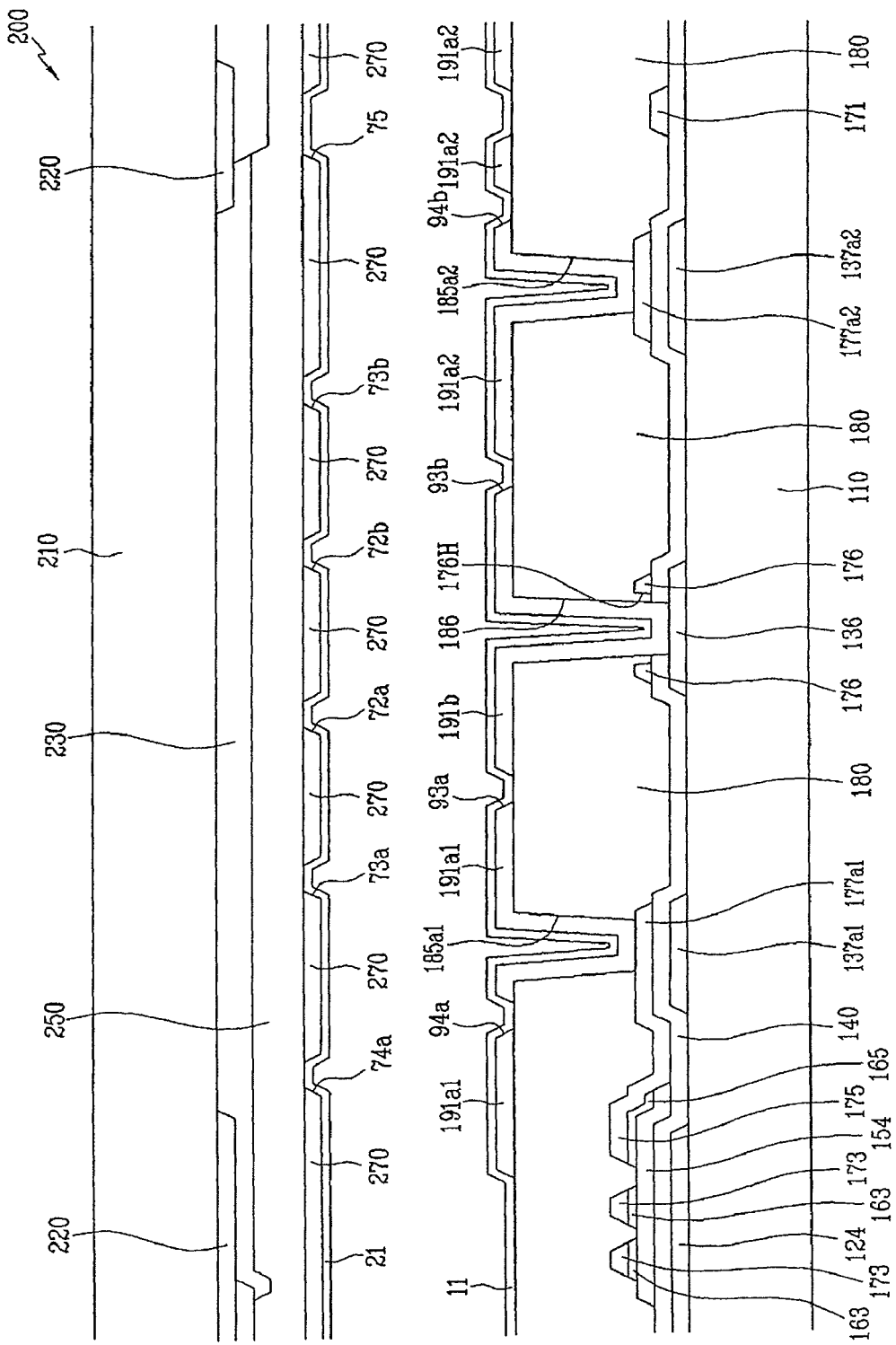
FIG. 22 is a cross sectional view showing the liquid crystal display apparatus taken along line XXII-XXII of FIG. 21.
Figure 23:
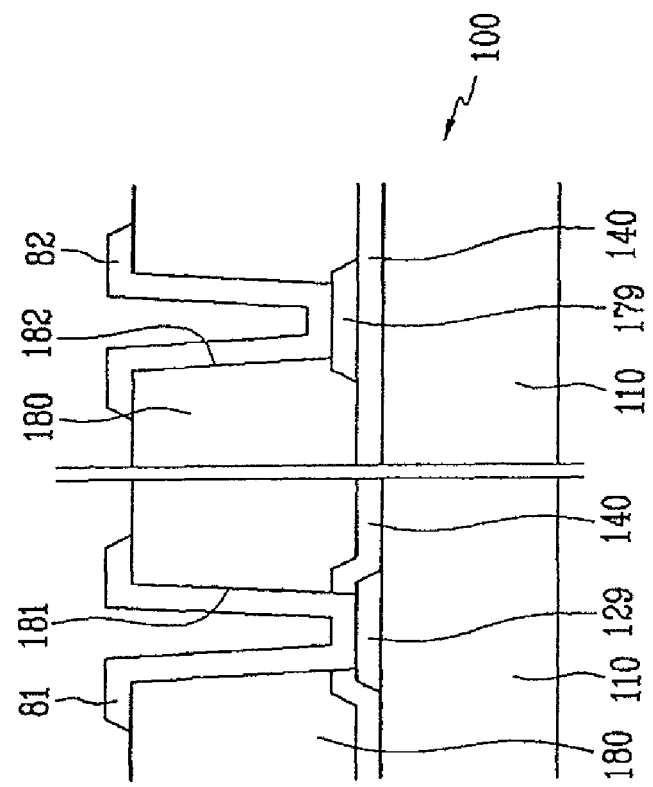
FIG. 23 is a cross sectional view showing the liquid crystal display apparatus taken along line XXIII-XXIII of FIG. 21.
Figure 24:
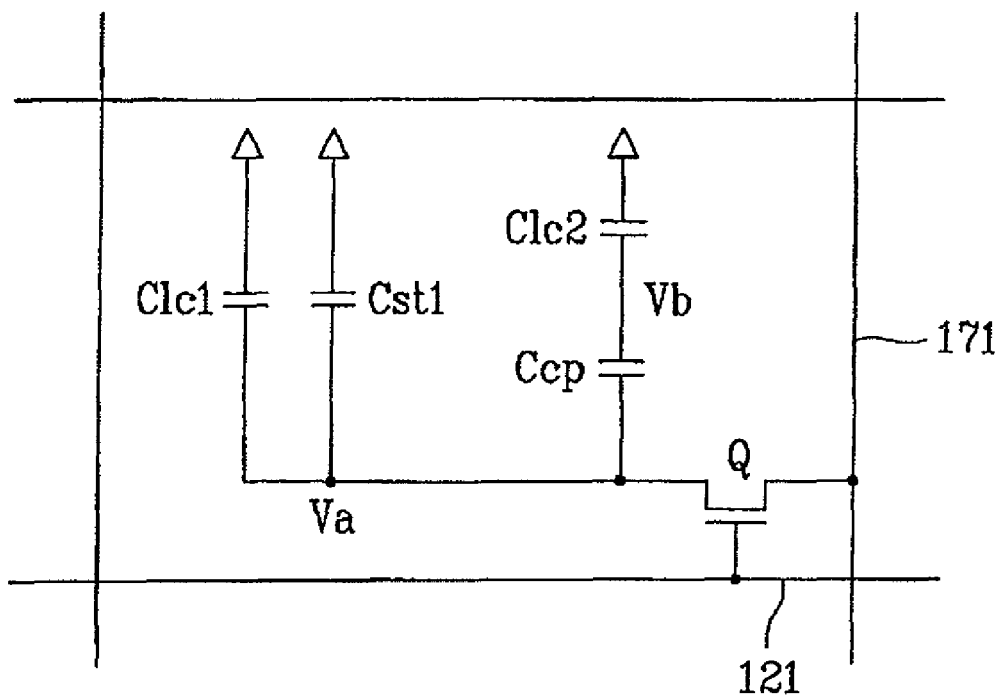
FIG. 24 is a schematic equivalent circuit diagram of a pixel of the liquid crystal display apparatus shown in FIG. 21.

FIG. 21 is a view showing a layout of a liquid crystal display apparatus according to another exemplary embodiment of the present invention. FIG. 22 is a cross sectional view showing the liquid crystal display apparatus taken along line XXII-XXII of FIG. 21. FIG. 23 is a cross sectional view showing the liquid crystal display apparatus taken along line XXIII-XXIII of FIG. 21. FIG. 24 is a schematic equivalent circuit diagram of a pixel of the liquid crystal display apparatus shown in FIG. 21.

Referring to FIGS. 21 to 24, the liquid crystal display apparatus includes a thin film transistor panel 100 and a common electrode panel 200 which face each other and a liquid crystal layer 300 interposed between the panels 100 and 200.

Firstly, the thin film transistor panel 100 will be described in detail.

A plurality of gate conductors including a plurality of gate lines 121, a plurality of storage electrode lines 131, and a plurality of capacitive electrodes 136 are disposed on an insulating substrate 110 made of a transparent glass or a plastic material.

The gate lines 121 transmitting gate signals mainly extend in the transverse direction. The gate lines 121 include a plurality of gate electrodes 124 which protrude upwardly and end portions 129 which have wide areas for connection to other layers or external driver circuits The storage electrode lines 131 which are applied with predetermined voltages include lower and upper stem lines 131a1 and 131a2 which extend substantially in parallel to the gate lines 121. Each of the storage electrode lines 131 is disposed between adjacent two gate lines 121. The lower stem line 131a1 is closer to the lower one of the two gate lines 121.

The upper stem line 131a2 is closer to upper one of the two gate lines 121.

The lower and upper stem lines 131a1 and 131a2 include lower and upper storage electrodes 1371a and 1371b which are enlarged downwardly and upwardly.

The capacitive electrode 136 has a shape of a rectangle which is elongated in the transverse direction. The capacitive electrode 136 is separated from the gate line 121 and the storage electrode line 131. The capacitive electrode 136 is disposed between a pair of the lower and upper storage electrodes 1371a and 1371b and separated by substantially the same distance from the lower and upper storage electrodes 1371a and 1371b. In addition, the capacitive electrode 136 is also separated by the same distance from the adjacent two gate lines 121. However, various shapes and arrangement may be used for the storage electrode lines 131.

Side surfaces of the gate conductors 121, 131, and 136 are slanted with respect to a surface of the substrate 110, at an angle in a range of about 30° to about 80°.

A gate insulating layer 140 made of a silicon nitride $SiN_x$ or the like is formed on the gate conductors 121, 131, and 136.

A plurality of island-shaped semiconductor members 154 made of a hydrogenated amorphous silicon (abbreviated to a-Si) or polysilicon are formed on the gate insulating film 140. The semiconductor members 154 are disposed on the gate electrodes 124 and include expansion portions covering boundaries of the gate lines 121. In addition, island-shaped semiconductor members may be separately formed to cover boundaries of the storage electrode lines 131.

A plurality of island-shaped ohmic contacts 163 and 165 are formed on semiconductor members 154. The ohmic contacts 163 and 165 may be made of made of silicide or an n+ hydrogenated amorphous silicon which is heavily doped with n-type impurities such as phosphorus (P). A pair of the ohmic contacts 163 and 165 are disposed on the semiconductor member 154.

Side surfaces of the semiconductor members 154 and the ohmic contacts 163 and 165 are also slanted with respect to the surface of the substrate 100 at an angle in a range of about 30° to about 80°.

A plurality of data conductors including a plurality of data lines 171 and a plurality of drain electrodes 175 are formed on the ohmic contacts 163 and 165 and the gate insulating film 140.

The data lines 171 transmitting data signals mainly extend in the longitudinal direction to intersect the gate lines 121 and the storage electrode lines 131. The data lines 171 include a plurality of source electrodes 173 which protrude toward the gate electrodes 124 and end portions 179 which have wide areas for connection to other layers or external driver circuits.

The drain electrode 175 is separated from the data line 171. The drain electrodes 175 include a bar-shaped end portion which faces a source electrode 173 with respect to the gate electrode 124 interposed therebetween. The bar-shaped end portion is partially surrounded by the U-shaped source electrode 173.

The drain electrode 175 includes lower, upper, and central expansion portions 177a1, 177a2, and 176 and a pair of connection portions 178a1 and 178a2 which connects the expansion portions 177a1, 177a2, and 176 have a shape of a rectangle which is elongated in the transverse direction. The connection portions 178a1 and 178a2 connects the expansion portions 177a1, 177a2, and 176 at both sides thereof and are substantially parallel to the data lines 171

The lower and upper expansion portions 177a1 and 177a2 overlap the lower and upper storage electrodes 137a1 and 137a2.

The central expansion portion 176 overlaps the capacitive electrode 136. Hereinafter, the central expansion portion 176 is referred to as a coupling electrode.

A contact hole 176H is formed at the right end portion of the coupling electrode 176. The shape of the coupling electrode 176 is formed to be substantially the same as that of the capacitive electrode 136.

For example, side surfaces of the data conductors 171, 175, and 176 are also slanted with respect to the surface of the substrate 110 at an angle ranging from about 30° to about 80°.

The ohmic contacts 163 and 165 are interposed only between the underlying semiconductor members 154 and the overlying data conductors 171 and 175 and reduce contact resistance therebetween. The extension portions of the semiconductor members disposed on the gate lines 121 allows the profile of surfaces to be smoothed, so that the disconnection of the data lines 171 can be prevented. The semiconductor members 154 have planar shapes which are substantially equal to shapes of the data lines 171, the drain electrodes 175, and the underlying ohmic contacts 161 and 165. The semiconductor members 154 have exposed portions uncovered by the data conductors 171 and 175 in addition to portions disposed between the source electrodes 173 and the drain electrodes 175.

A protective layer 180 is formed on the data conductors 171 and 175 and the exposed portions of the semiconductor members 154. The protective layer 180 is made of an inorganic insulating material or an organic insulating material, and a surface thereof may be planarized. A plurality of contact holes 182 which expose end portions 179 of the data lines 171 and a plurality of contact holes 185a1 and 185a2 which expose lower and upper expansion portions 177a1 and 177a2 of the drain electrodes 175, respectively, are formed on the protective layer 180. In addition, a plurality of contact holes 181 which expose end portions 129 of the gate lines 121 and a plurality of contact holes 186 which expose the capacitive electrodes 136 through contact holes 176H of coupling electrodes 176 are formed on the protective layer 180 and the gate insulating layer 140.

A plurality of pixel electrodes 191 and a plurality of contact assistants 81 and 82 are formed on the protective layer 180. The components may be made of a transparent conducive material such as, for example, ITO and IZO or a reflective metal such as, for example, aluminum (Al), silver (Ag), chromium (Cr), and an alloy thereof.

The pixel electrode 191 has a pair of first primary edges 193 and 194 facing each other and second primary edges which are connected to the first primary edges 193 and 194 and include a plurality of sawteeth 90 and lower edges 90c connecting the sawteeth 90. Each of the sawteeth 90 includes first and second slanted edges 90a and 90d which are slanted with respect to the first primary edges 193 and 194 and an upper edge 90b. The first primary edges 193 and 194 are parallel to the gate lines 121. The first primary edges 193 and 194 and the second primary edges constitute an approximate rectangle. The pixel electrode 191 has the four chamfered corners which has an angle of about 45° with respect to the gate lines 121.

The first slanted edge 90a partially overlaps the data line 171. The first slanted edges 90a of the adjacent two pixel electrodes 191 are disposed to face each other in parallel to each other.

Each of the pixel electrodes 191 includes lower and upper sub pixel electrodes 191a1 and 191a2 and a central sub pixel electrode 191b which are divided by the lower and upper gaps 93a and 93b. The lower and upper gaps 93a and 93b extend substantially in the slanted directions from the left side to the right side of the pixel electrode 191. Accordingly, the central sub pixel electrode 191b has a shape of isosceles trapezoid, and the lower and upper sub pixel electrodes 191a1 and 191a2 have a shape of rectangular trapezoid. The lower and upper gaps 93a and 93b are perpendicular to each other with slanted angles of about 45° with respect to the gate line 121.

The lower and upper sub pixel electrodes 191a1 and 191a2 are connected to the lower and upper expansion portions 177a1 and 177a2 of the drain electrode 175 through the contact holes 185a1 and 185a2.

The central sub pixel electrode 191b is connected to the capacitive electrode 136 through the contact hole 186 and overlaps a coupling electrode 176. The central sub pixel electrode 191b and the capacitive electrode 136 together with the coupling electrode 176 constitute a coupling capacitor.

A central cutout portion 91 and first upper and lower slanted cutout portions 92a and 92b are formed in the central sub pixel electrode 191b. A second lower slanted cutout portion 94a is formed in the lower sub pixel electrode 191a1. A second upper slanted cutout portions 94b is formed in the upper sub pixel electrode 191a2. The cutout portions 91, 92a, 92b, 94a, and 94b divide the sub pixel electrodes 191b, 191a1, and 191a2 into a plurality of sub areas. The pixel electrode 1991 including the cutout portions 91, 92a, 92b, 94a, and 94b and the gaps 93a and 93b (hereinafter, referred as cutout portions) have an inversion symmetry with respect to the capacitive electrode 136.

The lower and upper slanted cutout portions 92a to 94b extend substantially in the slanted directions from the right corners, the lower side, or the upper side to the right side of the pixel electrode 191. The lower and upper slanted cutout portions 92a to 94b extend in perpendicular to each other with slanted angles of about 45° with respect to the gate line 121. Each of the lower and upper slanted cutout portions 92a, 92b, 94a, and 94b has an inlet at the right or left side of the pixel electrode 191. The inlets may be connected to the concave portions 90c.

The first slanted edges 90a of the sawteeth 90 of the second primary edges have an obtuse angle with respect to the slanted cutout portions 92a to 94a, and the second slanted edges 90d thereof are substantially parallel to the slanted cutout portions 92b to 94b.

The central cutout portion 91 extends along the storage electrode line 131 and has an inlet toward the left side of the pixel electrode 191. The inlet of the central cutout portion 91 has a pair of slanted edges which are substantially parallel to the lower cutout portions 92a to 94a and the upper cutout portions 92b~94b, respectively.

The number of the cutout portions and the number of the partitions may vary according to design factors such as, for example, the size of the pixel electrodes 191a1, 191a2, and the 191b, the ratio of lengths of the transverse and longitudinal sides of the pixel electrodes 191a1, 191a2, and the 191b, and the types or characteristics of the liquid crystal layer 3.

The contact assistants 81 and 82 are connected to the end portion 129 of the gate line 121 and the end portion 179 of the data line 171 through the contact holes 181 and 182, respectively.

Now, the common electrode panel 200 will be described in detail. A light blocking member 220 is formed on the insulating substrate 210 made of a transparent glass or a plastic material. The light blocking member 220 includes line-shaped portions 211 corresponding to the data lines 171, enlarged portions 222 formed by enlarging some portions of the light blocking member 220, and plane-shaped portions 223 corresponding to the thin film transistors. The light blocking member 220 prevents light leakage between the pixel electrodes 191 and defining opening regions facing the pixel electrodes. However, the light blocking member 220 may further include a plurality of opening portions facing the pixel electrodes 191 and which have substantially the same shape as the pixel electrodes 191.

A plurality of color filters 230 are formed on the substrate 210. Most portions of the color filters 230 are disposed in regions surrounded by the light-blocking member 220. In addition, the color filters 230 extend along rows of the pixel electrodes 191 in the longitudinal direction. Each of the color filters 230 can display one of primary colors such as red, green, and blue.

A cover film 250 is formed on the color filters 230 and the light-blocking member 220. The cover film 250 may be made of an (organic) insulating material. The cover film 250 prevents the color filters 230 from being exposed and provides a planarized surface. The cover film 250 may be omitted.

A common electrode 270 is formed on the cover film 250.

A plurality of cutout portions 71, 72a, 72b, 73a, 73b, 74a, 74b, and 75 are formed on the common electrode 270.

One cutout portion set 71-75 faces one pixel electrode 191 and includes a central cutout portion 71, first to third lower slanted cutout portions 72a, 73a, and 74a, first to third upper slanted cutout portions 72b, 73b, and 74b, and a connection portions 75. The cutout portions 71, 72a, 72b, 73a, 73b, 74a, and 74b are disposed between the adjacent cutout portions 91, 92, 93a, 93b, 94a, 94b, 95a, and 95b of the pixel electrode 191 or between the cutout portions 91, 92, 93a, 93b, 94a, 94b, 95a, and 95b and the chamfered edge of the pixel electrode 191. In addition, each of the cutout portions 71, 72a, 72b, 73a, 73b, 74a, and 74b extends substantially in parallel to the lower cutout portions 93a, 94a, 95a or upper cutout portions 93b, 94b, and 95b of the pixel electrode 191 and include at least one slanted portion.

The first lower and upper slanted cutout portions 72a and 72b extend substantially from the right side to the left side of the pixel electrode 191. The second lower and upper slanted cutout portions 73a and 73b extend substantially from the right side to the upper and lower left corners of the pixel electrode 191, respectively. The third lower and upper slanted cutout portions 74a and 74b extend substantially from the right side to the lower and upper sides of the pixel electrode 191, respectively. The third lower and upper slanted cutout portions 74a and 74b include terminated transverse portions which extend from the ends of the third lower and upper slanted cutout portions 74a and 74b to overlap the lower and upper sides of the pixel electrode 191. The terminated transverse portion has an obtuse angle with respect to the slanted cutout portions 74a and 74b.

The central cutout portion 71 includes a central transverse portion and a pair of slanted portions. The central transverse portion extends substantially from the right side of the pixel electrode 191 along the storage electrode line 131 in the left direction. A pair of the slanted portions extend substantially in parallel to the lower and upper cutout portions 72a, 72b, 73a, 73b, 74a, and 74b from the end of the central transverse portion to the left side of the pixel electrode 191.

The one end of the one slanted portion of the central cutout portion 71 and the one end of the second lower cutout portion 73a of the adjacent pixel electrode are connected with one of the connection portions 75. The one end of the other slanted portion of the central cutout portion 71 and the one end of the second upper cutout portion 73b of the adjacent pixel electrode are connected with one of the connection portions 75. The one end of the first lower slanted cutout portion 72a and the one end of the third lower slanted cutout portion 74a of the adjacent pixel electrode are connected with one of the connection portions 75. The one end of the first upper slanted cutout portion 72b and the one end of the third upper slanted cutout portion 74b of the adjacent pixel electrode are connected with one of the connection portions 75. The connection portions 75 are parallel to the first slanted edges 90a of the pixel electrode 191 and located at portions corresponding to the data line 171. The width of the connection portions 75 in this embodiment is larger by about 8 μm than the interval between the adjacent pixels 191. The enlarged portions 222 of the light blocking member 220 may have a width larger than the other portions corresponding to the connection portions 75.

On the other hand, according to this embodiment of the present invention, a plurality of convex notches 7 which are periodically disposed with a predetermined interval may be provided in the cutout portions 71 to 74b.

Alignment films 11 and 21 are coated on inner surfaces of the panels 100 and 200, respectively. The alignment films 11 and 21 may be a vertically-aligned film. Polarizers are disposed on outer surfaces of the panels 100 and 200, respectively. The transmission axes of the two polarizers are perpendicular to each other, and one of the transmission axes is preferably parallel to the gate lines 121. In the case of a reflective liquid crystal display apparatus, one of the two polarizers may be omitted.

The liquid crystal display apparatus according to the present embodiment may further include a phase retardation film for compensating for retardation of the liquid crystal layer 3. The phase retardation films have birefringence and have a function of inversely compensating for the birefringence of the liquid crystal layer 3.

The liquid crystal display apparatus may include a backlight unit for supplying light to the polarizers, the phase retardation film, the panels 100 and 200, and the liquid crystal layer 3.

The liquid crystal layer 3 has a negative anisotropic permittivity, and the liquid crystal molecules 31 of the liquid crystal layer 3 are aligned so that the major axes thereof are perpendicular to the surfaces of the two panels 100 and 200 when no electric field is applied to the liquid crystal molecules. As a result, incident light cannot pass through the perpendicular polarizers and is thus blocked.

In the liquid crystal display apparatus shown in FIGS. 21 to 25, opaque members such as the storage electrode lines 131, the capacitive electrodes 136, the expansion portions 177a1, 177a2, and 176 of the drain electrodes 175, and the connection portions 178a1 and 178a2 and transparent members such as the pixel electrodes 191 and the common electrode 270 including the cutout portions 91 to 94b and 71 to 75 are symmetrically disposed with respect to the capacitive electrodes 136 which are separated by the same distance from the adjacent two gate lines 121.

Now, the liquid crystal display apparatus will be described more in detail with respect to FIG. 24.

Referring to FIG. 24, one pixel of the liquid crystal display apparatus includes a thin film transistor Q, a first sub pixel electrode including a first liquid crystal capacitor $C_{LC}a$ and a storage capacitor $C_{ST}$, a second sub pixel electrode including a second liquid crystal capacitor $C_{LC}b$, and a coupling capacitor Ccp.

The first liquid crystal capacitor $C_{LC}a$ includes the upper and lower sub pixel electrodes 191a1 and 191a2 as the one port thereof, the common electrode 270 as the other port thereof, and the liquid crystal layer 3 interposed between the two ports as the dielectric member. Similarly, the second liquid crystal capacitor $C_{LC}b$ includes the central sub pixel electrode 191b as the one port thereof, a corresponding portion of the common electrode 270 as the other port thereof, and the liquid crystal layer 3 interposed between the two ports as the dielectric member.

The storage capacitor $C_{ST}$ includes the lower and upper expansion portions 177a1 and 177a2 of the drain electrode 175 as the one port thereof, the lower and upper storage electrodes 137a1 and 137a2 as the other port thereof, and a corresponding portion of the gate insulating layer 140 interposed between the two ports as the dielectric member. The coupling capacitor $C_{CP}$ includes the central sub pixel electrode 191b and the capacitive electrode 136 as the one port thereof, the coupling electrode 176 as the other port thereof, and corresponding portions of the proactive layer 180 and the gate insulating layer 140 interposed between the two ports as the dielectric member.

The first liquid crystal capacitor $C_{LC}a$ and the storage capacitor $C_{ST}$ are connected to the drain electrode of the thin film transistor Q. The coupling capacitor $C_{CP}$ is connected between the thin film transistor Q and the second liquid crystal capacitor $C_{LC}b$. The common electrode 270 is applied with a common voltage Vcom. The storage electrode line 131 may also be applied with the common voltage Vcom.

The thin film transistor Q applies a data voltage from the data line 171 to the first liquid crystal capacitor $C_{LC}a$ and the coupling capacitor $C_{CP}$ according to a gate signal from the gate line 121. The coupling capacitor $C_{CP}$ changes a size of the voltage and transmits the voltage to the second liquid crystal capacitor $C_{LC}b$. p If the storage electrode line 131 is applied with the common voltage Vcom, and if the electrostatic capacitances of the capacitors $C_{LC}a$, $C_{ST}$, $C_{LC}b$, and Ccp are denoted by $C_{LC}a$, $C_{ST}$, $C_{LC}b$, and Ccp, a voltage Va charged in the first liquid crystal capacitor $C_{LC}a$ and a voltage Vb charged in the second liquid crystal capacitor $C_{LC}b$ have a relation as follows.

$$Vb=Va[Ccp/(Ccp+C_{LC}b)]$$

Since a value of Ccp/(Ccp+$C_{LC}$b) is less than 1, the voltage Vb charged in the second liquid crystal capacitor $C_{LC}b$ is always smaller than the voltage Va charged in the first liquid crystal capacitor $C_{LC}a$. Even in a case where the voltage of the storage electrode line 131 is not the common voltage Vcom, the relation is satisfied.

When the voltage difference between the two ports of the first or second liquid crystal capacitor $C_{LC}a$ or $C_{LC}b$ is generated, an electric field is generated in the liquid crystal layer 3 in a direction substantially perpendicular to the panels 100 and 200. In response to the electric field, the liquid crystal molecules have a tendency to change the major axis direction to be perpendicular to the direction of the electric field. According to the degree of the tilted angle of the liquid crystal molecules, polarization of the light passing through the liquid crystal layer 3 changes. The change in the polarization results in a change in transmittance of the light due to the polarizers 12 and 22, so that an image is display on the liquid crystal display apparatus.

The tilted angle of the liquid crystal molecules varies according to the strength of the electric filed. Since the voltage Va charged in the first liquid crystal capacitor $C_{LC}a$ is different from the voltage Vb charged in the second liquid crystal capacitor $C_{LC}b$, the tilted angles of the liquid crystal molecules in the first and second sub pixels are different from each other. As a result, the brightnesses of the two sub pixel electrodes are different from each other. Accordingly, by adjusting the voltage Va charged in the first liquid crystal capacitor $C_{LC}a$ and the voltage Vb charged in the second liquid crystal capacitor $C_{LC}b$, the brightness of the image seen from a side of the liquid crystal display apparatus can be closest to the brightness of the image seen from a front of the liquid crystal display apparatus, thereby improving the side viewing angle.

The ratio of the voltage Va charged in the first liquid crystal capacitor $C_{LC}a$ and the voltage Vb charged in the second liquid crystal capacitor $C_{LC}b$ can be adjusted by changing the electrostatic capacitance of the coupling capacitor $C_{CP}$. The electrostatic capacitance of the coupling capacitor $C_{CP}$ can be changed by adjusting the overlapping area and distance between the second sub pixel electrode 191b, the capacitive electrode 136, and the coupling electrode 176. For example, by removing the capacitive electrode 136 and disposing the coupling electrode 176 at the position where the capacitive electrode 136 is removed, the distance between the coupling electrode 176 and the second sub pixel electrode 191b can increase. For example, the voltage Vb charged in the second liquid crystal capacitor $C_{LC}b$ may be about 0.6 to about 0.8 times larger than the voltage Va charged in the first liquid crystal capacitor $C_{LC}a$.

In contrast, the voltage Vb charged in the second liquid crystal capacitor $C_{LC}b$ may be designed to larger than the voltage Va charged in the first liquid crystal capacitor $C_{LC}a$ by precharging the second liquid crystal capacitor $C_{LC}b$ with a predetermined voltage such as the common voltage Vcom.

Preferably, the ratio of areas of the lower and upper sub pixel electrodes 191a1 and 191a2 and an area of the central sub pixel electrode 191b is in a range of from about 1:0.85 to about 1:1.15. The number of the sub pixel electrode of each of the sub pixel may vary.

In addition, by providing the sawteeth to the side of the pixel electrode 191 adjacent to the data line 171, the secondary electric field generated between the adjacent pixel electrodes 191 can control the alignment of the liquid crystal molecules 31 in the sub areas. In addition, by providing the connection portions 75 at the positions corresponding to the regions where the first slanted edges 90a of the adjacent two pixel electrodes 191 face each other, the alignment of the liquid crystal molecules 31 in the sub areas can be controlled.

Now, a liquid crystal display apparatus according to another exemplary embodiment of the present invention will be described in detail with reference to FIGS. 25 to 29.

Figure 25:
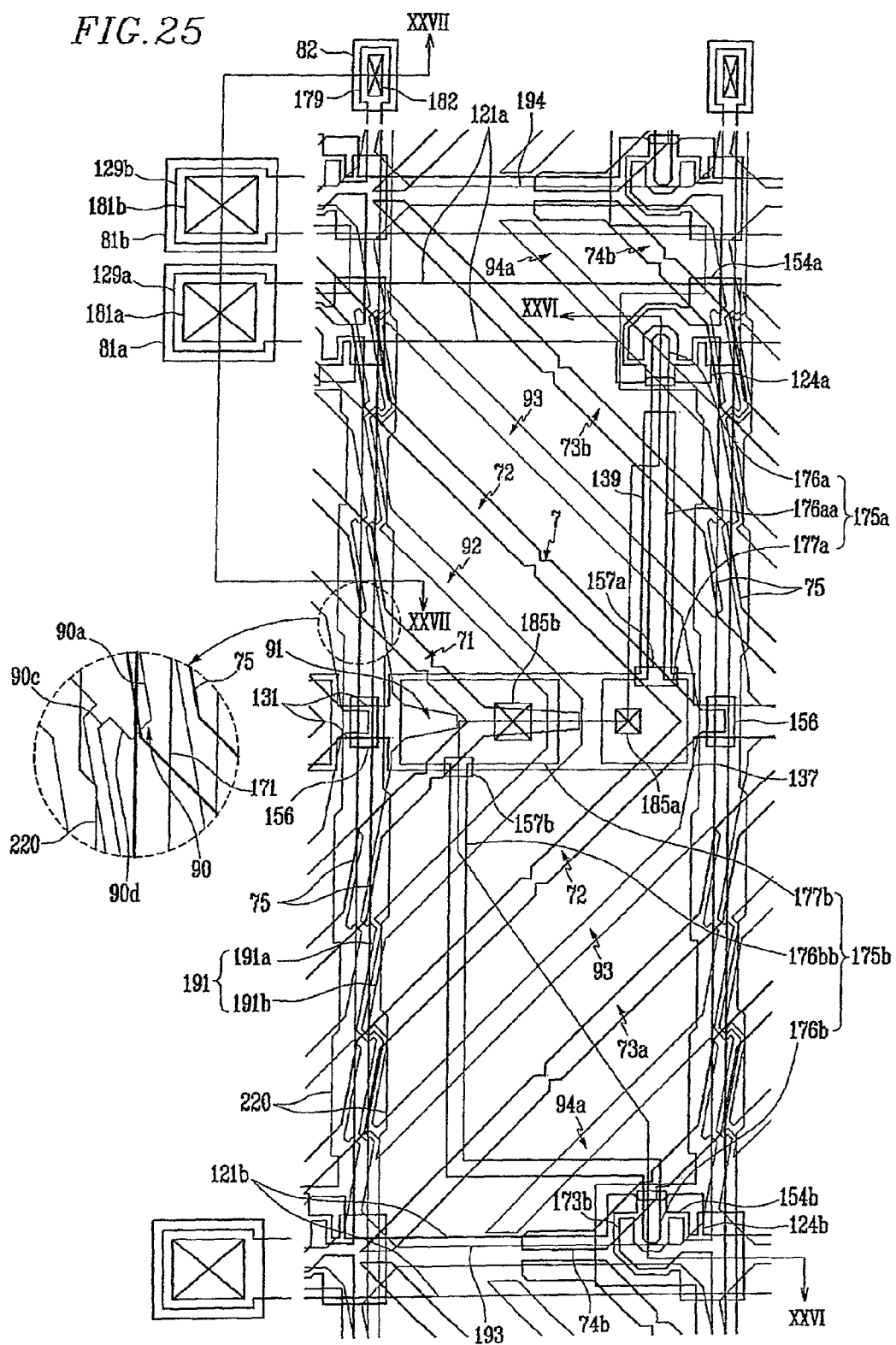
FIG. 25 is a view showing a layout of a liquid crystal display apparatus according to an exemplary embodiment of the present invention.
Figure 26:
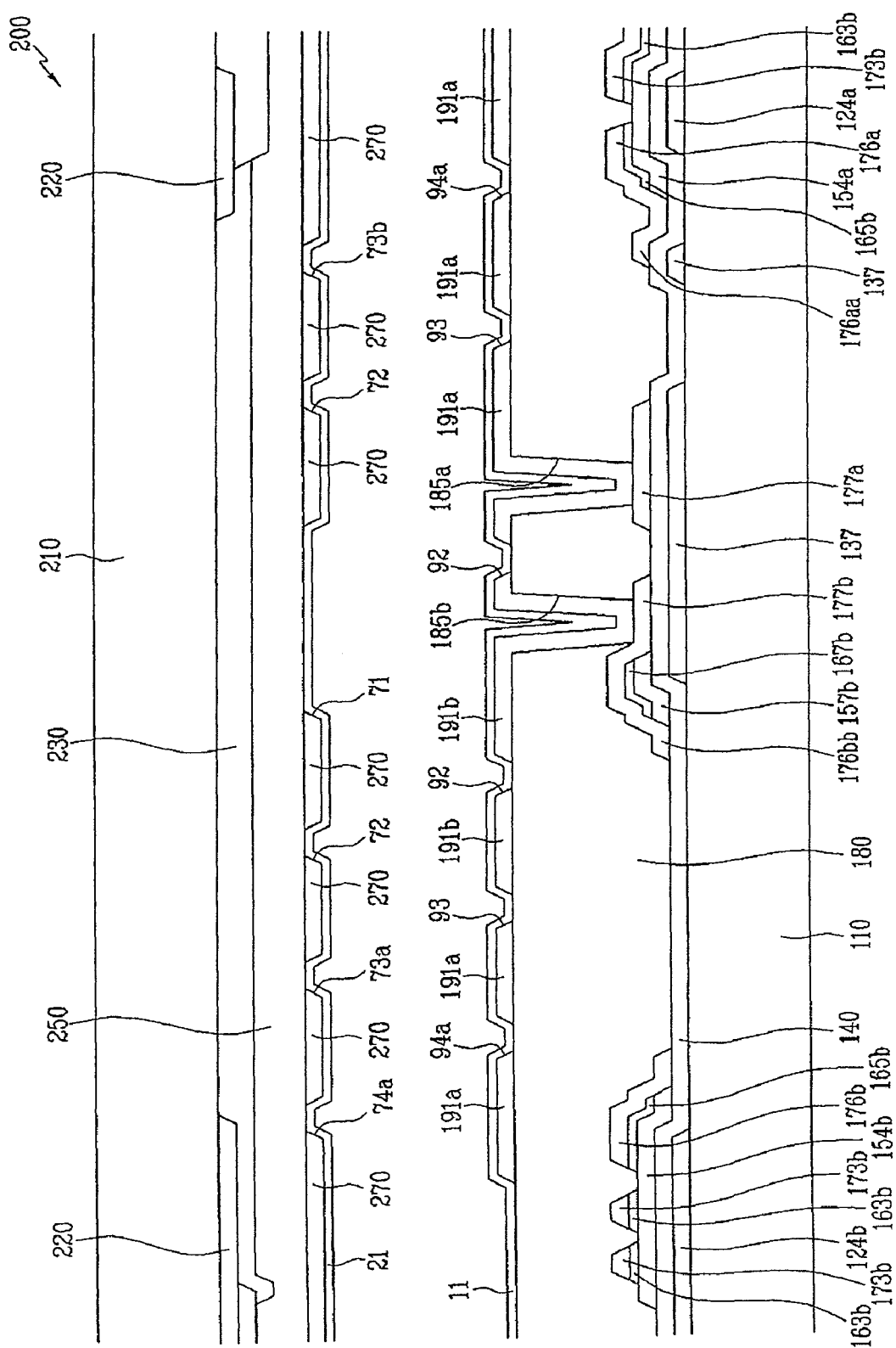
FIG. 26 is a cross sectional view showing the liquid crystal display apparatus taken along line XXVI-XXVI of FIG. 25.
Figure 27:
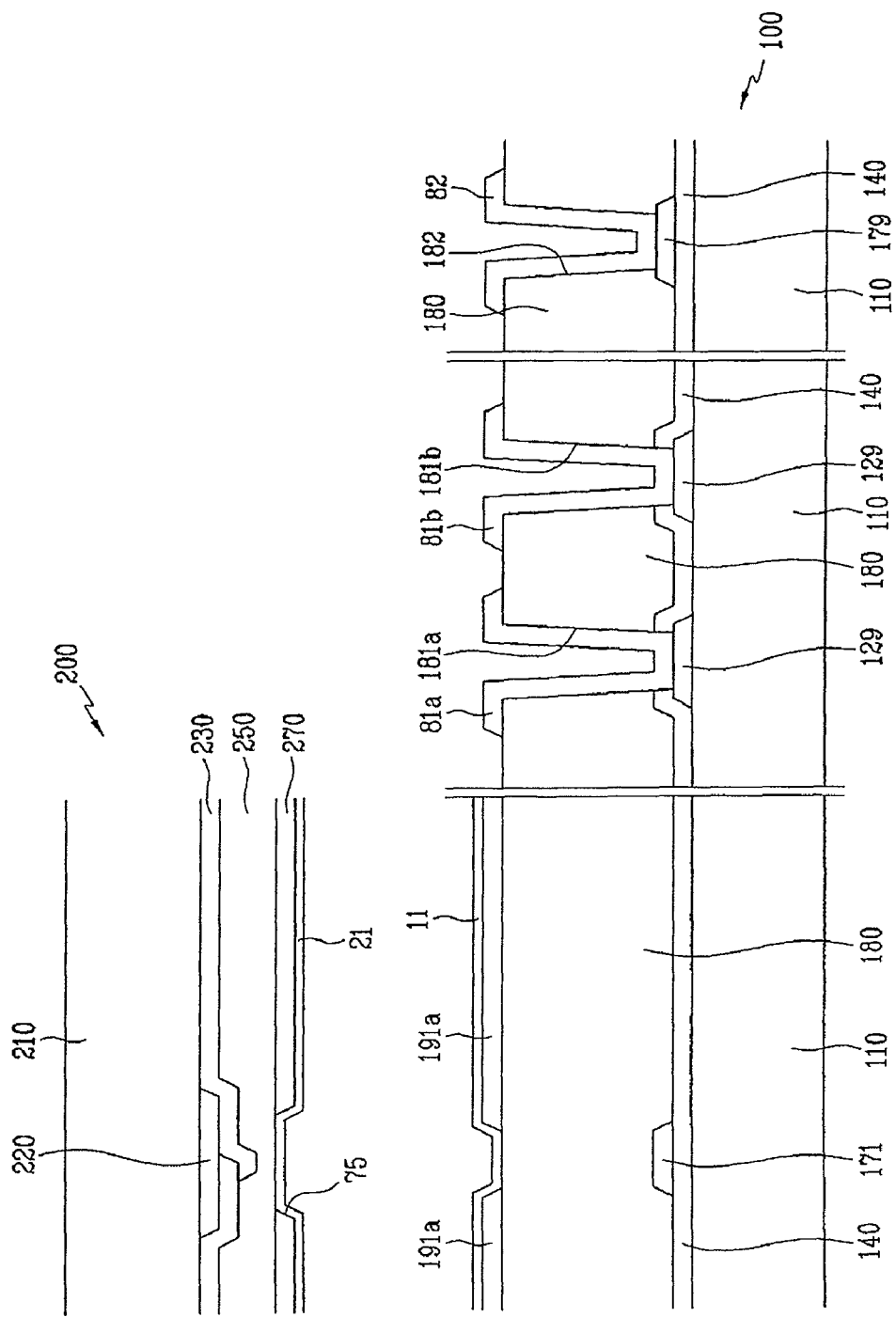
FIG. 27 is a cross sectional view showing the liquid crystal display apparatus taken along line XXVII-XXVII of FIG. 25.

FIG. 25 is a view showing a layout of a liquid crystal display apparatus according to another exemplary embodiment of the present invention. FIG. 26 is a cross sectional view showing the liquid crystal display apparatus taken along line XXVI-XXVI of FIG. 25. FIG. 27 is a cross sectional view showing the liquid crystal display apparatus taken along line XXVII-XXVII of FIG. 25.

Referring to FIGS. 25 to 27, the liquid crystal display apparatus includes a thin film transistor panel 100 and a common electrode panel 200 which face each other and a liquid crystal layer 300 interposed between the panels 100 and 200.

Firstly, the thin film transistor panel 100 will be described in detail.

A plurality of gate conductors including a plurality of pairs of first and second gate lines 121a and 121b and a plurality of storage electrode lines 131 are disposed on an insulating substrate 110 made of a transparent glass or a plastic material.

The first and second gate lines 121a and 121b transmitting gate signals mainly extend in the transverse direction and are located above and under the storage electrode line 131, respectively.

The first gate line 121a include a first gate electrode 124a which protrudes downwardly and an end portion 129a which is disposed in the left side and has an wide area for connection to other layers or external driver circuits.

The second gate line 121b include a second gate electrode 124b which protrudes upwardly and an end portion 129b which is disposed in the left side and has an wide area for connection to other layers or external driver circuits. Alternatively, the end portions 129a and 129b may be disposed at the right side. Otherwise, the end portions 129a and 129b may be disposed at the different sides.

The storage electrode lines 131 which are applied with predetermined voltages extend substantially in parallel to the gate lines 121. Each of the storage electrode lines 131 is disposed between the adjacent first and second gate lines 121a and 121b. The storage electrode line 131 is slightly closer to the first gate line 121a than the second gate line 121b and separated by substantially the same distance from the adjacent two second gate lines 121b. Each of the storage electrode lines 131 includes a storage electrode 137 which is enlarged upwardly and downwardly. The storage electrode 137 has a shape of an approximate rectangle and is symmetrical with respect to the storage electrode line 131. However, various shapes and arrangement may be used for the storage electrode lines 131 and the storage electrodes 137.

Side surfaces of the gate conductors 121a, 121b, and 131 are slanted with respect to a surface of the substrate 110, at an angle in a range of about 30° to about 80°.

A gate insulating layer 140 made of a silicon nitride $SiN_x$ or the like is formed on the gate conductors 121a, 121b, and 131.

A plurality of island-shaped semiconductor members 154a, 154b, 156, 157a, and 157b made of a hydrogenated amorphous silicon (abbreviated to a-Si) or polysilicon are formed on the gate insulating film 140. The semiconductor members 154a and 154b are disposed on the gate electrodes 124a and 124b. The semiconductor members 156 cover boundaries of the gate lines 121. The semiconductor members 157a and 157b partially overlap the boundary lines of the storage electrode 137.

A plurality of island-shaped ohmic contacts 163a, 163b, 165a, 165b, and 167b are formed on semiconductor members 154a, 154b, and 157b. A plurality of island-shaped ohmic contacts are foamed on semiconductor members 156 and 157a. The ohmic contacts 163a, 163b, 165a, 165b, and 167b may be made of made of silicide or an n+ hydrogenated amorphous silicon which is heavily doped with n-type impurities such as phosphorus (P). Pairs of the ohmic contacts 163a and 165b and the ohmic contacts 163b and 165b are disposed on the semiconductor members 154a and 154b, respectively.

Side surfaces of the semiconductor members 154a, 154b, 156, 157a, and 157b and the ohmic contacts 163a, 163b, 165a, 165b, and 167b are also slanted with respect to the surface of the substrate 100 at an angle in a range of about 30° to about 80°.

A plurality of data conductors including a plurality of data lines 171 and a plurality of pairs of first and second drain electrodes 175a and 175b are fanned on the ohmic contacts 163a, 163b, 165a, 165b, and 167b and the gate insulating film 140.

The data lines 171 transmitting data signals mainly extend in the longitudinal direction to intersect the gate lines 121a and 121b and the storage electrode lines 131. The data lines 171 include a plurality of first and second source electrodes 173a and 173b which protrude toward the first and second gate electrodes 124a and 124b and end portions 179 which have wide areas for connection to other layers or external driver circuits.

The first and second drain electrodes 175a and 175b are separated from each other. In addition the first and second drain electrodes are also separated from the data line 171.

The first drain electrode 175a includes a bar-shaped end portion 176a which faces the first source electrode 173a with respect to the gate electrode 124a interposed therebetween, an expansion portion 177a which has a shape of a wide rectangle at the one end thereof opposite to the bar-shaped end portion 176a, and a line-shaped connection portion 176aa which connects the expansion portion 177a and the end portion 176a. The extension portion 177a overlaps the storage electrode 137. The bar-shaped end portion 176a overlaps the first gate electrode 124a and is partially surrounded by the U-shaped first source electrode 173a. The connection portion 176aa of the first drain electrode 175a is mostly located on the extension portion 139. The connection portion 176aa extends along the extension portion 139 and is located within a longitudinal boundary line of the extension portion 139.

Similarly, the second drain electrode 175b includes a bar-shaped end portion 176b which faces the second source electrode 173b with respect to the gate electrode 124b interposed therebetween, an expansion portion 177b which has a shape of a wide rectangle at the one end thereof opposite to the bar-shaped end portion 176b, and a line-shaped connection portion 176ab which connects the expansion portion 177b and the end portion 176b. The extension portion 177b overlaps the storage electrode 137. The bar-shaped end portion 176b overlaps the second gate electrode 124b and is partially surrounded by the U-shaped second source electrode 173b. The area of the expansion portion 177b of the second drain electrode 175b is smaller than that of the expansion portion 177a of the first drain electrode 175a.

The storage capacitance can be increased by providing the extension portion 139 under the connection portion 176aa of the first drain electrode 175a. Accordingly, the area of the storage electrode 137 can be reduced, to thereby increase the aperture ratio of the liquid crystal display apparatus.

The first/second gate electrode 124a (124b), the first/second source electrode 173a (173b), and the first/second drain electrode 175a (175b) together with the first and second semiconductor members 154a (154b) constitute first/second thin film transistor Qa (Qb). The channel of the first/second thin film transistor Qa (Qb) is formed in the first/second semiconductor member 154a (154b) between the first/second source electrode 173a (173b) and the first/second drain electrode 175a (175b).

For instance, side surfaces of the data conductors 171, 175a, and 175b may also be slanted with respect to the surface of the substrate 110 at an angle ranging from about 30° to about 80°.

The ohmic contacts 163a, 163b, 165a, 165b, and 167b are interposed only between the underlying semiconductor members 154a, 154b, and 157b and the overlying data conductors 171, 175a, and 175b and reduce contact resistance therebetween. The semiconductor members 156, 157a, 157b disposed on the gate lines 121a and 121b and the storage electrode lines 131 allows the profile of surfaces to be smoothed, so that the disconnection of the data lines 171 and the drain electrodes 175a and 175b can be prevented. The island-shaped semiconductor members 154a and 154b have exposed portions which do not cover regions between the source electrodes 173a and 173b and the drain electrodes 175a and 175b and the data conductors 171, 175a, and 165b.

A protective layer 180 is formed on the data conductors 171, 175a, and 175b and the exposed portions of the semiconductor members 154a and 154b. The protective layer 180 is made of an inorganic insulating material or an organic insulating material, and a surface thereof may be planarized. A plurality of contact holes 182, 185a, and 185b which expose the end portions 179 of the data lines 171 and the expansion portions 177a and 177b of the drain electrodes 175a and 175b, respectively, are formed on the protective layer 180. A plurality of contact holes 181a and 181b which expose end portions 129a and 129b of the gate lines 121a and 121b are formed on the protective layer 180 and the gate insulating layer 140.

A plurality of pixel electrodes 191 including first and second sub pixel electrodes 191a and 191b and a plurality of contact assistants 81a, 81b, and 82 are formed on the protective layer 180. The components may be made of a transparent conducive material such as, for example, ITO and IZO or a reflective metal such as, for example, aluminum (Al), silver (Ag), chromium (Cr), and an alloy thereof.

The pixel electrode 191 has a shape of an approximate rectangle having four chamfered corners which has an angle of about 45° with respect to the gate lines 121a and 121b.

A pair of the first and second sub pixel electrodes 191a and 191b constituting the pixel electrode 191 are engaged with each other with gaps 92 and 93 interposed therebetween. The second sub pixel electrode 191b has a shape of isosceles trapezoid of which base is recessed in a shape of trapezoid. Moreover, most portions of the second sub pixel electrode 191b are surrounded by the first sub pixel electrode 191a. The first sub pixel electrode 191a includes upper, lower, and central trapezoids which are connected to each other at the left side.

The pixel electrode 191 has a pair of first primary edges 193 and 194 facing each other and second primary edges which are connected to the first primary edges 193 and 194 and include a plurality of sawteeth 90 and lower edges 90c connecting the sawteeth 90. Each of the sawteeth 90 includes first and second slanted edges 90a and 90d which are slanted with respect to the first primary edges 193 and 194 and an upper edge 90b. The first primary edges 193 and 194 are parallel to the gate lines 121. The first primary edges 193 and 194 and the second primary edges constitute an approximate rectangle. The pixel electrode 191 has the four chamfered corners which has an angle of about 45° with respect to the gate lines 121. The first slanted edge 90a partially overlaps the data line 171. The first slanted edges 90a of the adjacent two pixel electrodes 191 are disposed to face each other in parallel to each other.

The first sub pixel electrode 191a includes cutout portions 94a and 94b which extend from an upper side of an upper trapezoid and a lower side of a lower trapezoid toward the right side thereof, respectively. A central trapezoid of the first sub pixel electrode 191a is inserted into a receded lower side of the second sub pixel electrode 191b. In addition, the first sub pixel electrode 191a includes a central cutout portion 91 which has a transverse portion and a pair of slanted portions connected thereto. The transverse portion extends shortly along a transverse central line of the first sub pixel electrode 191a. A pair of the slanted portions extend from the transverse portion toward the left side of the first sub pixel electrode 191a with an angle of 45° with respect to the storage electrode line 131. The gaps 92 and 93 between the first and second sub pixel electrodes 191a and 191b include two pairs of upper and lower slanted portions and a longitudinal portion which have an angle of about 45° with respect to the gate lines 121a and 121b. Hereinafter, for the convenience of description, the gaps 92 and 93 are referred to as a cutout portion. The cutout portions 91 to 94b have an inversion type of symmetry with respect to the storage electrode line 131. The cutout portions 91 to 94b extend in perpendicular to each other with slanted angles of about 45° with respect to the gate lines 121a and 121b. The pixel electrode 191 is divided into a plurality of partitions by the cutout portions 91 to 94b.

Accordingly, the upper and lower half regions with respect to the storage electrode line 131 bisecting the pixel electrode 191 in the transverse direction are divided into four partitions by the cutout portions 91 to 94b.

The number of the partitions and the number of the cutout portions may vary according to design factors such as, for example, the size of the pixel electrode 191, the ratio of lengths of the transverse and longitudinal sides of the pixel electrode 191, and the types or characteristics of the liquid crystal layer 3.

The first and second sub pixel electrodes 191a and 191b are connected to the first and second drain electrodes 175a and 175b through the contact holes 185a and 185b and applied have data voltages applied thereto from the first and second drain electrodes 175a and 175b. A pair of the sub pixel electrodes 191a and 191b have different predetermined data voltages for one input image signal applied thereto. The sizes of the data voltages may be determined according to the areas and shapes of the sub pixel electrodes 191a and 191b. In addition, the areas of the sub pixel electrodes 191a and 191b may be different from each other. As an example,the second sub pixel electrode 191b may have a higher voltage applied thereto than applied to the first sub pixel electrode 191a, and the area of the second sub pixel electrode 191b may be smaller than that of the first sub pixel electrode 191a.

The sub pixel electrodes 191a and 191b which have the data voltages applied thereto and the common electrode 270 which have the common voltage applied thereto constitute first and second liquid crystal capacitors which sustain the applied voltages after the thin film transistor turns off. Each of the liquid crystal capacitors includes a corresponding portion of the liquid crystal layer 3 as the dielectric member.

The first and second sub pixel electrodes 191a and 191b and the expansion portions 177a and 177b of the drain electrodes 173a and 173b electrically connected thereto overlap the storage electrode 137, the extension portion 139, and the storage electrode line 131 so as to constitute a storage capacitor for strengthening a voltage storage capacity of the liquid crystal capacitor.

The contact assistants 81a, 81b, and 82 are connected to the end portions 129a and 129b of the gate lines 121a and 121b and the end portion 179 of the data line 171 through the contact holes 181a, 181b, and 182, respectively.

Now, the common electrode panel 200 will be described in detail.

A light blocking member 220 is formed on the insulating substrate 210 made of a transparent glass or a plastic material. The light blocking member 220 include line-shaped portions corresponding to the data lines 171, enlarged portions formed by enlarging some portions of the light blocking member 220, and plane-shaped portions corresponding to the thin film transistors. The light blocking member 220 prevents light leakage between the pixel electrodes 191 and defining opening regions facing the pixel electrodes. However, the light blocking member 220 may further include a plurality of opening portions facing the pixel electrodes 191 and having substantially the same shape as the pixel electrodes 191.

A plurality of color filters 230 are formed on the substrate 210. Most portions of the color filters 230 are disposed in regions surrounded by the light-blocking member 220. In addition, the color filters 230 extend along rows of the pixel electrodes 191 in the longitudinal direction. Each of the color filters 230 can display one of primary colors such as red, green, and blue.

A cover film 250 is formed on the color filters 230 and the light-blocking member 220. The cover film 250 may be made of an (e.g., organic) insulating material. The cover film 250 prevents the color filters 230 from being exposed and provides a planarized surface. The cover film 250 may be omitted.

A common electrode 270 is formed on the cover film 250. The common electrode 270 is made of a transparent conductive material such as, for example, ITO and IZO.

A plurality of cutout portions 71, 72, 73a, 73b, 74a, 74b, and 75 are formed on the common electrode 270.

One cutout portion set 71-75 faces one pixel electrode 191 and includes a central cutout portion 71, first to third lower slanted cutout portions 72, 73a, and 74a, first to third upper slanted cutout portions 72, 73b, and 74b, and a connection portions 75. The cutout portions 71, 72, 73a, 73b, 74a, and 74b are disposed between the adjacent cutout portions 91, 92, 93a, 93b, 94a, and 94b of the pixel electrode 191 or between the cutout portions 91, 92, 93a, 93b, 94a, and 94b and the chamfered edge of the pixel electrode 191. In addition, each of the cutout portions 71, 72, 73a, 73b, 74a, and 74b extends substantially in parallel to the lower cutout portions 93a and 94a or upper cutout portions 93b and 94b of the pixel electrode 191 and include at least one slanted portion.

The first lower and upper slanted cutout portions 72 extend substantially from the right side to the left side of the pixel electrode 191. The second lower and upper slanted cutout portions 73a and 73b extend substantially from the right side to the upper and lower left corners of the pixel electrode 191, respectively. The third lower and upper slanted cutout portions 74a and 74b extend substantially from the right side to the lower and upper sides of the pixel electrode 191, respectively. The third lower and upper slanted cutout portions 74a and 74b include terminated transverse portions which extend from the ends of the third lower and upper slanted cutout portions 74a and 74b to overlap the lower and upper sides of the pixel electrode 191.

The terminated transverse portion has an obtuse angle with respect to the slanted cutout portions 74a and 74b.

The central cutout portion 71 includes a central transverse portion and a pair of slanted portions. The central transverse portion extends substantially from the right side of the pixel electrode 191 along the storage electrode line 131 in the left direction. A pair of the slanted portions extend substantially in parallel to the lower and upper cutout portions 72, 73a, 73b, 74a, and 74b from the end of the central transverse portion to the left side of the pixel electrode 191.

One end of the one slanted portion of the central cutout portion 71 and one end of the second lower cutout portion 73a of the adjacent pixel electrode are connected with one of the connection portions 75. Also, one end of the other slanted portion of the central cutout portion 71 and one end of the second upper cutout portion 73b of the adjacent pixel electrode are connected with one of the connection portions 75. Additionally, one end of the first lower slanted cutout portion 72 and one end of the third lower slanted cutout portion 74a of the adjacent pixel electrode are connected with one of the connection portions 75. Moreover, one end of the first upper slanted cutout portion 72 and one end of the third upper slanted cutout portion 74b of the adjacent pixel electrode are connected with one of the connection portions 75. The connection portions 75 are parallel to the first slanted edges 90a of the pixel electrode 191 and located at portions corresponding to the data line 171. The width of the connection portions 75 is larger by about 8 μm than the interval between the adjacent pixels 191. The enlarged portions 222 of the light blocking member 220 may have a width larger than the other portions corresponding to the connection portions 75.

Triangular-shaped notches 7 are formed in the slanted portions of the cutout portions 71 to 74b. Alternatively, the notches may have various shapes such as, for example, rectangular, trapezoidal and semicircular shapes. In addition, the notches may be formed in a shape of convex or concave. Such notches control the alignment of the liquid crystal molecules 3 located in boundary regions corresponding to the cutout portions 71 to 74b.

The number and directions of the cutout portion 71 to 75 may vary according to design factors, and the light-blocking member 220 overlaps the cutout portions 71 to 75 to prevent the light leakage in the vicinity of the cutout portions 71 to 75.

Alignment films 11 and 21 are coated on inner surfaces of the panels 100 and 200, respectively. The alignment films 11 and 21 may be a vertically-aligned film.

Polarizers are disposed on outer surfaces of the panels 100 and 200, respectively. The transmission axes of the two polarizers are perpendicular to each other, and one of the transmission axes may, for example, be parallel to the gate lines 121a and 121b. In the case of a reflective liquid crystal display apparatus, one of the two polarizers may be omitted.

The liquid crystal display apparatus according to the present embodiment may further include a phase retardation film for compensating for retardation of the liquid crystal layer 3. The phase retardation films have birefringence and have a function of inversely compensating for the birefringence of the liquid crystal layer 3.

The liquid crystal layer 3 has a negative anisotropic permittivity, and the liquid crystal molecules 31 of the liquid crystal layer 3 are aligned so that the major axes thereof are perpendicular to the surfaces of the two panels 100 and 200 when no electric field is applied to the liquid crystal molecules. Therefore, incident light cannot pass through the perpendicular polarizers and is thus blocked.

When a voltage difference between the two ports of the first or second liquid crystal capacitor is generated by applying the common voltage to the common electrode 270 and the data voltage to the pixel electrode 191, an electric field is generated in the liquid crystal layer 3 in a direction substantially perpendicular to the panels 100 and 200. In response to the electric field, the liquid crystal molecules have a tendency to change the major axis direction to be perpendicular to the direction of the electric field. According to the degree of the tilted angle of the liquid crystal molecules, polarization of the light passing through the liquid crystal layer 3 changes. The change in the polarization results in a change in transmittance of the light due to the polarizers, so that an image is displayed on the liquid crystal display apparatus.

The tilted angle of the liquid crystal molecules varies according to the strength of the electric filed. If low and high voltages are applied to the first and second sub pixel electrodes, respectively, the voltage Va of the first liquid crystal capacitor is higher than the voltage Vb of the second liquid crystal capacitor. Therefore, the tilted angles of the liquid crystal molecules in the first and second sub pixels are different from each other. As a result, the brightnesses of the two sub pixel electrodes are different from each other. Accordingly, by adjusting the voltage Va of the first liquid crystal capacitor and the voltage Vb of the second liquid crystal capacitor, the brightness of the image seen from a side of the liquid crystal display apparatus can be closest to the brightness of the image seen from a front of the liquid crystal display apparatus, thereby improving the side viewing angle.

The tilted angle for the liquid crystal molecules is determined by a horizontal component of the electric field generated from distortion of the electric field by the cutout portion 71 to 74b and 91 to 94b of the electric field generating electrodes 191 and 279 and slanted edges of the pixel electrode 191. The horizontal component of the electric field is perpendicular to the edges of the cutout portions 71 to 74b and 91 to 94b and the slanted edges of the pixel electrode 191.

Referring to FIG. 26, one cutout portion set of the cutout portions 71 to 74b and 91 to 94b divide one pixel electrode 191 into a plurality of sub areas having two slanted primary edges. Since the tilted directions of the liquid crystal molecules in the sub areas are determined by the horizontal component of the electric field, the tilted directions of the liquid crystal molecules include roughly four directions.

Further, as the liquid crystal molecules 31 can be adjusted to have various tilted angles, the reference viewing angle of the liquid crystal display apparatus can be increased.

In addition, by providing the sawteeth to the side of the pixel electrode 191 adjacent to the data line 171, the secondary electric field generated between the adjacent pixel electrodes 191 can control the alignment of the liquid crystal molecules 31 in the sub areas. In addition, by providing the connection portions 75 at the positions corresponding to the regions where the first slanted edges 90a of the adjacent two pixel electrodes 191 face each other, the alignment of the liquid crystal molecules 31 in the sub areas can be determined.

The shapes and arrangements of the cutout portions 71 to 74b and 91 to 94b for determining the tilted directions of the liquid crystal molecules may be modified in various manners. At least one of the cutout portions 71 to 74b and 91 to 94b may be replaced with a protrusion or a depression. The protrusions may be made of an organic or inorganic material and disposed above or under the electric field generating electrodes 191 and 270.

In addition, if the area of the second sub pixel electrode 191b applied with a high voltage is designed to be smaller than that of the first sub pixel electrode 191a, distortion in a side viewing gamma curve can be reduced. For example, if the area ratio of the first and second sub pixel electrodes 191a and 191b is about 2:1, the side viewing gamma curve is closer than the front viewing gamma curve, so that side visibility can be improved.

Now, a liquid crystal display apparatus according to another exemplary embodiment of the present invention will be described in detail with reference to FIGS. 28 to 30.

Figure 28:
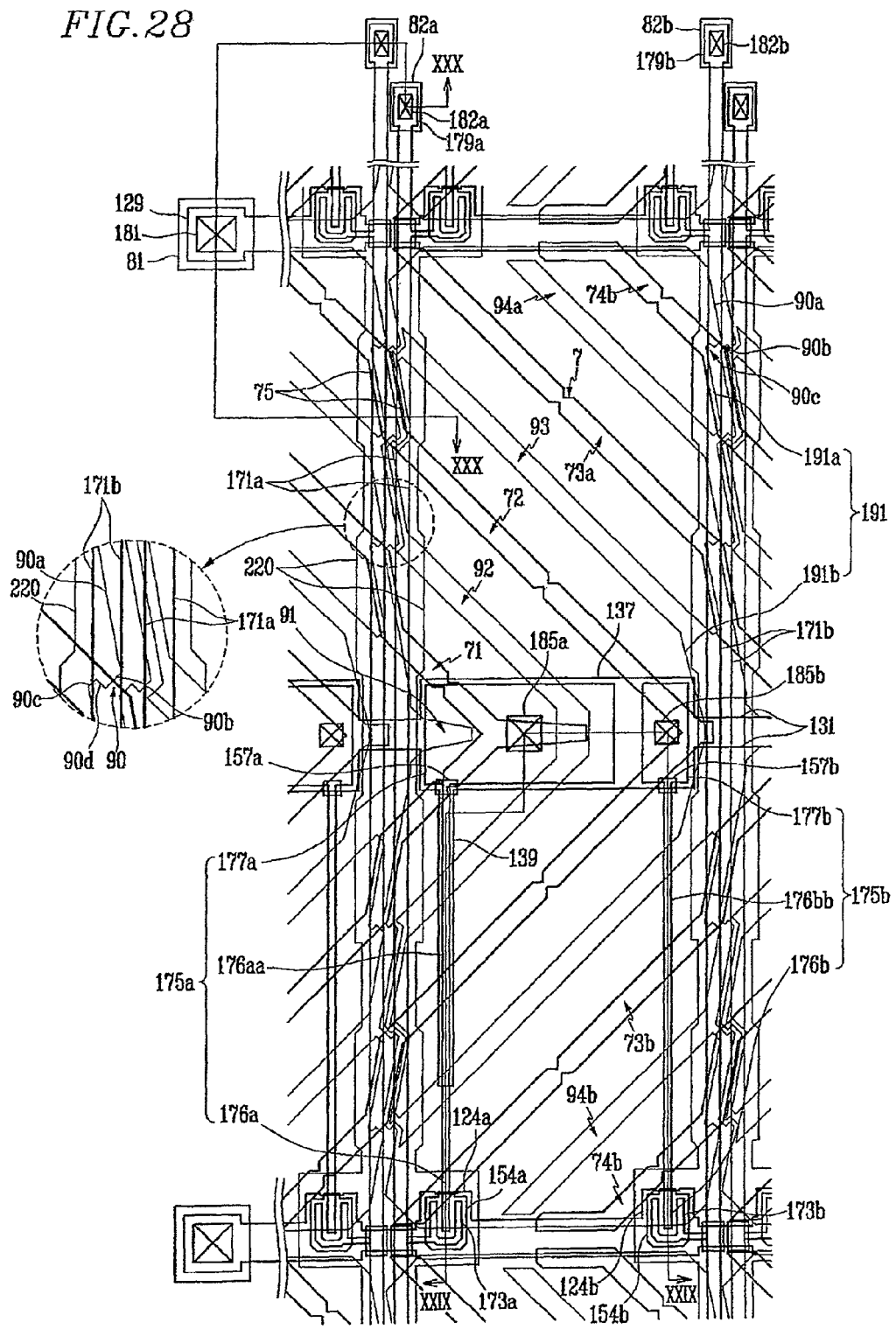
FIG. 28 is a view showing a layout of a liquid crystal display apparatus according to an exemplary embodiment of the present invention.

FIG. 28 is a view showing a layout of a liquid crystal display apparatus according to another exemplary embodiment of the present invention. FIG. 29 is a cross sectional view showing the liquid crystal display apparatus taken along line XXIX-XXIX of FIG. 28.

Figure 30:
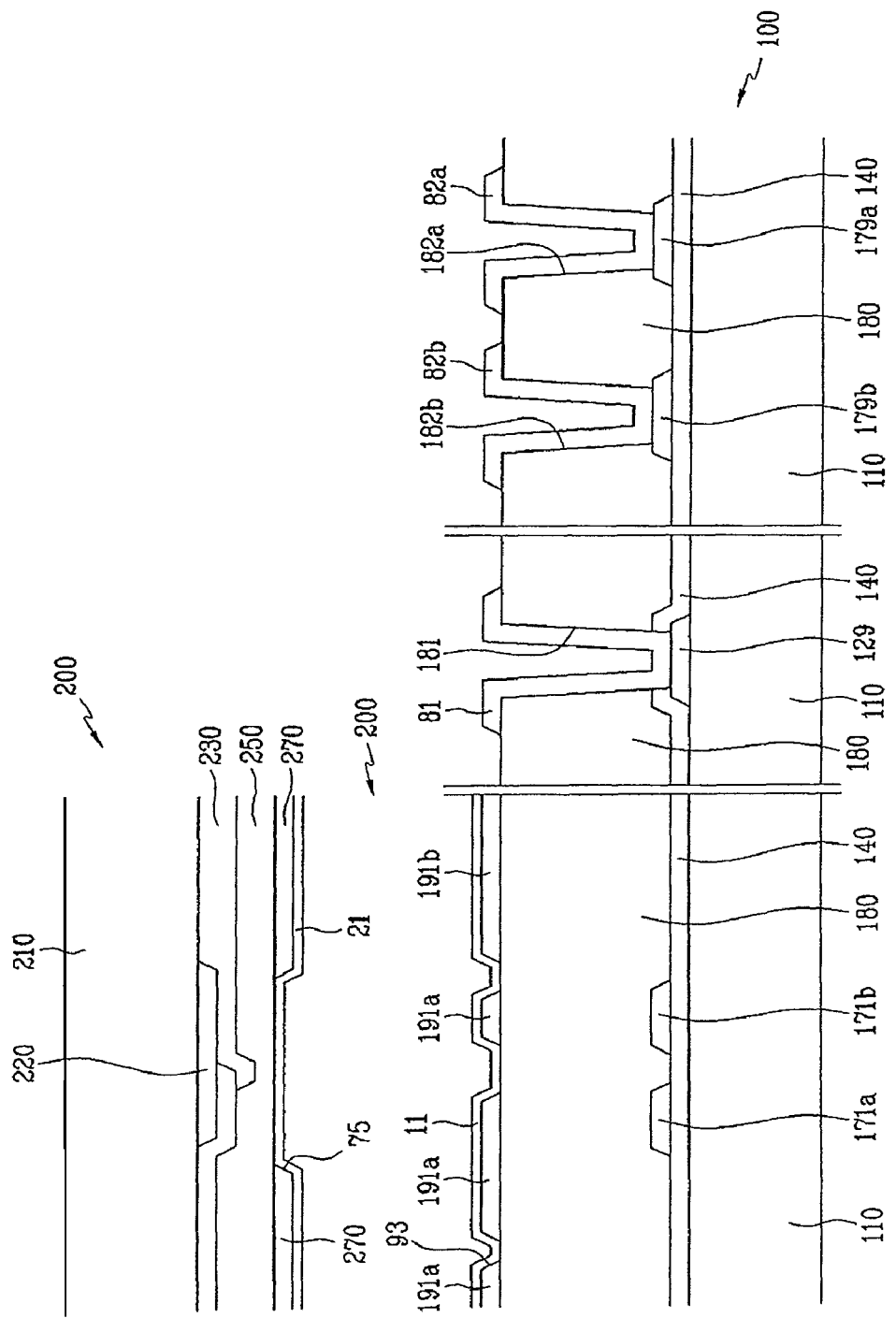
FIG. 30 is a cross sectional view showing the liquid crystal display apparatus taken along line XXI-XXX of FIG. 28.

FIG. 30 is a cross sectional view showing the liquid crystal display apparatus taken along line XXI-XXX of FIG. 28.

Figure 29:
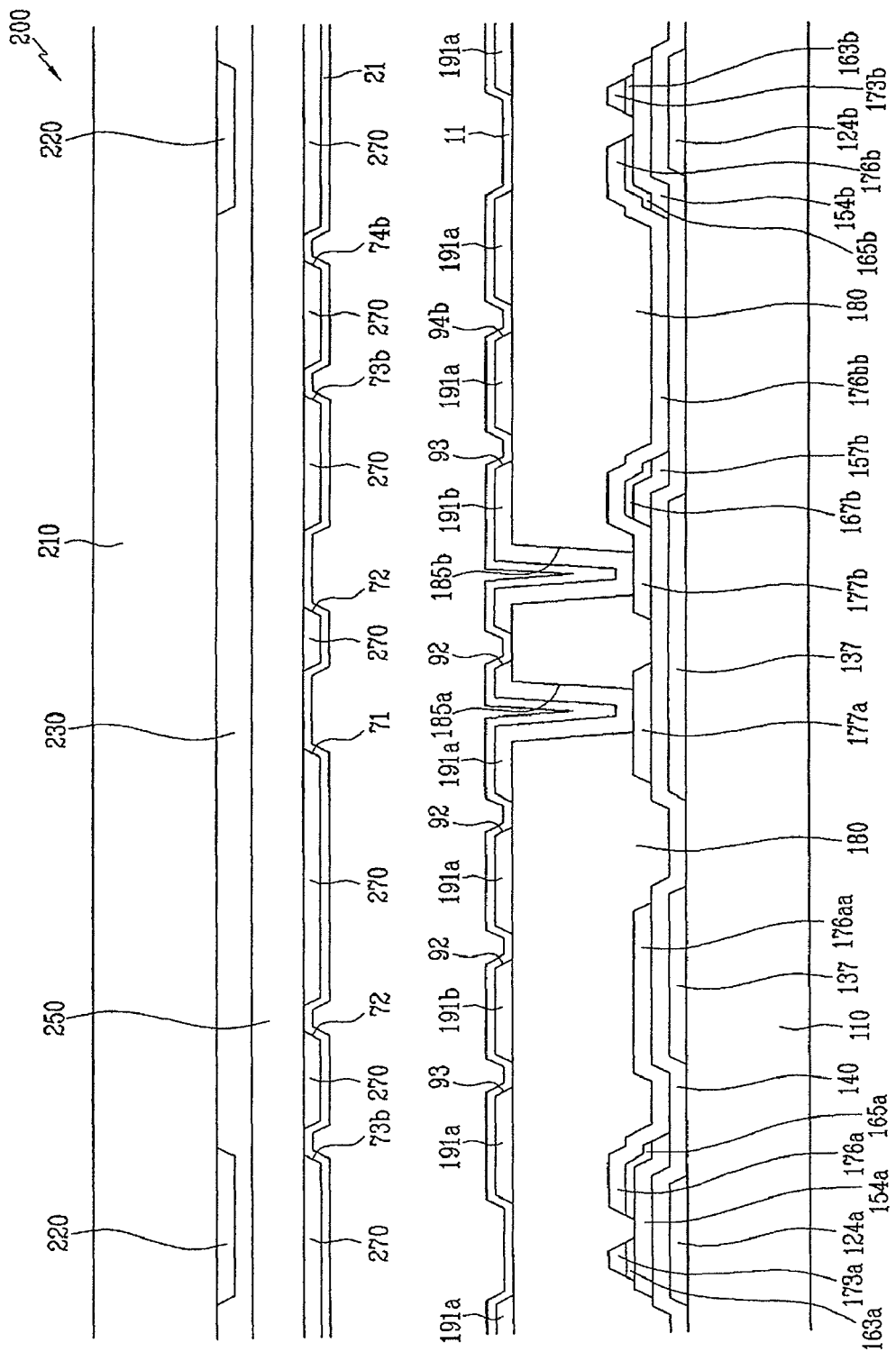
FIG. 29 is a cross sectional view showing the liquid crystal display apparatus taken along line XXIX-XXIX of FIG. 28.

Referring to FIGS. 28 to 30, the liquid crystal display apparatus includes a thin film transistor panel 100 and a common electrode panel 200 which face each other and a liquid crystal layer 300 interposed between the panels 100 and 200.

Firstly, the thin film transistor panel 100 will be described in detail.

A plurality of gate conductors including a plurality of gate lines 121 and a plurality of storage electrode lines 131 are disposed on an insulating substrate 110 made of a transparent glass or a plastic material.

The gate lines 121 transmitting gate signals mainly extend in the transverse direction. The gate lines 121 include first and second gate electrodes 124a and 124b which protrude upwardly and end portions 129 which have wide areas for connection to other layers or external driver circuits.

The storage electrode lines 131 which are applied with predetermined voltages extend substantially in parallel to the gate lines 121. Each of the storage electrode lines 131 is disposed between adjacent two gate lines 121 and separated by substantially the same distance from the two gate lines 121. The storage electrode lines 131 include storage electrodes 137 which are enlarged upwardly and downwardly and bar-shaped extension portions 139 which extend from the storage electrodes 137 downwardly The storage electrode 137 has the shape of a rectangle and is symmetrically disposed with respect to the storage electrode line 131. The extension portion 139 extends to a portion near the first gate electrode 124a. However, various shapes and arrangement may be used for the storage electrode lines 131 and the storage electrodes 137.

A gate insulating layer 140 made of a silicon nitride $SiN_x$ or the like is formed on the gate conductors 121 and 131.

A plurality of island-shaped semiconductor members 154a, 154b, 157a, and 157b made of a hydrogenated amorphous silicon or polysilicon are formed on the gate insulating film 140. The semiconductor members 154a and 154b are disposed on the gate electrodes 124a and 124b.

A plurality of island-shaped ohmic contacts 163a, 163b, 165a, 165b, 167a, and 167b formed on semiconductor members 154a, 154b, 157a, and 157b. The ohmic contacts 163a, 163b, 165a, 165b, 167a, and 167b may be made of made of silicide or an n+ hydrogenated amorphous silicon which is heavily doped with n-type impurities such as phosphorus (P). A pair of the ohmic contacts 163a and 163b and a pair of the ohmic contacts 165a and 165b are disposed on the semiconductor members 154a and 145b, respectively. A pair of the ohmic contacts 167a and 167b are disposed on the semiconductor members 157a and 157b, respectively.

A plurality of data conductors including a plurality of data lines 171a and 171b and a plurality of pairs of first and second drain electrodes 175a and 175b are formed on the ohmic contacts 163a, 163b, 165a, 165b, 167a, and 167b and the gate insulating film 140.

The data lines 171a and 171b transmitting data signals mainly extend in the longitudinal direction to intersect the gate lines 121 and the storage electrode lines 131. The data lines 171a and 171b include a plurality of first and second source electrodes 173a and 173b which protrude toward the first and second gate electrodes 124a and 124b and end portions 179a and 179b which have wide areas for connection to other layers or external driver circuits.

The first and second drain electrodes 175a and 175b are separated from each other and from the data lines 171a and 171b. The first and second drain electrodes 175a and 175b face the source electrodes 173a and 173b with respect to the gate electrodes 124a and 124b interposed therebetween. The first and second drain electrodes 175a and 175b include expansion portions 177a and 177b which have a shape of a wide rectangle at the one end thereof, bar-shaped end portions 176a and 176b at the other ends thereof, and connection portions 176aa and 176bb connecting the expansion portions 177a and 177b and the end portions 176a and 176b. The expansion portions 177a and 177b overlap the storage electrode 137. The bar-shaped end portions 176a and 176b overlap the gate electrodes 124a and 124b and are partially surrounded by the U-shaped source electrodes 173a and 173b.

The connection portion 176aa of the first drain electrode 175a is mostly located on the extension portion 139. For example, the connection portion 176aa extends along the extension portion 139 and is located within an longitudinal boundary line of the extension portion 139. The area of the expansion portion 177b of the second drain electrode 175b is smaller than that of the expansion portion 177a of the first drain electrode 175a.

The first/second gate electrode 124a (124b), the first/second source electrode 173a (173b), and the first/second drain electrode 175a (175b) together with the first and second semiconductor members 154a (154b) constitute first/second thin film transistor Qa (Qb). The channel of the first/second thin film transistor Qa (Qb) is formed in the first/second semiconductor member 154a (154b) between the first/second source electrode 173a (173b) and the first/second drain electrode 175a (175b).

The ohmic contacts 163a, 163b, 165a, 165b, 167a, and 167b are interposed only between the underlying semiconductor members 154a, 154b, 157a, and 157b and the overlying data lines 171a and 171b and the drain electrodes 175a and 175b and have a function of reducing contact resistance therebetween. The island-shaped semiconductor members 154a and 154b have exposed portions which do not cover regions between the source electrodes 173a and 173b and the drain electrodes 175a and 175b, the data lines 171a and 171b, and the drain electrodes 175a and 175b.

A protective layer (e.g., passivation layer) 180 is formed on the data lines 171a and 171b, the drain electrodes 175a and 175b, and the exposed portions of the semiconductor members 154a and 154b.

A plurality of contact holes 185a, 185b, 182a, and 182b which expose the expansion portions 177a and 177b of the drain electrodes 175a and 175b and the end portions 179a and 179b of the data lines 171a and 171b, respectively, are formed on the protective layer 180. A plurality of contact holes 181 which expose end portions 129 of the gate lines 121 are formed on the protective layer 180 and the gate insulating layer 140.

A plurality of pixel electrodes 191 including first and second sub pixel electrodes 191a and 191b and a plurality of contact assistants 81, 82a, and 82b are formed on the protective layer 180. The components may be made of a transparent conducive material such as, for example, ITO and IZO or a reflective metal such as, for example, aluminum (Al), silver (Ag), chromium (Cr), and an alloy thereof.

The pixel electrode 191 has the shape of a rectangle having four chamfered corners which has an angle of about 45° with respect to the gate lines 121.

A pair of the first and second sub pixel electrodes 191a and 191b constituting the pixel electrode 191 are engaged with each other with gaps 92 and 93 interposed therebetween. The second sub pixel electrode 191b has the shape of an isosceles trapezoid of which the base is recessed in the shape of a trapezoid. Also, most portions of the second sub pixel electrode 191b are surrounded by the first sub pixel electrode 191a. The first sub pixel electrode 191a includes upper, lower, and central trapezoids which are connected to each other at the left side.

The pixel electrode 191 has a pair of first primary edges 193 and 194 facing each other and second primary edges which are connected to the first primary edges 193 and 194 and include a plurality of sawteeth 90 and lower edges 90c connecting the sawteeth 90. Each of the sawteeth 90 includes first and second slanted edges 90a and 90d which are slanted with respect to the first primary edges 193 and 194 and an upper edge 90b. The first primary edges 193 and 194 are parallel to the gate lines 121. The first primary edges 193 and 194 and the second primary edges constitute an approximate rectangle. The pixel electrode 191 has the four chamfered corners which has an angle of about 45° with respect to the gate lines 121. The first slanted edge 90a partially overlaps the data line 171. The first slanted edges 90a of the adjacent two pixel electrodes 191 are disposed to face each other in parallel to each other.

The first sub pixel electrode 191a includes cutout portions 94a and 94b which extend from an upper side of an upper trapezoid and a lower side of a lower trapezoid toward the right side thereof, respectively. A central trapezoid of the first sub pixel electrode 191a is inserted into a receded lower side of the second sub pixel electrode 191b. In addition, the first sub pixel electrode 191a includes a central cutout portion 91 which has a transverse portion and a pair of slanted portions connected thereto. The transverse portion extends shortly along a transverse central line of the first sub pixel electrode 191a. A pair of the slanted portions extend from the transverse portion toward the left side of the first sub pixel electrode 191a with an angle of about 45° with respect to the storage electrode line 131. The gaps 92 and 93 between the first and second sub pixel electrodes 191a and 191b include two pairs of upper and lower slanted portions and a longitudinal portion which have an angle of about 45° with respect to the gate lines 121.

The cutout portions 91 to 94b have an inversion symmetry with respect to the storage electrode line 131. The cutout portions 91 to 94b extend in perpendicular to each other with slanted angles of about 45° with respect to the gate lines 121. The pixel electrode 191 is divided into a plurality of partitions by the cutout portions 91 to 94b.

Accordingly, the upper and lower half regions with respect to the storage electrode line 131 bisecting the pixel electrode 191 in the transverse direction are divided into four partitions by the cutout portions 91 to 94b.

The number of the partitions and the number of the cutout portions may vary according to design factors such as, for example, the size of the pixel electrode 191, the ratio of lengths of the transverse and longitudinal sides of the pixel electrode 191, and the types or characteristics of the liquid crystal layer 3.

The first and second sub pixel electrodes 191a and 191b are connected to the first and second drain electrodes 175a and 175b through the contact holes 185a and 185b and applied with data voltages from the first and second drain electrodes 175a and 175b. A pair of the sub pixel electrodes 191a and 191b are applied with different predetermined data voltages for one input image signal. The sizes of the data voltages may be determined according to the areas and shapes of the sub pixel electrodes 191a and 191b. In addition, the areas of the sub pixel electrodes 191a and 191b may be different from each other. For example, the second sub pixel electrode 191b has a higher voltage applied thereto than applied to the first sub pixel electrode 191a, and the area of the second sub pixel electrode 191b may be smaller than that of the first sub pixel electrode 191a.

The first/second sub pixel electrodes 191a (191b) is physically and electrically connected to the first/second drain electrodes 175a (175b) through the contact holes 185a (185b) and has data voltages applied thereto from the first and second drain electrodes 175a (175b). A pair of the sub pixel electrodes 191a and 191b have different predetermined data voltages for one input image signal applied thereto. The sizes of the data voltages may be determined according to, for example, the areas and shapes of the sub pixel electrodes 191a and 191b. In addition, the areas of the sub pixel electrodes 191a and 191b may be different from each other. For example, the second sub pixel electrode 191b may have a higher voltage applied thereto than applied to the first sub pixel electrode 191a, and the area of the second sub pixel electrode 191b may be smaller than that of the first sub pixel electrode 191a.

The sub pixel electrodes 191a and 191b having data voltages applied thereto and the common electrode 270 having the common voltage applied thereto constitutes first and second liquid crystal capacitors which sustain the applied voltages after the thin film transistor turns off.

Each of the liquid crystal capacitors includes a corresponding portion of the liquid crystal layer 3 as the dielectric member.

The first and second sub pixel electrodes 191a and 191b and the expansion portions 177a and 177b of the drain electrodes 173a and 173b electrically connected thereto overlap the storage electrode 137, the extension portion 139, and the storage electrode line 131 with the gate insulating layer 140 interposed therebetween so as to constitute a storage capacitor for strengthening a voltage storage capacity of the liquid crystal capacitor.

The contact assistants 81, 82a, and 82b are connected to the end portions 129 of the gate lines 121 and the end portion 179 of the data line 171 through the contact holes 181, 182a, and 182b, respectively.

Now, the common electrode panel 200 will be described in detail.

A light blocking member 220 is formed on the insulating substrate 210 made of a transparent glass or a plastic material. The light blocking member 220 include line-shaped portions corresponding to the data lines 171, enlarged portions formed by enlarging some portions of the light blocking member 220, and plane-shaped portions corresponding to the thin film transistors. The light blocking member 220 prevents light leakage between the pixel electrodes 191 and defining opening regions facing the pixel electrodes. However, the light blocking member 220 may further include a plurality of opening portions facing the pixel electrodes 191 and having substantially the same shape as the pixel electrodes 191.

A plurality of color filters 230 are formed on the substrate 210. Most portions of the color filters 230 are disposed in regions surrounded by the light-blocking member 220. Also, the color filters 230 extend along rows of the pixel electrodes 191 in the longitudinal direction. Each of the color filters 230 can display one of primary colors such as red, green, and blue.

A cover film 250 is formed on the color filters 230 and the light-blocking member 220. The cover film 250 may be made of an (e.g, organic) insulating material. The cover film 250 prevents the color filters 230 from being exposed and provides a planarized surface. The cover film 250 may be omitted.

A common electrode 270 is formed on the cover film 250. The common electrode 270 is made of a transparent conductive material such as, for example,ITO and IZO.

A plurality of cutout portions 71, 72, 73a, 73b, 74a, 74b, and 75 are formed on the common electrode 270.

One cutout portion set 71-75 faces one pixel electrode 191 and includes a central cutout portion 71, first to third lower slanted cutout portions 72, 73a, and 74a, first to third upper slanted cutout portions 72, 73b, and 74b, and a connection portions 75. The cutout portions 71, 72, 73a, 73b, 74a, and 74b are disposed between the adjacent cutout portions 91, 92, 93a, 93b, 94a, and 94b of the pixel electrode 191 or between the cutout portions 91, 92, 93a, 93b, 94a, an 94b and the chamfered edge of the pixel electrode 191. In addition, each of the cutout portions 71, 72, 73a, 73b, 74a, and 74b extends substantially in parallel to the lower cutout portions 92, 93a, and 94a or upper cutout portions 92, 93b, and 94b of the pixel electrode 191 and include at least one slanted portion.

The first lower and upper slanted cutout portions 72 extend substantially from the right side to the left side of the pixel electrode 191. The second lower and upper slanted cutout portions 73a and 73b extend substantially from the right side to the upper and lower left corners of the pixel electrode 191, respectively. The third lower and upper slanted cutout portions 74a and 74b extend substantially from the right side to the lower and upper sides of the pixel electrode 191, respectively. The third lower and upper slanted cutout portions 74a and 74b include terminated transverse portions which extend from the ends of the third lower and upper slanted cutout portions 74a and 74b to overlap the lower and upper sides of the pixel electrode 191. The terminated transverse portions have an obtuse angle with respect to the slanted cutout portions 74a and 74b.

The central cutout portion 71 includes a central transverse portion and a pair of slanted portions. The central transverse portion extends substantially from the right side of the pixel electrode 191 along the storage electrode line 131 in the left direction. A pair of the slanted portions extend substantially in parallel to the lower and upper cutout portions 72, 73a, 73b, 74a, and 74b from the end of the central transverse portion to the left side of the pixel electrode 191.

One end of the one slanted portion of the central cutout portion 71 and one end of the second lower cutout portion 73a of the adjacent pixel electrode are connected with one of the connection portions 75. Moreover, one end of the other slanted portion of the central cutout portion 71 and t one end of the second upper cutout portion 73b of the adjacent pixel electrode are connected with one of the connection portions 75.

In addition, one end of the first lower slanted cutout portion 72 and one end of the third lower slanted cutout portion 74a of the adjacent pixel electrode are connected with one of the connection portions 75. Also, one end of the first upper slanted cutout portion 72 and one end of the third upper slanted cutout portion 74b of the adjacent pixel electrode are connected with one of the connection portions 75. The connection portions 75 are parallel to the first slanted edges 90a of the pixel electrode 191 and located at portions corresponding to the data line 171. The width of the connection portions 75 is larger by about 8 μm than the interval between the adjacent pixels 191. The enlarged portions 222 of the light blocking member 220 may have a width larger than the other portions corresponding to the connection portions 75.

Triangular-shaped notches 7 are formed in the slanted portions of the cutout portions 71 to 74b. Alternatively, the notches may have various shapes such as, for example, rectangular, trapezoidal and semicircular shapes. In addition, the notches may be formed in a shape of convex or concave. Such notches control the alignment of the liquid crystal molecules 3 located in boundary regions corresponding to the cutout portions 71 to 74b.

The number and directions of the cutout portion 71 to 75 may vary according to design factors, and the light-blocking member 220 overlaps the cutout portions 71 to 75 to prevent the light leakage in the vicinity of the cutout portions 71 to 75.

In addition, by providing the sawteeth to the side of the pixel electrode 191 adjacent to the data line 171, the secondary electric field generated between the adjacent pixel electrodes 191 can control the alignment of the liquid crystal molecules 31 in the sub areas. In addition, by providing the connection portions 75 at the positions corresponding to the regions where the first slanted edges 90a of the adjacent two pixel electrodes 191 face each other, the alignment of the liquid crystal molecules 31 in the sub areas can also be controlled.

Alignment films 11 and 21 are coated on inner surfaces of the panels 100 and 200, respectively. The alignment films 11 and 21 may be a vertically-aligned film. Polarizers are disposed on outer surfaces of the panels 100 and 200, respectively.

According to a liquid crystal display apparatus of the exemplary embodiments of the present invention, longitudinal cutout portions among cutout portions of a common electrode are removed, so that the removed areas can be used as a light transmitting area. In addition, since connection portions corresponding to gaps between the pixel electrodes are provided to the common electrode, alignment of liquid crystal molecules in sub pixel areas can be controlled due to secondary electric fields, thereby reducing texture and improving aperture ratio and transmittance of the liquid crystal display apparatus.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A display panel comprising:
   a substrate;
   a plurality of second signal lines disposed on the substrate;
   a plurality of second signal lines insulatingly crossing the first signal lines; and
   a plurality of pixel electrodes each connected to one of the plurality of first signal lines and one of the plurality of second signal lines,
   wherein a pixel electrode of the plurality of pixel electrodes comprises:
   a pair of first primary edges substantially parallel to the first signal lines and facing each other; and
   a pair of second primary edges connected to the first primary edges and facing each other and comprises a plurality of protrusions each having a sawteeth shape with slanted edges with respect to the first primary edges,
   wherein the slanted edges of the protrusion comprises a first edge and a second edge not parallel to each other, both the first edge and second edge forming an angle less than 90 degree with the first primary edges and being slanted in a same direction with respect to the first primary edges, and
   wherein the second primary edge further comprises a third edge connecting two neighboring protrusions of the plurality of protrusions, the third edge being substantially parallel to the second signal lines.

2. The display panel of claim 1, wherein the protrusions further comprising a third edge connecting the first edge and the second edge.

3. The display panel of claim 2, wherein the third edge of the protrusions is substantially perpendicular to the first primary edges.

4. The display panel of claim 1, wherein the pixel electrode further comprises a cutout portion which has a slanted angle with respect to the first primary edges.

5. The display panel of claim 4, wherein the second edge is parallel to the cutout portion.

6. The display panel of claim 4, wherein the second edge is on an extension line of an edge of the cutout portion.

7. The display panel of claim 1, wherein an envelope of the protrusions and the first primary edges constitute a rectangle.

8. The display panel of claim 7, wherein at least one of corners of the rectangle is a chamfered slanted edge.

9. The display panel of claim 8, wherein the chamfered slanted edge of the rectangle has an angle of about 45° with respect to the first primary edges.

10. The display panel of claim 1, wherein at least a portion of the protrusion overlaps the second signal line.

11. The display panel of claim 1, wherein the protrusions of adjacent second primary edges of adjacent pixel electrodes are engaged with each other.

12. The display panel of claim 1, further comprising a common electrode opposing the plurality of pixel electrodes, wherein the common electrode comprises a first cutout portion crossing a gap between adjacent pixel electrodes.

13. The display panel of claim 12, wherein an edge of the first cutout portion is substantially parallel to the first edge of the protrusion.

14. The display panel of claim 13, wherein the first cutout portion overlaps the first edge of the protrusion.

15. The display panel of claim 13, wherein the pixel electrode further comprises a cutout portion which has a slanted angle with respect to the first primary edges, and
   the first edge is not parallel to the cutout portion of the pixel electrode.

16. The display panel of claim 12, wherein the common electrode further comprises a second cutout portion facing the pixel electrode.

17. The display panel of claim 16, wherein the first cutout portion connects adjacent second cutout portions.

18. The display panel of claim 16, wherein the first cutout portion has an obtuse angle with respect to the second cutout portion.

19. The display panel of claim 12, wherein a width of the first cutout portion is larger than a width of the gap.

20. The display panel of claim 12, wherein the first cutout portion faces the second signal line.

* * * * *